United States Patent
Kwon et al.

(10) Patent No.: US 11,153,419 B2
(45) Date of Patent: *Oct. 19, 2021

(54) METHOD AND APPARATUS FOR TRANSMITTING/RECEIVING BROADCASTING SIGNAL INCLUDING ROBUST HEADER COMPRESSION PACKET STREAM AND FAST INFORMATION

(71) Applicant: LG ELECTRONICS INC., Seoul (KR)

(72) Inventors: Woosuk Kwon, Seoul (KR); Woosuk Ko, Seoul (KR); Sungryong Hong, Seoul (KR); Sejin Oh, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,304

(22) Filed: Jun. 15, 2020

(65) Prior Publication Data

US 2020/0322463 A1    Oct. 8, 2020

Related U.S. Application Data

(63) Continuation of application No. 16/743,542, filed on Jan. 15, 2020, now Pat. No. 10,728,369, which is a (Continued)

(51) Int. Cl.
*H04L 29/06* (2006.01)
*H04N 21/2362* (2011.01)
(Continued)

(52) U.S. Cl.
CPC ............. *H04L 69/22* (2013.01); *H04H 20/33* (2013.01); *H04L 69/324* (2013.01);
(Continued)

(58) Field of Classification Search
CPC ... H04L 69/22; H04L 69/324; H04L 65/4076; H04H 20/33; H04N 21/2362; H04N 21/4345; H04N 21/6336; H04W 4/06
See application file for complete search history.

(56) References Cited

U.S. PATENT DOCUMENTS 7,936,786 B2    5/2011  Lee et al.
9,374,443 B2 *  6/2016  Govindappa ........... H04L 69/22
(Continued)

FOREIGN PATENT DOCUMENTS

CN          101605304 A      12/2009
JP          2005-528865 A     9/2005
(Continued)

OTHER PUBLICATIONS

Bormann et al., "RObust Header Compression (ROHC): Framework and four profiles: RTP, UDP, ESP, and uncompressed," Network Working Group, RFC 3095, Jul. 2001, pp. 1-168 (169 total pages), XP015008878.

*Primary Examiner* — Shukri Taha
(74) *Attorney, Agent, or Firm* — Birch, Stewart, Kolasch & Birch, LLP

(57) ABSTRACT

A method for transmitting a broadcast signal includes generating a packet carrying a broadcast service and service signaling information, and a packet carrying fast information for supporting rapid service scans and service acquisition, the fast information including identification information for identifying the broadcast service, service category information representing a category of the broadcast service and hidden information representing whether or not the broadcast service is related to a test service; generating a robust header compression (RoHC) packet by compressing a header of each packet, and signaling information including context information generated from the compressing the
(Continued)

header of each packet; and transmitting a signal frame including the RoHC packet and the signaling information.

12 Claims, 52 Drawing Sheets

Related U.S. Application Data continuation of application No. 14/913,962, filed as application No. PCT/KR2015/000250 on Jan. 9, 2015, now Pat. No. 10,582,023.

(60) Provisional application No. 61/927,450, filed on Jan. 14, 2014.

(51) Int. Cl.

| | | |
|---|---|---|
| *H04N 21/2383* | (2011.01) | |
| *H04N 21/6336* | (2011.01) | |
| *H04H 20/33* | (2008.01) | |
| *H04L 29/08* | (2006.01) | |
| *H04N 21/434* | (2011.01) | |

(52) U.S. Cl.
CPC ..... *H04N 21/2362* (2013.01); *H04N 21/2383* (2013.01); *H04N 21/4345* (2013.01); *H04N 21/6336* (2013.01)

(56) References Cited

U.S. PATENT DOCUMENTS

| | | | |
|---|---|---|---|
| 9,674,803 B2* | 6/2017 | Eravelli | H04W 56/001 |
| 9,769,701 B2* | 9/2017 | Denio | H04W 28/06 |
| 2006/0039308 A1 | 2/2006 | Kim | |
| 2007/0201406 A1 | 8/2007 | Yoon et al. | |
| 2009/0238129 A1 | 9/2009 | Park et al. | |
| 2009/0296624 A1 | 12/2009 | Ryu et al. | |
| 2009/0316831 A1 | 12/2009 | Song et al. | |
| 2010/0135330 A1 | 6/2010 | Liang et al. | |
| 2012/0093235 A1 | 4/2012 | Suh et al. | |
| 2013/0034032 A1 | 2/2013 | Väre et al. | |
| 2013/0223387 A1 | 8/2013 | Park et al. | |
| 2013/0279380 A1 | 10/2013 | Hong et al. | |
| 2013/0291046 A1 | 10/2013 | Ko et al. | |
| 2014/0119377 A1* | 5/2014 | Crosta | H04L 45/7453 370/392 |
| 2015/0237179 A1 | 8/2015 | Sridhar et al. | |
| 2016/0241925 A1 | 8/2016 | Iguchi et al. | |

FOREIGN PATENT DOCUMENTS

| | | |
|---|---|---|
| KR | 10-2009-0129931 A | 12/2009 |
| KR | 10-1154425 B1 | 6/2012 |
| KR | 10-2013-0127990 A | 11/2013 |
| WO | WO 2010/048621 A2 | 4/2010 |

\* cited by examiner

FIG. 12

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
| --- | --- |
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 14

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for = 1: NUM_AUX | |
|         AUX_STREAM_TYPE | 4 |
|         AUX_PRIVATE_CONF | 28 |
|     end | |
| end | |

FIG. 15

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or 13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

| P1 | L1 | Common PLP | Scheduled & interleaved PLP's | | | | Auxiliary data |
|---|---|---|---|---|---|---|---|
| | | | PLP1 | PLP2 | ... | PLPn | |

FIG. 33

| P1 | L1 | Fast Information Channel | Scheduled & interleaved PLP's | | | | Auxiliary data |
|---|---|---|---|---|---|---|---|
| | | | PLP1 | PLP2 | ... | PLPn | |

FIG. 34

| Syntax | No. of bits | Format |
|---|---|---|
| Fast_Information_Chunk(){ | | |
|     FIT_data_version | 8 | uimsbf |
|     num_broadcast | 8 | uimsbf |
|     for(i=0;i<num_broadcast;i++){ | | |
|       broadcast_id | 16 | uimsbf |
|       delivery_system_id | 16 | uimsbf |
|       num_service | 8 | uimsbf |
|       for(j=0;j<num_service | | |
|         service_id | 16 | uimsbf |
|         service_category | 6 | uimsbf |
|         service_hidden_flag | 1 | bslbf |
|         SP_indicator | 1 | bslbf |
|       } | | |
|     } | | |
| } | | |

FIG. 37

| Syntax | No. of bits | Format |
|---|---|---|
| Fast_Information_Chunk(){ | | |
|     FIT_data_version | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|         } | | |
|     } | | |
| } | | |

FIG. 38

| Syntax | No. of bits | Format |
|---|---|---|
| Fast_Information_Chunk(){ | | |
|     FIT_data_version | 8 | uimsbf |
|     num_broadcast | 5 | uimsbf |
|     reserved | 3 | '111' |
|     for(i=0;i<num_broadcast;i++){ | | |
|         broadcast_id | 16 | uimsbf |
|         delivery_system_id | 16 | uimsbf |
|         base_PLP_id | 6 | uimsbf |
|         base_PLP_version | 5 | uimsbf |
|         num_service | 5 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|         } | | |
|     } | | |
| } | | |

FIG. 39

| Syntax | No. of bits | Format |
|---|---|---|
| Fast_Information_Chunk(){ | | |
|     FIT_data_version | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for(j=0;j<num_service;j++){ | | |
|             service_id | 16 | uimsbf |
|             service_category | 6 | uimsbf |
|             service_hidden_flag | 1 | bslbf |
|             SP_indicator | 1 | bslbf |
|             num_component | 8 | uimsbf |
|             for(k=0;k<num_component;k++){ | | |
|                 component_ | 8 | bslbf |
|                 PLP_id | 8 | bslbf |
|             } | | |
|         } | | |
|     } | | |
| } | | |

FIG. 40

| Syntax | No. of bits | Format |
|---|---|---|
| Fast_Information_Chunk(){ | | |
|     FIT_data_version | 8 | uimsbf |
|     num_broadcast | 8 | uimsbf |
|     for(i=0;i<num_broadcast;i++){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         num_service | 3 | '111' |
|         for(j=0;j<num_service;j++){ | 8 | uimsbf |
|             service_id | | |
|             service_category | 16 | uimsbf |
|             service_hidden_flag | 6 | uimsbf |
|             service_id | 1 | bslbf |
|             SP_indicator | 1 | bslbf |
|             num_component | 8 | uimsbf |
|               for(k=0;k<num_component;k++){ | | |
|             component_ | 8 | bslbf |
|             PLP_id | 8 | bslbf |
|             } | | |
|         } | | |
|     } | | |
| } | | |

FIG. 45

| Syntax | No. of bits | Format |
|---|---|---|
| fast_information_table(){ | | |
|   table_id | 8 | uimsbf |
|   section_syntax_indicator | 1 | '0' |
|   private_indicator | 1 | '1' |
|   reserved | 2 | '11' |
|   section_length | 12 | uimsbf |
|   table_id_extension | 16 | uimsbf |
|   reserved | 2 | '11' |
|   FIT_data_version | 5 | uimsbf |
|   current_next_indicator | 1 | bslbf |
|   section_number | 8 | uimsbf |
|   last_section_number | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|       num_component | 8 | uimsbf |
|       for(k=0;k<num_component;k++){ | | |
|         component_id | 8 | bslbf |
|         PLP_id | 8 | bslbf |
|       } | | |
|     } | | |
|   } | | |
| } | | |

FIG. 46

| Syntax | No. of bits | Format |
|---|---|---|
| fast_information_table(){ | | |
|   table_id | 8 | uimsbf |
|   section_syntax_indicator | 1 | '0' |
|   private_indicator | 1 | '1' |
|   reserved | 2 | '11' |
|   section_length | 12 | uimsbf |
|   table_id_extension | 16 | uimsbf |
|   reserved | 2 | '11' |
|   FIT_data_version | 5 | uimsbf |
|   current_next_indicator | 1 | bslbf |
|   section_number | 8 | uimsbf |
|   last_section_number | 8 | uimsbf |
|   num_broadcast | 8 | uimsbf |
|   for(i=0;i<num_broadcast;i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for(j=0;j<num_service;j++){ | | |
|       service_id | 16 | uimsbf |
|       service_category | 6 | uimsbf |
|       service_hidden_flag | 1 | bslbf |
|       SP_indicator | 1 | bslbf |
|       reserved | 5 | '11111' |
|       short_service_name_length/*m*/ | 3 | uimsbf |
|       short_service_name | 16*m | bslbf |
|       num_component | 8 | bslbf |
|       for(k=0;k<num_component;k++){ | | |
|         component_id | 8 | bslbf |
|         PLP_id | 8 | bslbf |
|       } | | |
|       num_descriptors | 8 | bslbf |
|       for(k=0;k<num_component;k++){ | | |
|         service_descriptor | var | |
|       } | | |
| } | | |

FIG. 47

| Element/Attribute (with @) | Cardinality | Data Type | Description & Value |
|---|---|---|---|
| Fast Information Table | | | |
| @ FITDataVersion | 0..1 | Integer, range 0 | Data version of this table, default='1' |
| Broadcaster | 1..N | | Broadcaster associated with this table |
| @ broadcasterID | 1 | unsignedShort | Broadcaster identifier |
| @ deliverySystemID | 1 | unsignedShort | An identifier of delivery system exploiting certain transmission parameters |
| @ basePLPID | 1 | string | An identifier for base PLP delivering necessary data, e.g., PSI/SI signaling, to decode associated other data, e.g., audio or video content components |
| @ basePLPVersion | 0..1 | unsignedByte | data version of data delivered via base PLP, default = '1' |
| Service | 0..N | | Service associated with this broadcaster. |
| @ serviceID | 1 | unsignedShort | Service identifier |
| @ serviceShortName | 1 | string | Service name (which can be displayed to the user) |
| @ serviceCategory | 1 | unsignedByte | Service category(e.g., TV, redio) |
| @ serviceHidden | 0..1 | boolean | Default= "false" |
| @ serviceProtection | 0..1 | boolean | Default= "false" |
| Component | 1..N | | Content component used by this service |
| @ componentID | 1 | unsignedByte | Component identifier |
| @ PLPID | 1 | unsignedByte | PLP identifier to deliver this component |

FIG. 48

| Syntax | No. of Bits | Format |
|---|---|---|
| Fast_information_table_section | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         reserved | 8 | uimsbf |
|     } | | |
|     reserved | 2 | '11' |
|     FIT_data_version | 5 | uimsbf |
|     current_next_indicator | 1 | '1' |
|     section_number | 8 | uimsbf |
|     last_section_number | 8 | uimsbf |
|     fit_bytes() | var | bslbf |
| } | | |

FIG. 49

| Syntax | No. of Bits | Format |
|---|---|---|
| ROHC_init_descriptor( ) { | | |
|     descriptor_tag | 8 | uimsbf |
|     descriptor_length | 8 | uimsbf |
|     context_id | 8 or 16 | |
|     context_profile | 8 | uimsbf |
|     max_cid | 8 | uimsbf |
|     large_cid | 8 | bslbf |
| } | | |

FIG. 50

| Syntax | No. of bits | Format |
|---|---|---|
| Fast_Information_Chunk ( ){ | | |
|     FIT_data_version | 8 | uimsbf |
|     num_broadcast | 8 | uimsbf |
|     for( i=0 ; i<num_broadcast ; i++ ){ | | |
|         broadcast_id | 16 | uimsbf |
|         delivery_system_id | 16 | uimsbf |
|         base_PLP_id | 8 | uimsbf |
|         base_PLP_version | 5 | uimsbf |
|         reserved | 3 | '111' |
|         num_service | 8 | uimsbf |
|         for( j=0 ; j< num_service ; j++ ){ | | |
|             service_id | 16 | uimsbf |
|             service_category | 6 | uimsbf |
|             service_hidden_flag | 1 | bslbf |
|             SP_indicator | 1 | bslbf |
|             RoHC_init_descriptor( ) | var | |
|         } | | |
|     } | | |
| } | | |

FIG. 51

| Syntax | No. of bits | Format |
|---|---|---|
| Fast_Information_Chunk( ){ | | |
|     FIT_data_version | 8 | uimsbf |
|     num_broadcast | 8 | uimsbf |
|     for( i=0 ; i<num_broadcast ; i++ ){ | | |
|       broadcast_id | 16 | uimsbf |
|       delivery_system_id | 16 | uimsbf |
|       base_PLP_id | 8 | uimsbf |
|       base_PLP_version | 5 | uimsbf |
|       reserved | 3 | '111' |
|       num_service | 8 | uimsbf |
|       for( j=0 ; j< num_service ; j++ ){ | | |
|         service_id | 16 | uimsbf |
|         service_category | 6 | uimsbf |
|         service_hidden_flag | 1 | bslbf |
|         SP_indicator | 1 | bslbf |
|         context_id | 8 or 16 | |
|         context_profile | 8 | uimsbf |
|         max_cid | 8 | uimsbf |
|         large_cid | 8 | bslbf |
|       } | | |
|     } | | |
| } | | |

FIG. 52

| Syntax | No. of bits | Format |
|---|---|---|
| Fast_Information_Chunk ( ){ | | |
|    FIT_data_version | 8 | uimsbf |
|    num_broadcast | 8 | uimsbf |
|    for( i=0 ; i<num_broadcast ; i++ ){ | | |
|      broadcast_id | 16 | uimsbf |
|      delivery_system_id | 16 | uimsbf |
|      base_PLP_id | 8 | uimsbf |
|      base_PLP_version | 5 | uimsbf |
|      reserved | 3 | '111' |
|      num_service | 8 | uimsbf |
|      for( j=0 ; j< num_service ; j++ ){ | | |
|         service_id | 16 | uimsbf |
|         service_category | 6 | uimsbf |
|         service_hidden_flag | 1 | bslbf |
|         SP_indicator | 1 | bslbf |
|         num_component | 8 | uimsbf |
|         for( k=0 ; k<num_component ; k++ ){ | | |
|            component_id | 8 | bslbf |
|            PLP_id | 8 | bslbf |
|            RoHC_init_descriptor( ) | var | |
|         } | | |
|      } | | |
|    } | | |
| } | | |

FIG. 53

| Syntax | No. of bits | Format |
|---|---|---|
| Fast_Information_Chunk( ){ | | |
|   FIT_data_version | 8 | uimsbf |
|   num_broadcast | 8 | uimsbf |
|   for( i=0 ; i<num_broadcast ; i++){ | | |
|     broadcast_id | 16 | uimsbf |
|     delivery_system_id | 16 | uimsbf |
|     base_PLP_id | 8 | uimsbf |
|     base_PLP_version | 5 | uimsbf |
|     reserved | 3 | '111' |
|     num_service | 8 | uimsbf |
|     for( j=0 ; j< num_service ; j++){ | | |
|       service_id | 16 | uimsbf |
|       service_category | 6 | uimsbf |
|       service_hidden_flag | 1 | bslbf |
|       SP_indicator | 1 | bslbf |
|       num_component | 8 | uimsbf |
|       for( k=0 ; k<num_component ; k++){ | | |
|         component_id | 8 | bslbf |
|         PLP_id | 8 | bslbf |
|         context_id | 8 or 16 | |
|         context_profile | 8 | uimsbf |
|         max_cid | 8 | uimsbf |
|         large_cid | 8 | bslbf |
|       } | | |
|     } | | |
|   } | | |
| } | | |

METHOD AND APPARATUS FOR TRANSMITTING/RECEIVING BROADCASTING SIGNAL INCLUDING ROBUST HEADER COMPRESSION PACKET STREAM AND FAST INFORMATION

CROSS-REFERENCE TO RELATED APPLICATIONS

This Application is a Continuation of U.S. patent application Ser. No. 16/743,542 filed on Jan. 15, 2020 (now U.S. Pat. No. 10,728,369 issued on Jul. 28, 2020), which is a Continuation of U.S. patent application Ser. No. 14/913,962 filed on Feb. 23, 2016 (now U.S. Pat. No. 10,582,023 issued on Mar. 3, 2020), which is the National Phase of PCT International Application No. PCT/KR2015/000250 filed on Jan. 9, 2015, which claims the priority benefit under 35 U.S.C. § 119(e) to U.S. Provisional Application No. 61/927,450 filed on Jan. 14, 2014, all of which are hereby expressly incorporated by reference into the present application.

BACKGROUND OF THE INVENTION

Field of the Invention

The present invention relates to transmission and reception of a broadcast signal, and more particularly to a method and/or apparatus for transmitting and receiving a broadcast signal including a robust header compression (RoHC) packet stream and fast information.

Discussion of the Related Art

According to digital broadcast, a plurality of broadcast services can be transmitted through a specific frequency, unlike analog broadcast. In addition, detailed information for reception of a broadcast service can be changed according to things such as broadcasters. Thus, in order to receive each broadcast service, a broadcast receiving apparatus needs to perform broadcast service scan for acquisition of connection information required to receive each broadcast service. To this end, the broadcast receiving apparatus needs to sequentially tune frequencies within a baseband as a frequency band for transmission of a broadcast service, to receive a broadcast signal, and to acquire service connection information from the received broadcast signal. Thus, a user needs to wait for completion of the broadcast service scan in order to watch broadcast. Accordingly, there has been a need to determine maximum time required to complete the broadcast service scan by many broadcasters and to complete the broadcast service scan by a broadcast receiving apparatus within the maximum time by a manufacturer of the broadcast receiving apparatus.

In general, IP/UDP/RTP header fields can be classified into static, delta, dynamic, and inferred attributes. The static is a field having a predetermined value in one end to end packet stream, corresponds to an IP address and a port number, and also corresponds to a field having well known values like in a version field of RTP or IP. The delta is a field having a predetermined difference value from a previous packet and corresponds to a sequence number, etc. The dynamic is a field that is randomly changed and corresponds to checksum, an ID of an IP packet, etc. The inferred corresponds to a field that can be inferred via another header field, etc. like the length field. Concept of context identifier (CID) has been introduced as a general header compression scheme. When a transmitter side (compressor) initially transmits a packet having a full header in a non-compression state, to which a specific CID is added, and then transmits a next packet with the same CID, from which header fields having static, delta, or inferred attribute are omitted, a receiver side (decompressor) restores an overall RTP header by adding fields omitted from a compression header received after a second packet with reference to header field information that is initially stored based on the CID. In the case of delta header, when the compressor and the decompressor store most fields of the full header and then the compressor transmits only a difference value from a previous packet, the decompressor restores the delta header by compensating a pre-stored value for the difference value.

A robust header compression (RoHC) scheme classifieds a header field into static, dynamic, and inferable, defines a compression release state at a compressor as initialization and refresh (IR), first order (FO), and second order (SO), and defines a compression release state at a decompressor as no context (NC), static context (SC), and full context (FC). The RoHC scheme initially begins to perform transmission with a low compression ratio and maintains a state in which the current compression ratio reaches a highest compression ratio as possible. In this regard, when the decompressor fails in context initialization or compression release, the compressor state is returned to IR as a lowest compression step and in this state, the compressor transmits a full header. Then, in the FO step, the compressor omits a static field and does not lastly transmit all fields that can be compressed in an SO step. State transition of the decompressor can be moved to SC and FC steps from NC as a lowest step, and an optimal compression release operation is performed in the FC step.

Robust header compression (RoHC) can be configured for a bidirectional transmission system. In the bidirectional transmission system, a RoHC compressor and a RoHC decompressor can perform an initial set up procedure and in this procedure, can transmit and receive a parameter required for the initial procedure. The procedure for transmitting and receiving the parameter required for aforementioned initial procedure can be referred as a negotiation procedure or an initialization procedure. However, a unidirectional system such as a broadcast system cannot perform the aforementioned negotiation procedure and needs to replace the aforementioned initialization procedure with a separate method.

SUMMARY OF THE INVENTION

Therefore, the present invention has been made in view of the above problems, and it is an object of the present invention to provide a method and/or apparatus for transmitting and receiving a broadcast signal including robust header compression (RoHC) packet stream and fast information.

It is an object of the present invention to provide a method for performing a RoHC initialization procedure in a unidirectional transmission system.

It is an object of the present invention to provide a method for transmitting a parameter required for a RoHC initialization procedure in a unidirectional transmission system.

In addition, it is an object of the present invention to provide a method for pre-acquiring a parameter required for a RoHC initialization procedure in a unidirectional transmission system.

In accordance with an aspect of the present invention, the above and other objects can be accomplished by the provision of a method for transmitting a broadcast signal, the method including encoding broadcast data, generating a packet including the encoded broadcast data, generating a robust header compression (RoHC) packet by performing RoHC on a header of the generated packet, generating fast information including configuration information of a broadcast stream and broadcast service related information and transmitting the fast information through a second channel, and transmitting the broadcast stream including the generated RoHC packet through a second channel.

The fast information may include RoHC initialization information for initialization of information about the RoHC.

The RoHC initialization information may include context identification information for identification of context indicating one or more RoHC packet units, context profile information indicating a range of a protocol for compression of a header of a RoHC packet, maximum context identification information indicating a maximum value of the context identification information, and large context identification information indicating representation format of the context identification information.

The RoHC initialization information may include at least one of feedback channel information indicating whether a backward channel for transmission of feedback information is present in a channel for transmission of a RoHC packet and maximum segment size information indicating a maximum size of one segment when a RoHC packet is segmented to one or more segments.

The RoHC initialization information may be included in a service level in the fast information.

The fast information may further include component related information included in a broadcast service, and the RoHC initialization information may be included in a component level in the fast information.

The RoHC initialization information may be included in a descriptor.

In accordance with another aspect of the present invention, there is provided a method for receiving a broadcast signal, the method including receiving fast information including configuration information of a broadcast stream and broadcast service related information through a first channel, receiving the broadcast stream including a robust header compression (RoHC) packet on which RoHC is performed, through a second channel, extracting a RoHC packet from the received broadcast stream using the received fast information and decompressing the extracted RoHC packet to generate an IP packet, extracting broadcast data from the generated IP packet, and decoding the extracted broadcast data.

The fast information may include RoHC initialization information for initialization of information about the RoHC.

The RoHC initialization information may include context identification information for identification of context indicating one or more RoHC packet units, context profile information indicating a range of a protocol for compression of a header of a RoHC packet, maximum context identification information indicating a maximum value of the context identification information, and large context identification information indicating representation format of the context identification information.

The RoHC initialization information may include at least one of feedback channel information indicating whether a backward channel for transmission of feedback information is present in a channel for transmission of a RoHC packet and maximum segment size information indicating a maximum size of one segment when a RoHC packet is segmented to one or more segments.

The RoHC initialization information may be included in a service level in the fast information.

The fast information may further include component related information included in a broadcast service, and the RoHC initialization information may be included in a component level in the fast information.

The RoHC initialization information may be included in a descriptor.

In accordance with another aspect of the present invention, there is provided an apparatus for transmitting a broadcast signal, the apparatus including an encoder for encoding broadcast data, a packet generator for generating a packet including the encoded broadcast data, a robust header compression (RoHC) compressor for generating a RoHC packet by performing RoHC on a header of the generated packet, a first transmitter for generating fast information including configuration information of a broadcast stream and broadcast service related information and transmitting the fast information through a first channel, and a second transmitter for transmitting the broadcast stream including the generated RoHC packet through a second channel.

In accordance with another aspect of the present invention, there is provided an apparatus for receiving a broadcast signal, the apparatus including a first receiver for receiving fast information including configuration information of a broadcast stream and broadcast service related information through a first channel, a second receiver for receiving the broadcast stream including a robust header compression (RoHC) packet on which RoHC is performed, through a second channel, a RoHC decompressor for extracting a RoHC packet from the received broadcast stream using the received fast information and decompressing the extracted RoHC packet to generate an IP packet, an extractor for extracting broadcast data from the generated IP packet, and a decoder for decoding the extracted broadcast data.

Advantageous Effects

According to the present invention, a broadcast signal including a robust header compression (RoHC) packet stream and fast information can be transmitted and received.

According to the present invention, a RoHC initialization procedure can be performed in a unidirectional transmission system.

According to the present invention, a parameter required for a RoHC initialization procedure can be transmitted in a unidirectional transmission system.

According to the present invention, a parameter required for a RoHC initialization procedure can be pre-acquired in a unidirectional transmission system.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 29 illustrates interleaved XFECBLOCKs from each interleaving array according to an embodiment of the present invention.

FIG. 32 is a view illustrating a broadcast transport frame according to an embodiment of the present invention.

FIG. 33 is a view of a broadcast transport frame according to another embodiment of the present invention.

FIG. 34 illustrates a syntax of a fast information chunk according to an embodiment of the present invention.

FIG. 37 illustrates a syntax of a fast information chunk according to another embodiment of the present invention.

FIG. 38 illustrates a syntax of a fast information chunk according to another embodiment of the present invention.

FIG. 39 illustrates a syntax of a fast information chunk according to another embodiment of the present invention.

FIG. 40 illustrates a syntax of a fast information chunk according to another embodiment of the present invention.

FIG. 45 illustrates a syntax of a fast information table according to an embodiment of the present invention.

FIG. 46 illustrates a syntax of a fast information table according to another embodiment of the present invention.

FIG. 47 illustrates a syntax of a fast information table according to another embodiment of the present invention.

FIG. 48 illustrates a syntax of a fast information table according to another embodiment of the present invention.

FIG. 49 is a diagram illustrating configuration of ROHC_init_descriptor( ) according to an embodiment of the present invention.

FIG. 50 is a diagram illustrating configuration of Fast_Information_Chunk( ) including ROHC_init_descriptor( ) according to an embodiment of the present invention.

FIG. 51 is a diagram illustrating configuration of Fast_Information_Chunk( ) including a parameter required for a RoHC initial procedure according to an embodiment of the present invention.

FIG. 52 is a diagram illustrating configuration of Fast_Information_Chunk( ) including ROHC_init_descriptor( ) according to another embodiment of the present invention.

FIG. 53 is a diagram illustrating configuration of Fast_Information_Chunk( ) including a parameter required for a RoHC initial procedure according to another embodiment of the present invention.

DETAILED DESCRIPTION OF THE EMBODIMENTS

Figure 1:
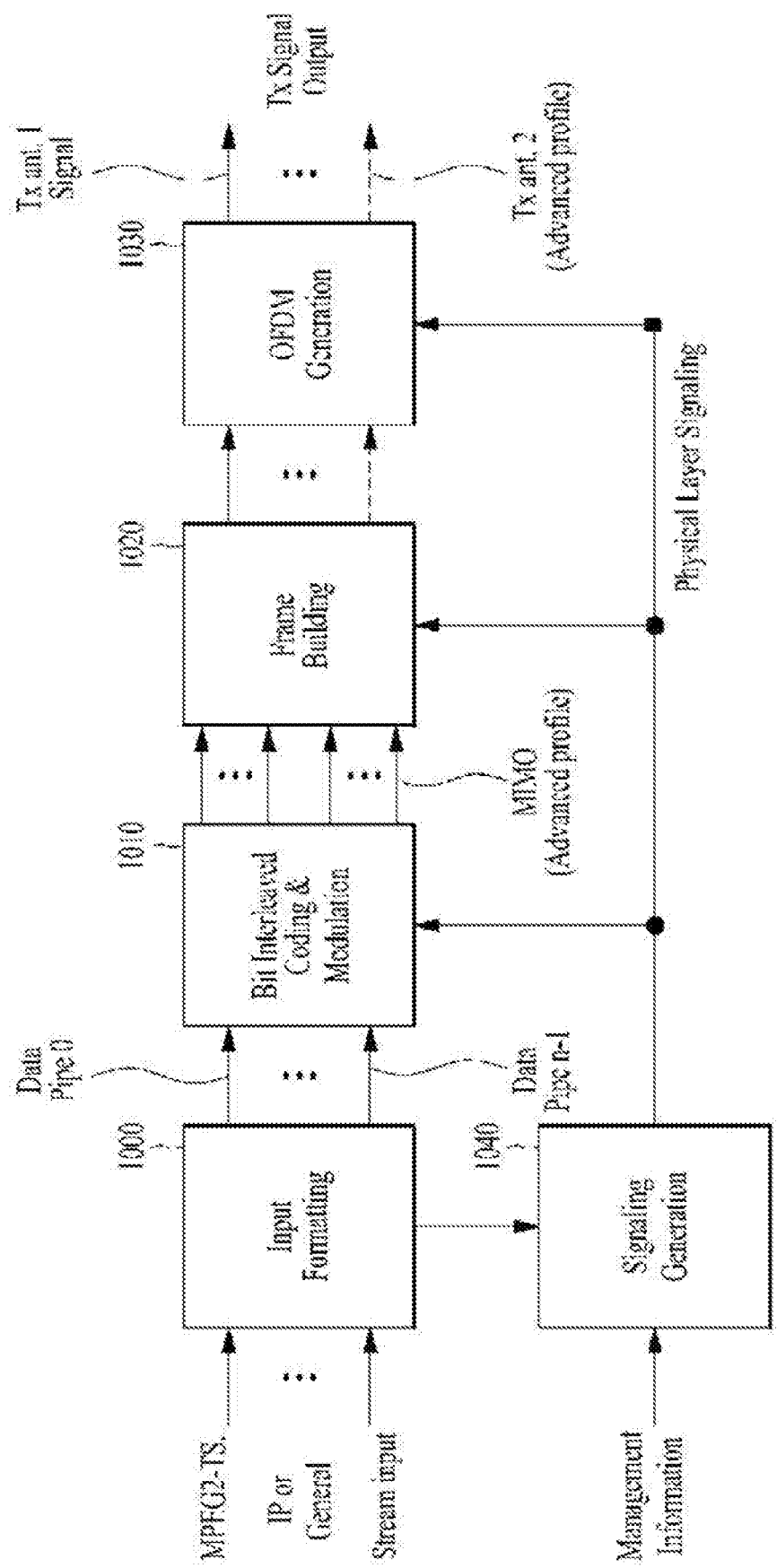
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

In this specification, 'signaling' indicates transport/reception of service information (SI) provided by a broadcasting system, an Internet broadcasting system, and/or a broadcasting/Internet convergence system. The service information includes broadcasting service information (for example, ATSC-SI and/or DVB-SI) provided by existing broadcasting systems.

In this specification, a 'broadcast signal' is defined as a concept including a signal and/or data provided in bidirectional broadcasting, such as Internet broadcasting, broadband broadcasting, communication broadcasting, data broadcasting, and/or Video On Demand (VOD), in addition to terrestrial broadcasting, cable broadcasting, satellite broadcasting, and/or mobile broadcasting.

In this specification, 'PLP' means a fixed unit for transporting data belonging to a physical layer. Consequently, an element named 'PLP' may also be named a 'data unit' or a 'data pipe'.

One of the powerful applications utilized in a digital broadcasting (DTV) service may be a hybrid broadcasting service based on interlocking between a broadcasting network and an Internet network. In the hybrid broadcasting service, enhancement data associated with broadcast audio/video (A/V) content transported through a terrestrial broadcasting network or a portion of the broadcast A/V content is transported through the Internet network in real time such that users can experience various kinds of content.

It is an object of the present invention to propose a method of encapsulating an IP packet, an MPEG-2 TS packet, and a packet that can be used in other broadcasting system such that the packets can be delivered to a physical layer in a next generation digital broadcasting system. In addition, the present invention also proposes a method of transporting layer 2 signaling with the same header format.

The following procedures may be realized by an apparatus. For example, a signaling processing unit, a protocol processing unit, a processor, and/or a packet generation unit may perform the following procedures.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc.

The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may define three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators.

base data pipe: data pipe that carries service signaling data.

baseband frame (or BBFRAME): set of Kbch bits which form the input to one FEC encoding process (BCH and LDPC encoding).

cell: modulation value that is carried by one carrier of the OFDM transmission.

coded block: LDPC-encoded block of PLS1 data or one of the LDPC-encoded blocks of PLS2 data.

data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol).

DP_ID: this 8 bit field identifies uniquely a DP within the system identified by the SYSTEM_ID.

dummy cell: cell carrying a pseudorandom value used to fill the remaining capacity not used for PLS signaling, DPs or auxiliary streams.

emergency alert channel: part of a frame that carries EAS information data.

frame: physical layer time slot that starts with a preamble and ends with a frame edge symbol.

frame repetition unit: a set of frames belonging to same or different physical layer profile including a FEF, which is repeated eight times in a super-frame.

fast information channel: a logical channel in a frame that carries the mapping information between a service and the corresponding base DP.

FECBLOCK: set of LDPC-encoded bits of a DP data.

FFT size: nominal FFT size used for a particular mode, equal to the active symbol period Ts expressed in cycles of the elementary period T.

frame signaling symbol: OFDM symbol with higher pilot density used at the start of a frame in certain combinations of FFT size, guard interval and scattered pilot pattern, which carries a part of the PLS data.

frame edge symbol: OFDM symbol with higher pilot density used at the end of a frame in certain combinations of FFT size, guard interval and scattered pilot pattern.

frame-group: the set of all the frames having the same PHY profile type in a super-frame.

future extension frame: physical layer time slot within the super-frame that could be used for future extension, which starts with a preamble.

Futurecast UTB system: proposed physical layer broadcasting system, of which the input is one or more MPEG2-TS or IP or general stream(s) and of which the output is an RF signal.

input stream: A stream of data for an ensemble of services delivered to the end users by the system.

normal data symbol: data symbol excluding the frame signaling symbol and the frame edge symbol.

PHY profile: subset of all configurations that a corresponding receiver should implement.

PLS: physical layer signaling data consisting of PLS1 and PLS2.

PLS1: a first set of PLS data carried in the FSS symbols having a fixed size, coding and modulation, which carries basic information about the system as well as the parameters needed to decode the PLS2.

NOTE: PLS1 data remains constant for the duration of a frame-group.

PLS2: a second set of PLS data transmitted in the FSS symbol, which carries more detailed PLS data about the system and the DPs.

PLS2 dynamic data: PLS2 data that may dynamically change frame-by-frame.

PLS2 static data: PLS2 data that remains static for the duration of a frame-group.

preamble signaling data: signaling data carried by the preamble symbol and used to identify the basic mode of the system.

preamble symbol: fixed-length pilot symbol that carries basic PLS data and is located in the beginning of a frame.

NOTE: The preamble symbol is mainly used for fast initial band scan to detect the system signal, its timing, frequency offset, and FFTsize.

reserved for future use: not defined by the present document but may be defined in future.

superframe: set of eight frame repetition units.

time interleaving block (TI block): set of cells within which time interleaving is carried out, corresponding to one use of the time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion.

Type 2 DP: DP of a frame where all DPs are mapped into the frame in FDM fashion.

XFECBLOCK: set of Ncells cells carrying all the bits of one LDPC FECBLOCK.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
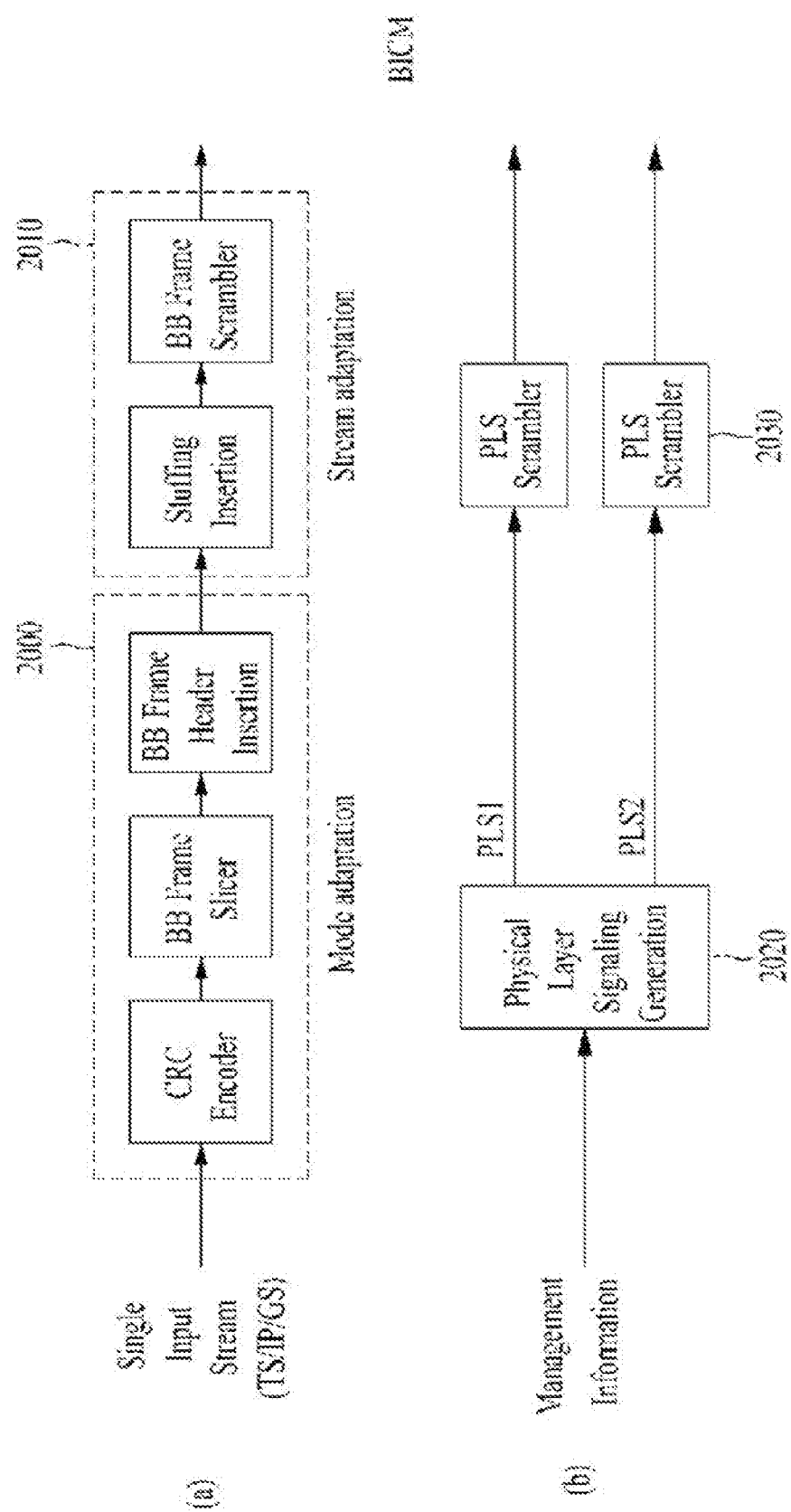
FIG. 2 illustrates an input formatting block according to one embodiment of the present invention.
Figure 3:
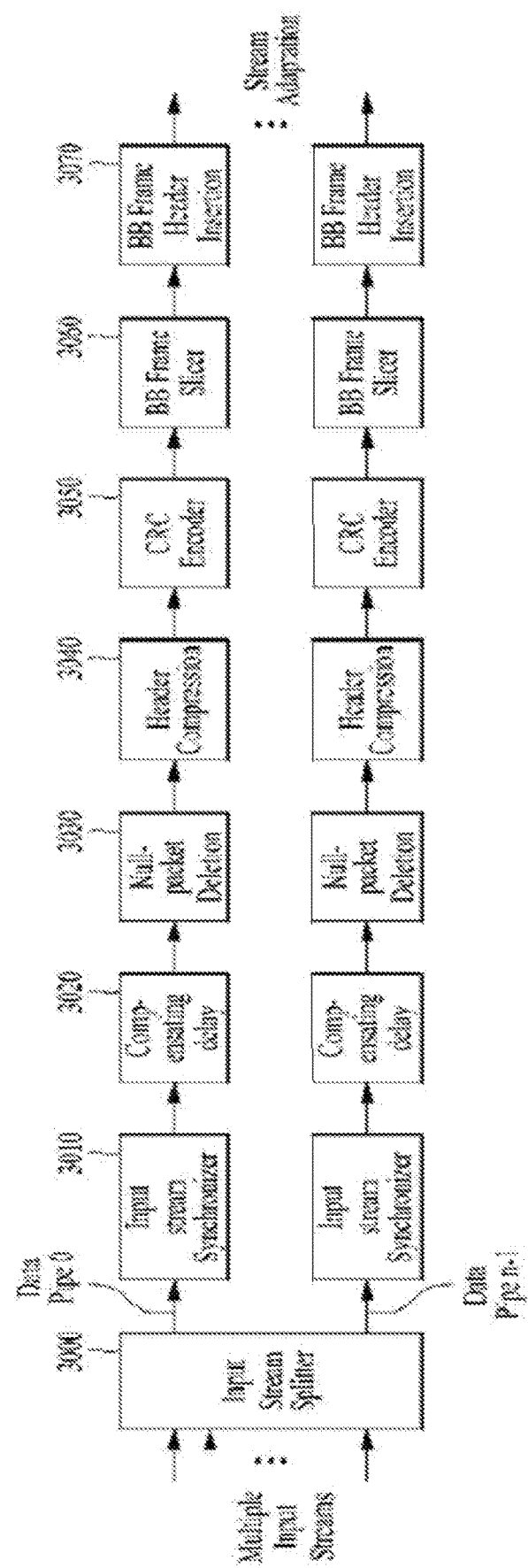
FIG. 3 illustrates an input formatting block according to another embodiment of the present invention.
Figure 4:
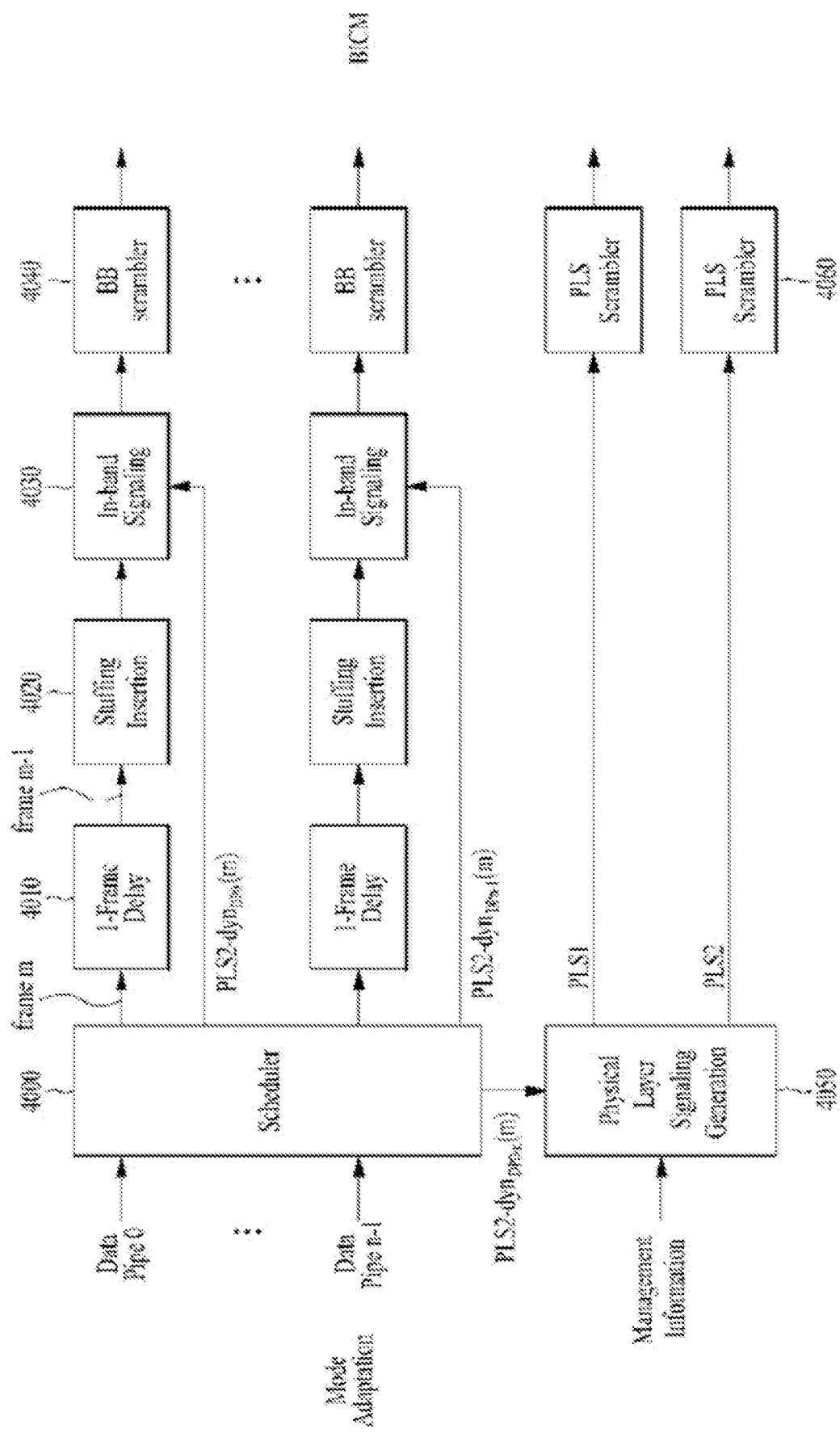
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, a 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generates the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
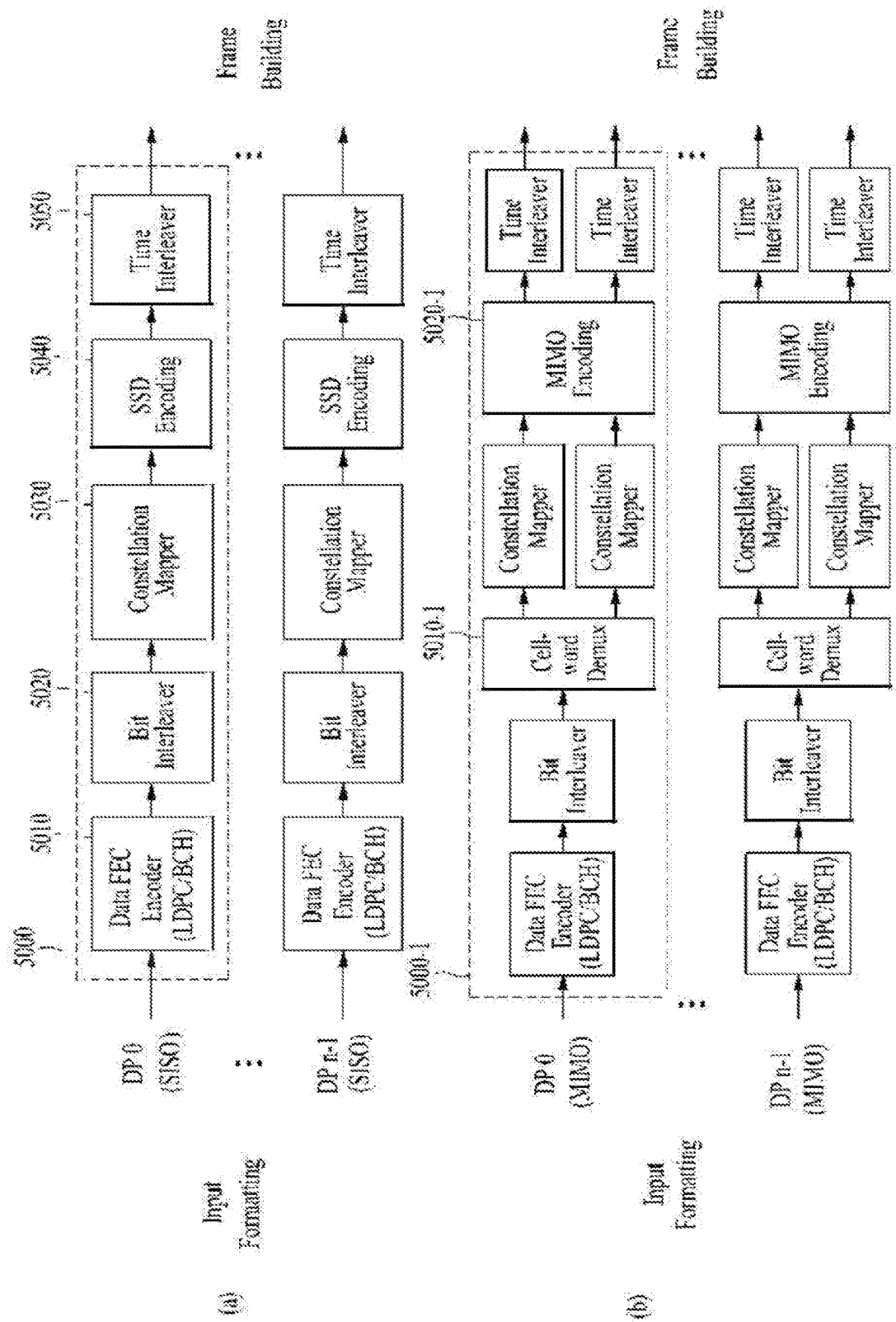
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

Figure 6:
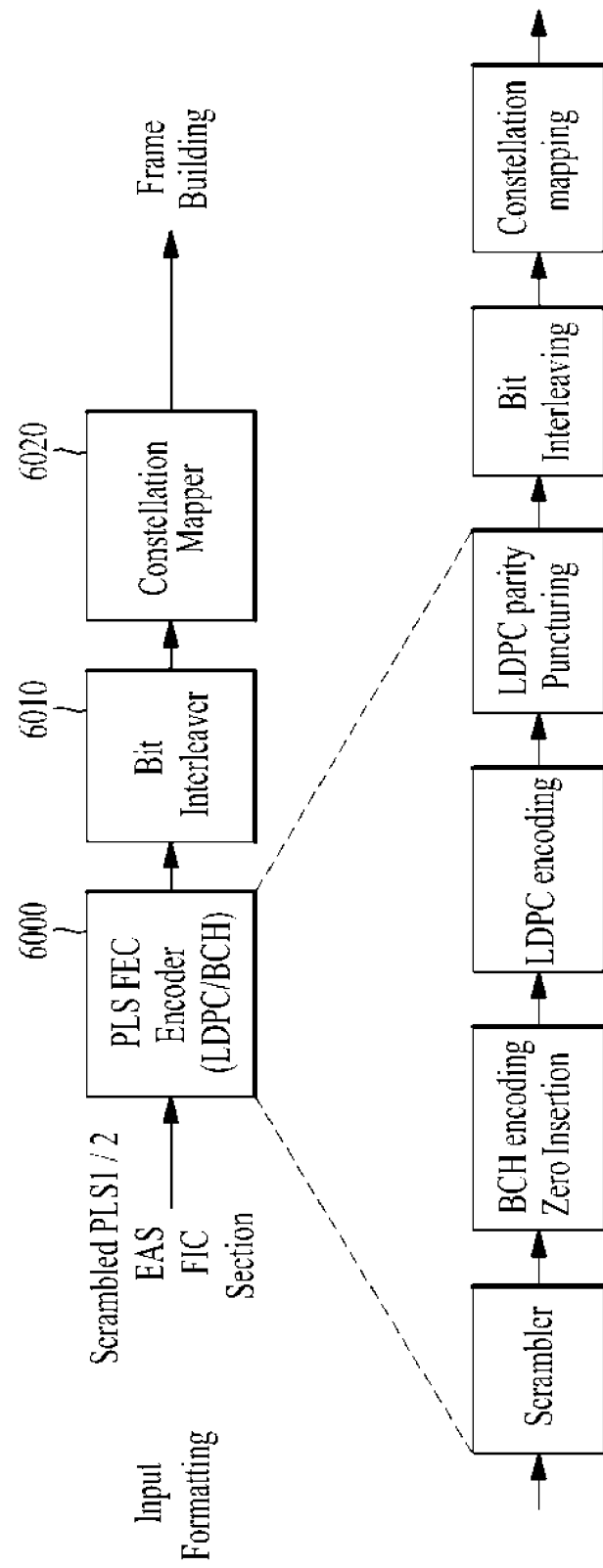
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 1]

The LDPC code parameters for PLS1 and PLS2 are as following table 4.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 7:
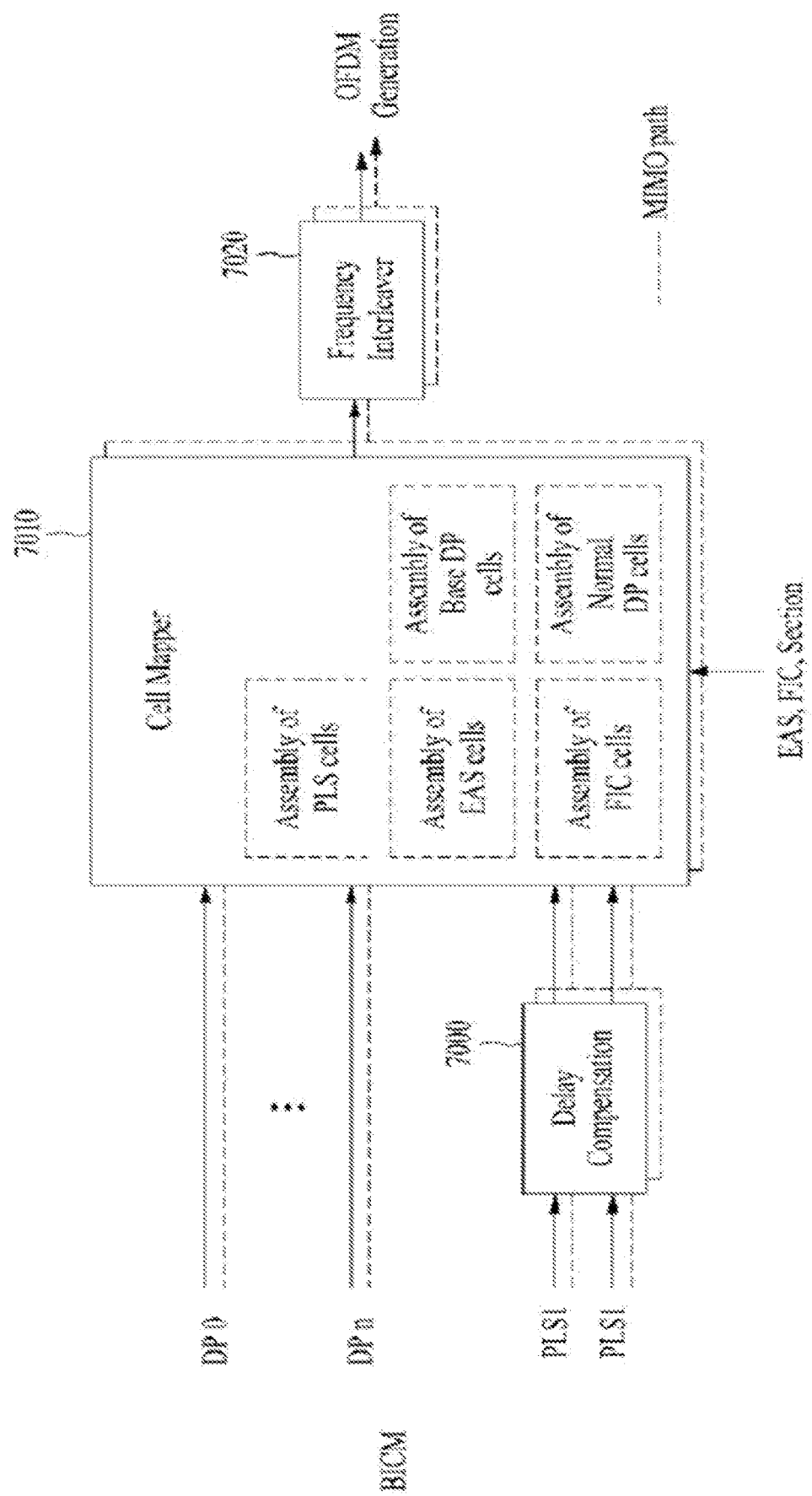
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

Figure 8:
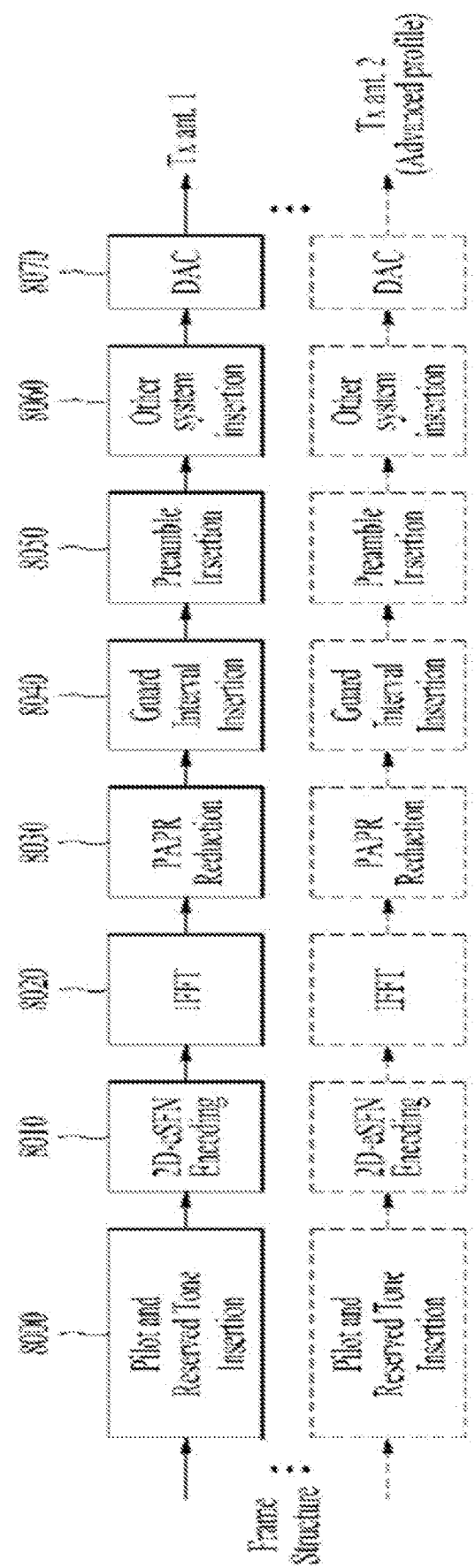
FIG. 8 illustrates an OFDM generation block according to an embodiment of the present invention.

FIG. 8 illustrates an OFDM generation block according to an embodiment of the present invention.

The OFDM generation block illustrated in FIG. 8 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/ reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
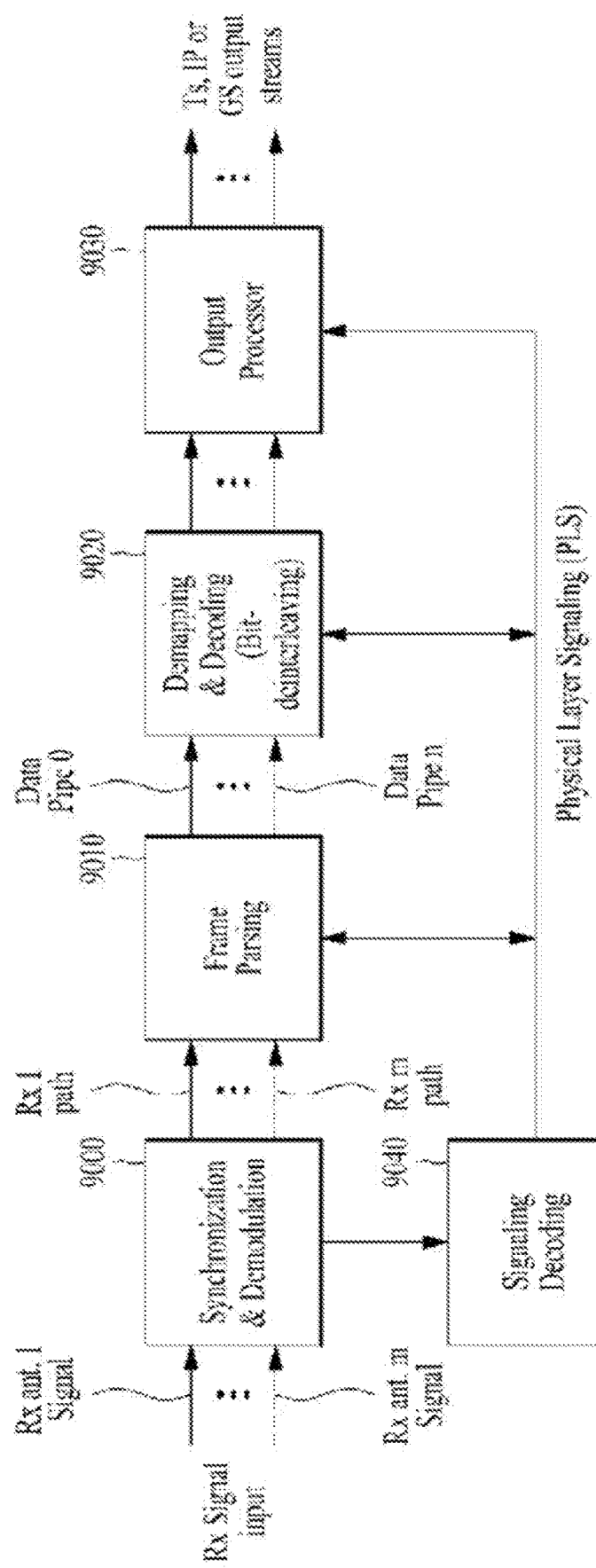
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 10:
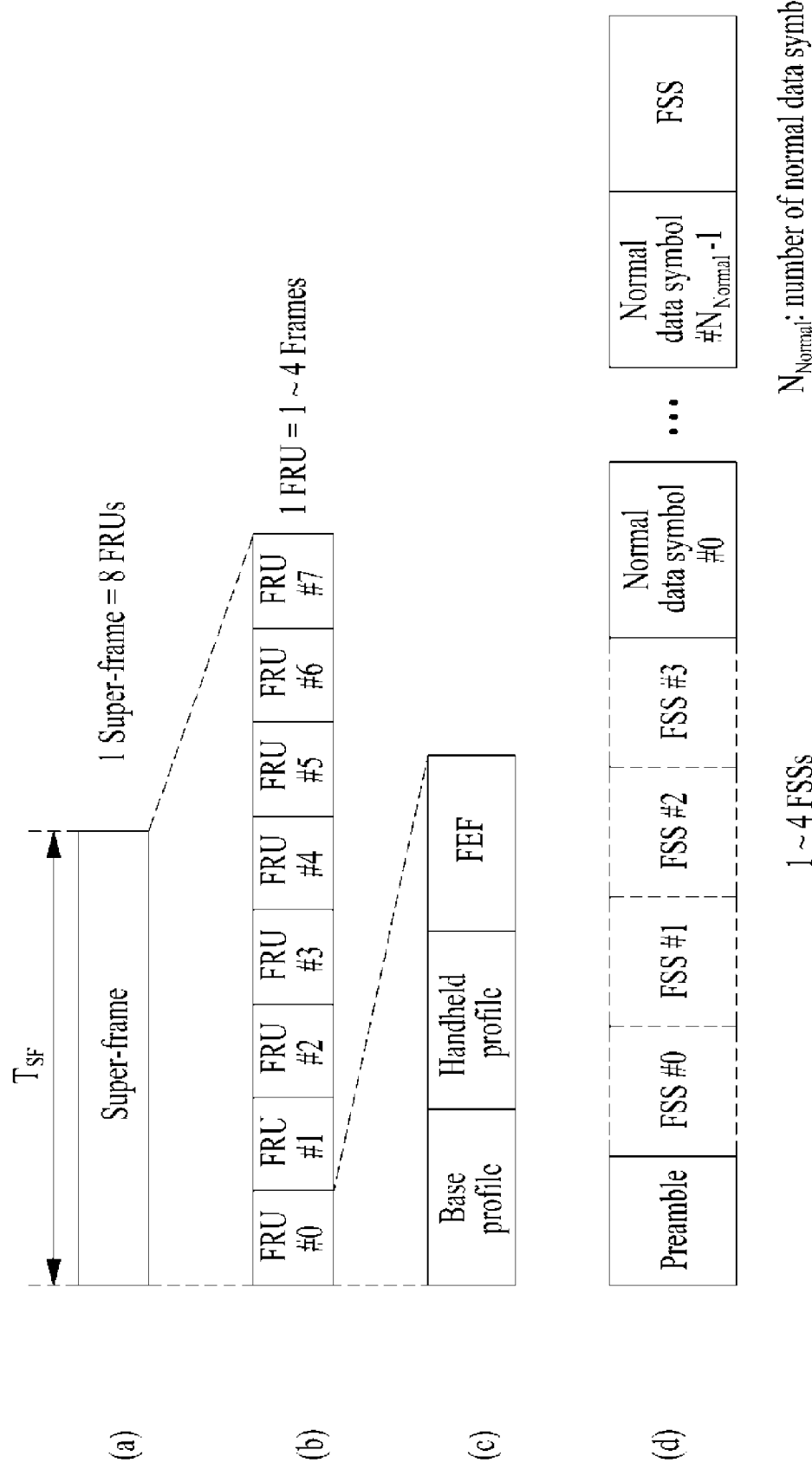
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figure 11:
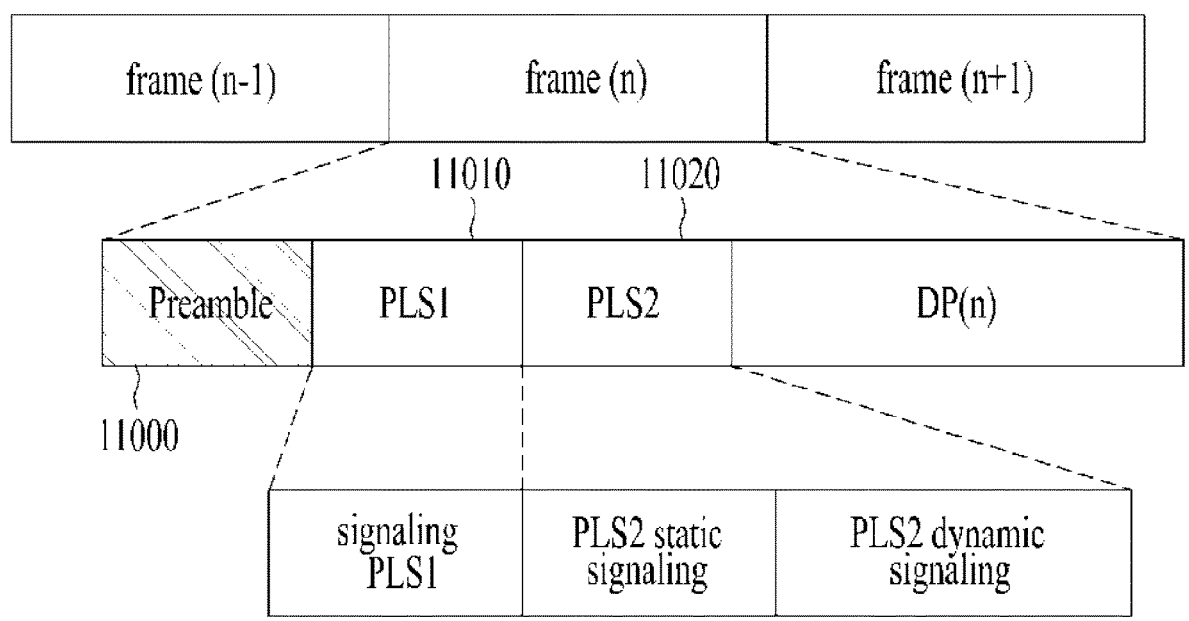
FIG. 11 illustrates a signaling hierarchy structure of the frame according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
| --- | --- |
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
| --- | --- |
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
| --- | --- |
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT REP_SIZE_CELL: This 15-bit field indicates $C_{total\_full\_block}$. The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field.

PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data.

DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group ($N_{TI}=1$). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I=1$). The allowed $P_I$ values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAY-LOAD_TYPE Is TS | If DP_PAY-LOAD_TYPE Is IP | If DP_PAY-LOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |

TABLE 24-continued

| Value | ISSY mode |
|---|---|
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

Figure 16:
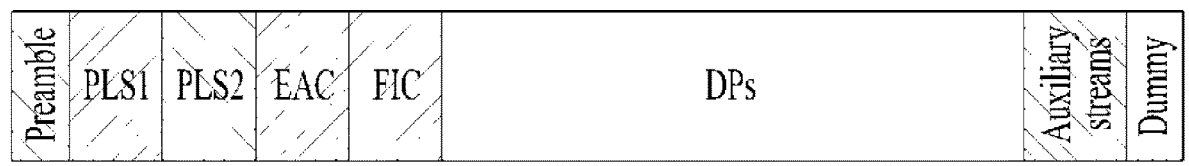
FIG. 16 illustrates a logical structure of a frame according to an embodiment of the present invention.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
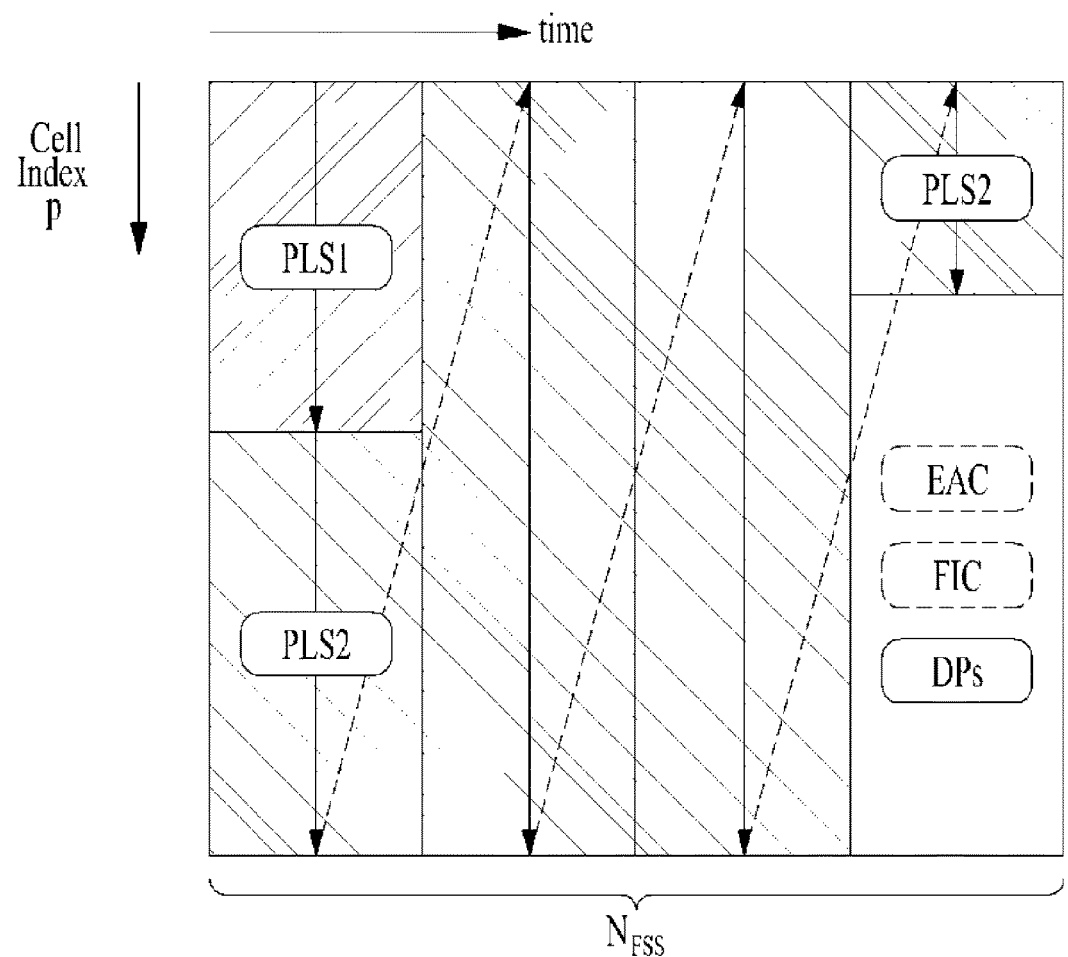
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
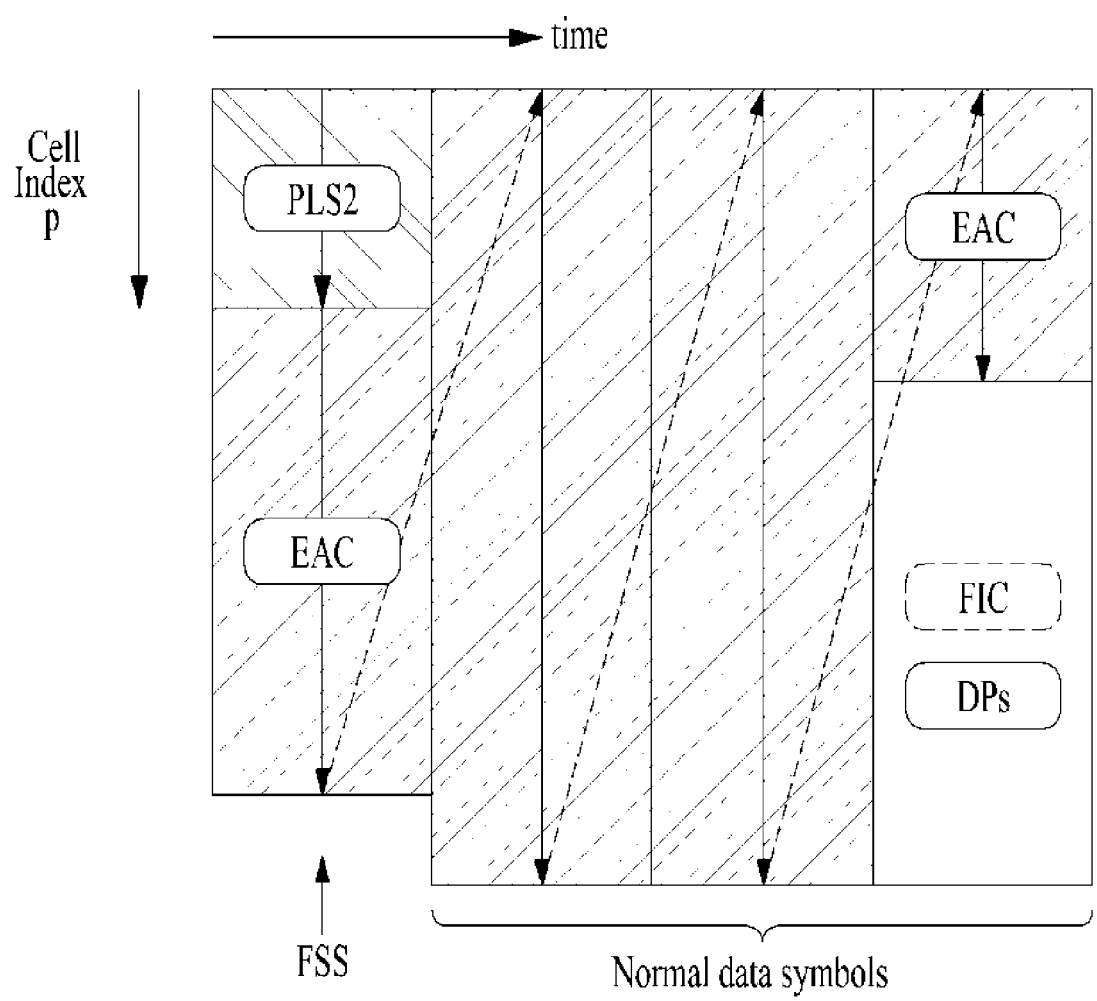
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
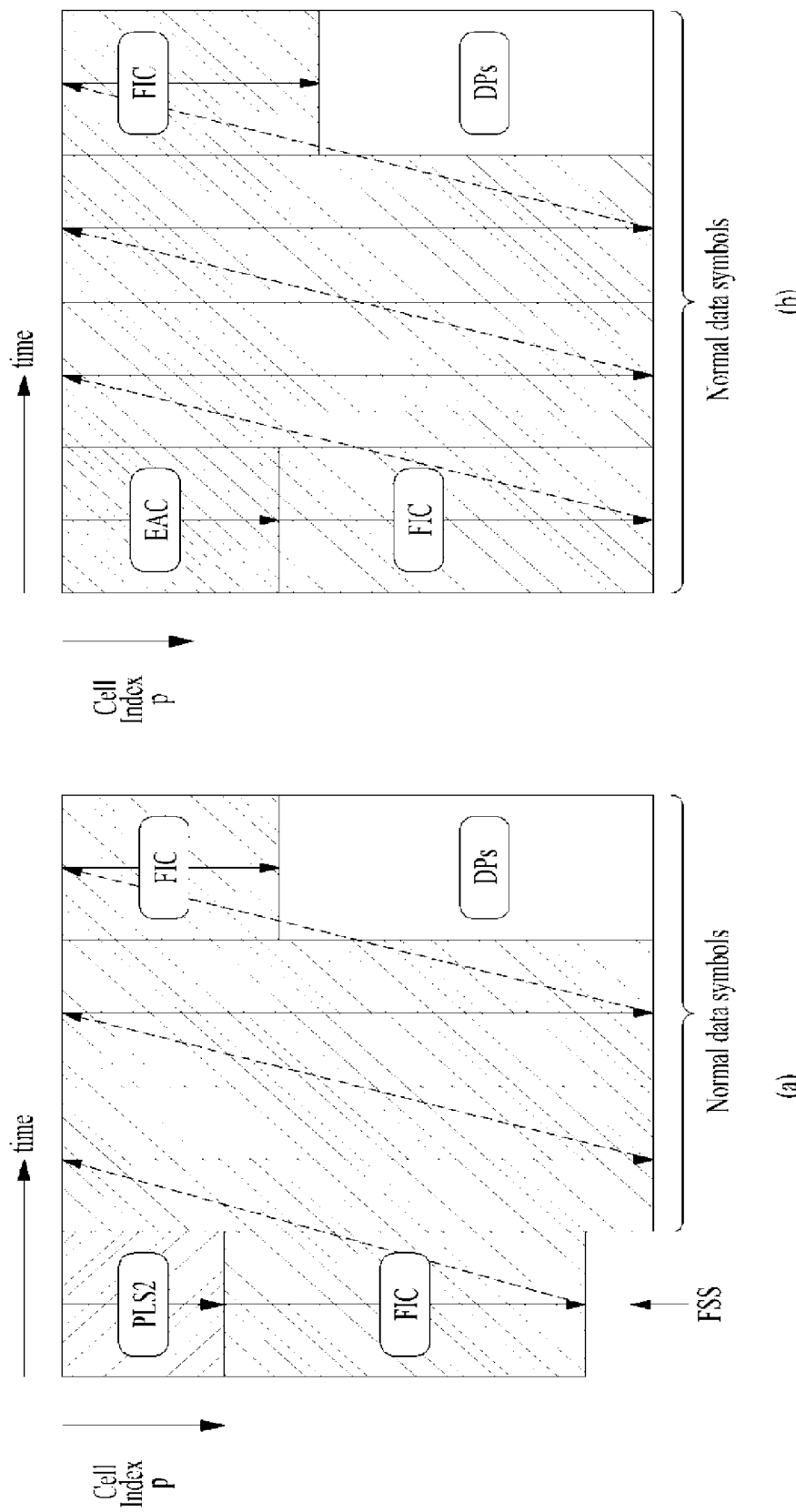
FIG. 19 illustrates FIC mapping according to an embodiment of the present invention.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
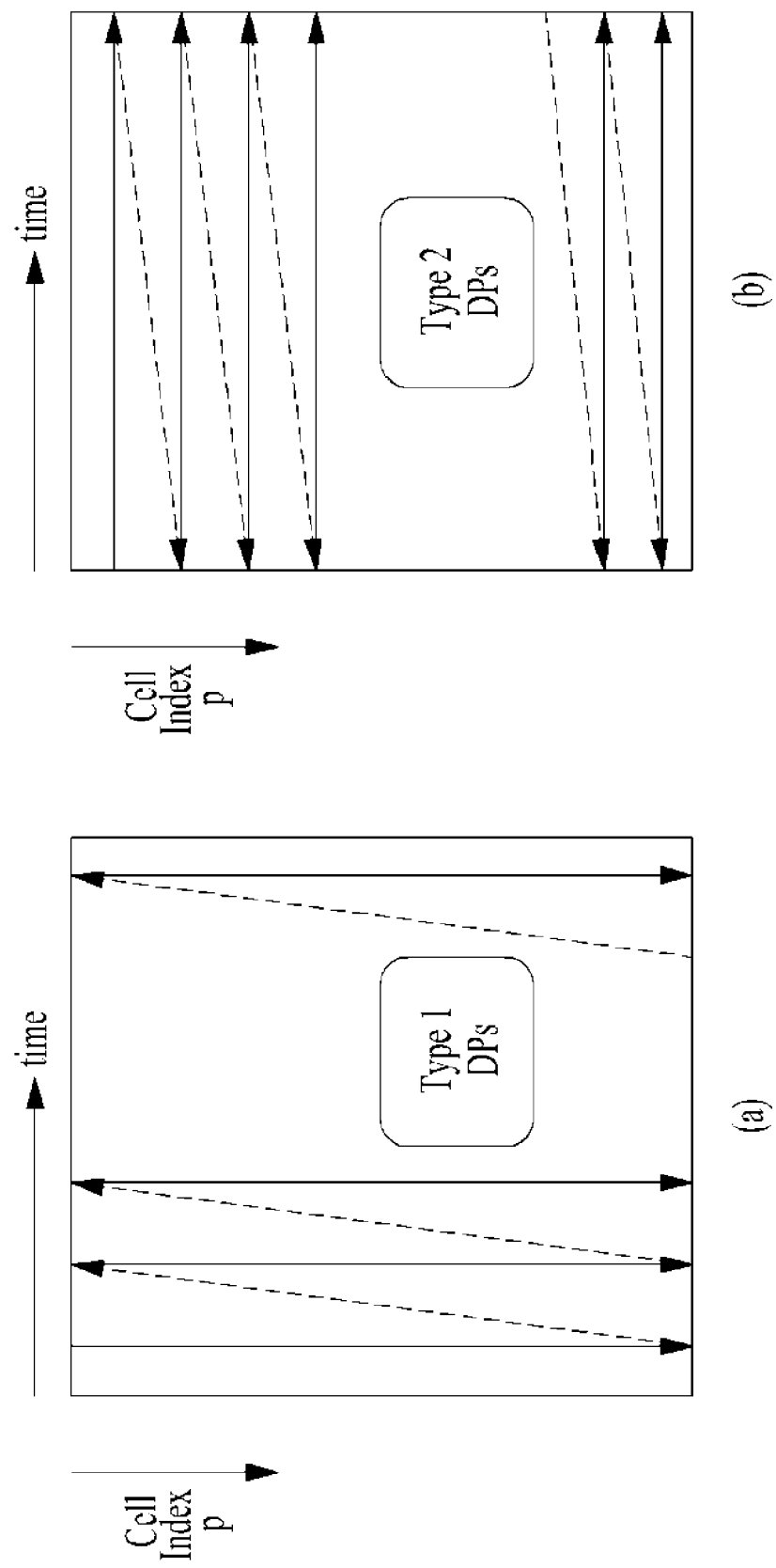
FIG. 20 illustrates a type of DP according to an embodiment of the present invention.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Math FIG. 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
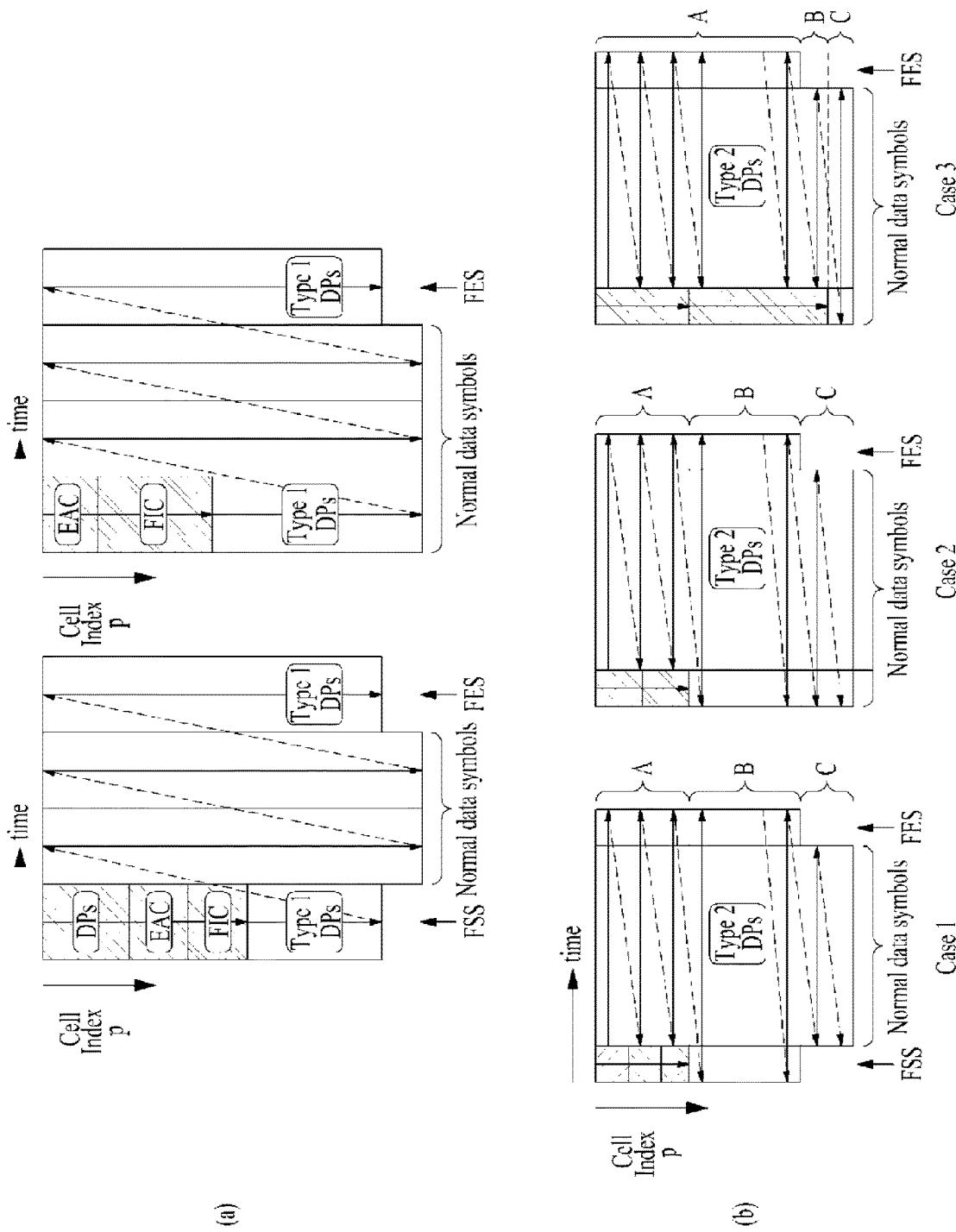
FIG. 21 illustrates DP mapping according to an embodiment of the present invention.

FIG. 21 illustrates DP mapping according to an embodiment of the present invention.

(a) shows an addressing of OFDM cells for mapping type 1 DPs and (b) shows an addressing of OFDM cells for mapping for type 2 DPs.

Addressing of OFDM cells for mapping Type 1 DPs (0, . . . , DDP11) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP21) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

Figure 22:
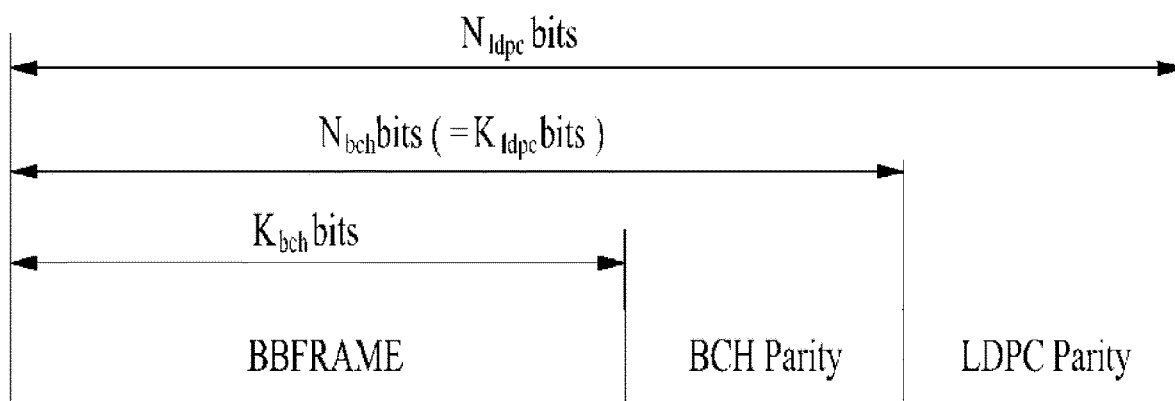
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed Bldpc (FECBLOCK) are expressed as follow Math figure.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 3]

The parameters for long FECBLOCK and short FECBLOCK are given in the above table 28 and 29, respectively.

The detailed procedure to calculate $N_{ldpc}-K_{ldpc}$ parity bits for long FECBLOCK, is as follows:

1) Initialize the parity bits, $$p_0 = p_1 = p_2 = \ldots = p_{N_{ldpc}-K_{ldpc}-1} = 0$$ [Math Figure 4]

2) Accumulate the first information bit—i0, at parity bit addresses specified in the first row of an addresses of parity check matrix. The details of addresses of parity check matrix will be described later. For example, for rate 13/15:

$$p_{983} = p_{983} \oplus i_0 \qquad p_{2815} = p_{2815} \oplus i_0$$ [Math Figure 5]
$$p_{4837} = p_{4837} \oplus i_0 \qquad p_{4989} = p_{4989} \oplus i_0$$
$$p_{6138} = p_{6138} \oplus i_0 \qquad p_{6458} = p_{6458} \oplus i_0$$
$$p_{6921} = p_{6921} \oplus i_0 \qquad p_{6974} = p_{6974} \oplus i_0$$
$$p_{7572} = p_{7572} \oplus i_0 \qquad p_{8260} = p_{8260} \oplus i_0$$
$$p_{8496} = p_{8496} \oplus i_0$$

3) For the next 359 information bits, $i_s$, s=1, 2, . . . , 359 accumulate is at parity bit addresses using following Math figure.

$$\{x + (s \bmod 360) \times Q_{ldpc}\} \bmod (N_{ldpc} - K_{ldpc})$$ [Math Figure 6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}=24$ for rate 13/15, so for information bit $i_1$, the following operations are performed:

$$p_{1007} = p_{1007} \oplus i_1 \qquad p_{2839} = p_{2839} \oplus i_1$$ [Math Figure 7]
$$p_{4861} = p_{4861} \oplus i_1 \qquad p_{5013} = p_{5013} \oplus i_1$$
$$p_{6162} = p_{6162} \oplus i_1 \qquad p_{6482} = p_{6482} \oplus i_1$$
$$p_{6945} = p_{6945} \oplus i_1 \qquad p_{6998} = p_{6998} \oplus i_1$$
$$p_{7596} = p_{7596} \oplus i_1 \qquad p_{8284} = p_{8284} \oplus i_1$$
$$p_{8520} = p_{8520} \oplus i_1$$

4) For the 361st information bit $i_{360}$, the addresses of the parity bit accumulators are given in the second row of the addresses of parity check matrix. In a similar manner the addresses of the parity bit accumulators for the following 359 information bits $i_s$, s=361, 362, . . . , 719 are obtained using the Math FIG. 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1.

$$p_i = p_i \oplus p_{i-1}, \; i=1,2, \ldots, N_{ldpc}-K_{ldpc}-1$$ [Math FIG. 8]

where final content of $p_i$, i=0, 1, . . . $N_{ldpc}-K_{ldpc}-1$ is equal to the parity bit $p_i$.

TABLE 30

| Code Rate | $Q_{ldpc}$ |
| --- | --- |
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
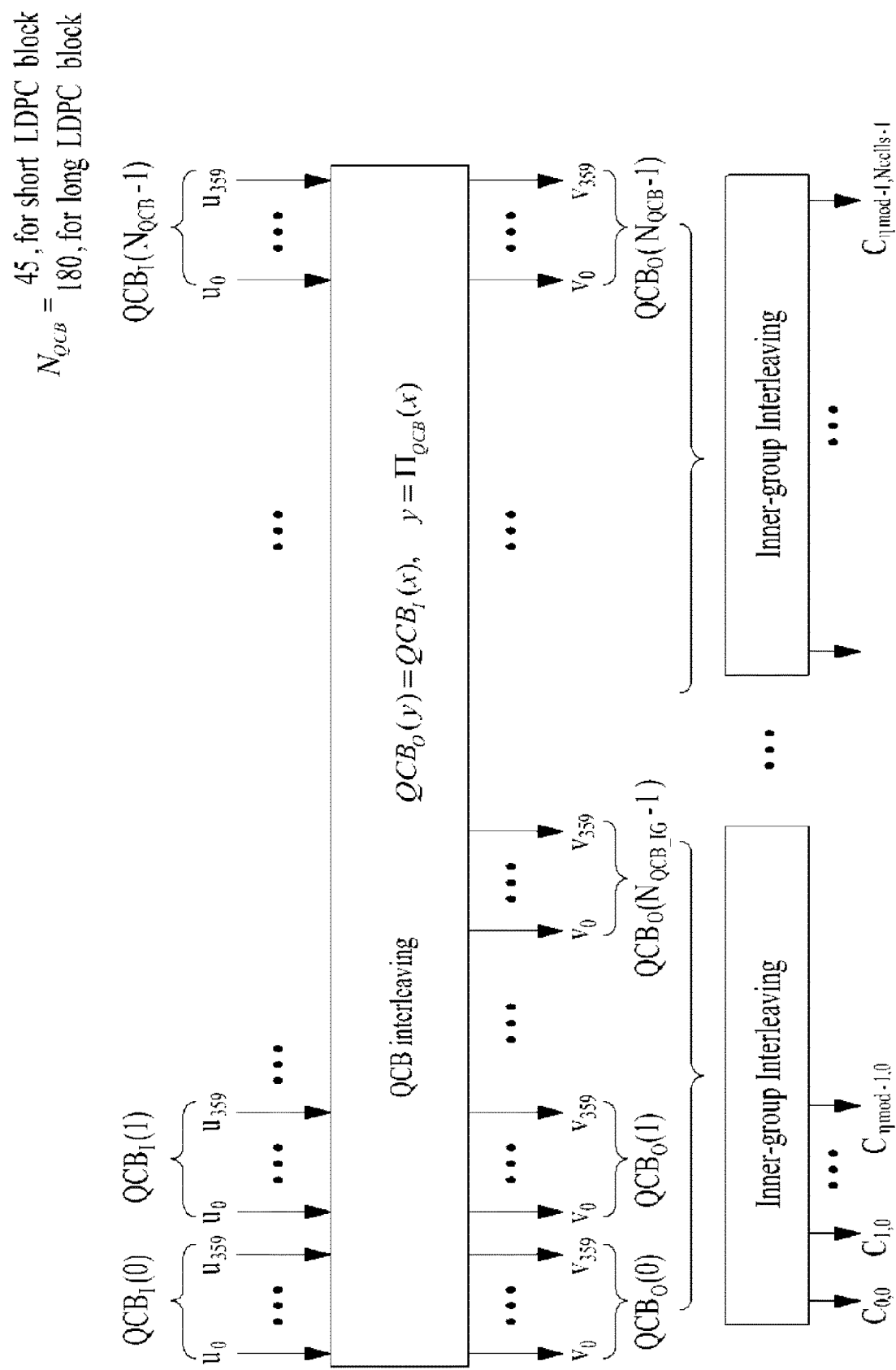
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells}=64800/\eta_{mod}$ or $16200/\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
| --- | --- | --- |
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |

TABLE 32-continued

| Modulation type | $\eta_{mod}$ | $N_{QCB\_IG}$ |
| --- | --- | --- |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

Figure 24:
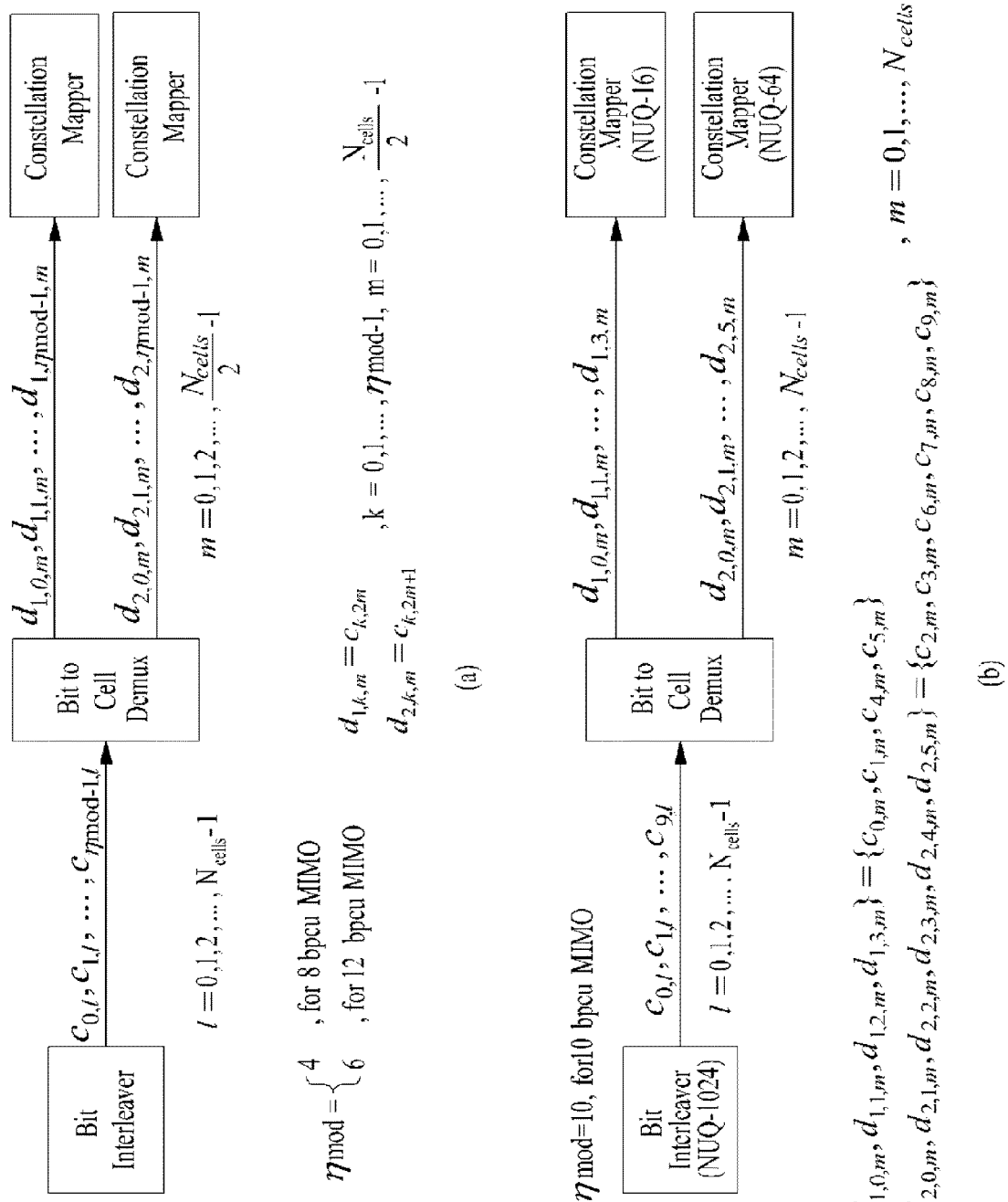
FIG. 24 illustrates a cell-word demultiplexing according to an embodiment of the present invention.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word $(c_{0,1}, c_{1,1}, \ldots, c_{\eta mod-1,1})$ of the bit interleaving output is demultiplexed into $(d_{1,0,m}, d_{1,1,m} \cdots d_{1,\eta mod-1,m})$ and $(d_{2,0,m}, d_{2,1,m} \cdots, d_{2,\eta mod-1,m})$ as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word $(c_{0,1}, c_{1,1}, \ldots, c_{9,1})$ of the Bit Interleaver output is demultiplexed into $(d_{1,0,m}, d_{1,1,m} \cdots, d_{1,3,m})$ and $(d_{2,0,m}, d_{2,1,m} \cdots, d_{2,5,m})$, as shown in (b).

Figure 25:
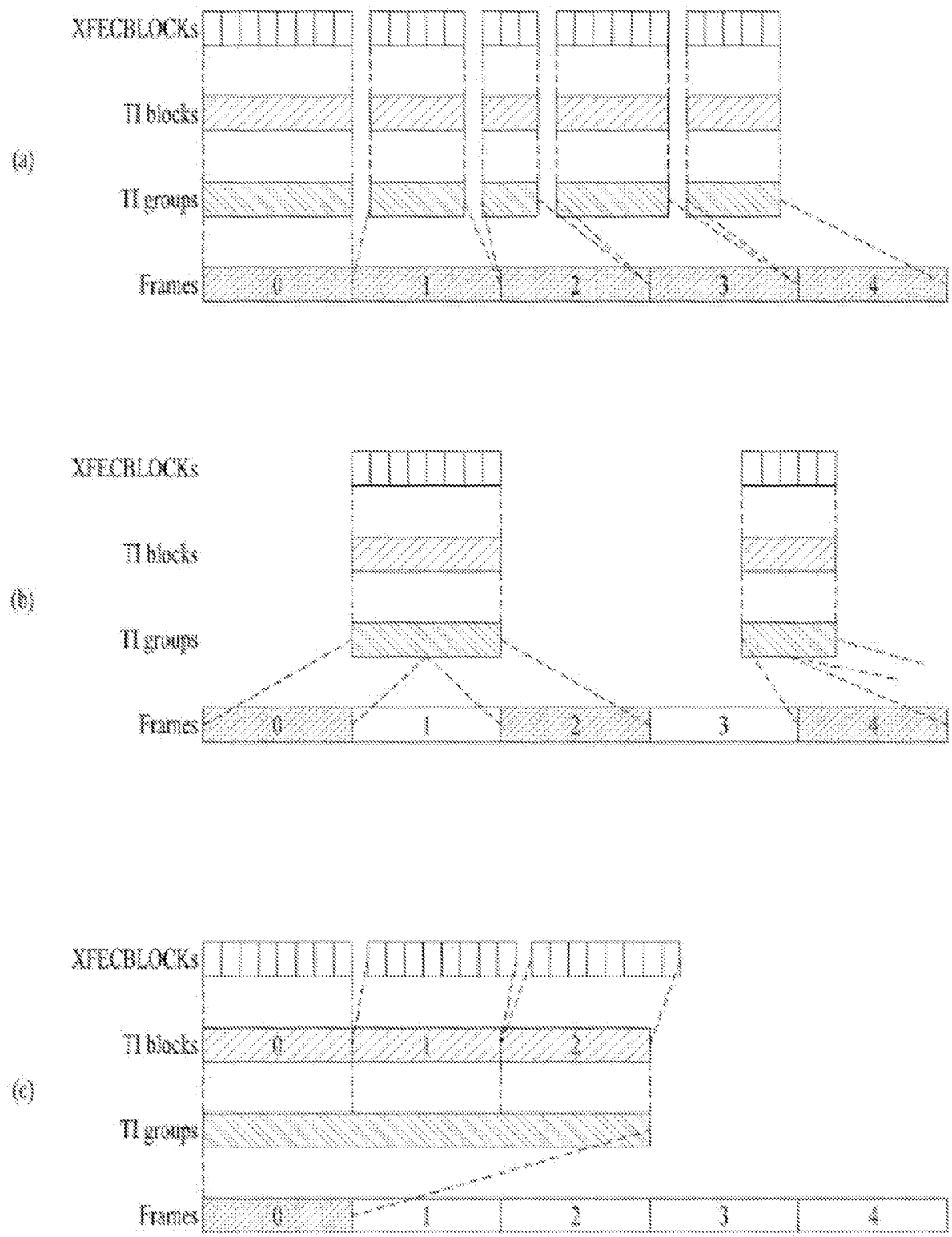
FIG. 25 illustrates a time interleaving according to an embodiment of the present invention.

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTT per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames HUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_Max}$ (corresponding to DP_NUM_BLOCK_MAX) of which the largest value is 1023.

Each TI group is either mapped directly onto one frame or spread over $P_I$ frames. Each TI group is also divided into more than one TI blocks($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

In each DP, the TI memory stores the input XFECBLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,N_{cells}-1}, d_{n,s,1,0}, \ldots, d_{n,s,1,N_{cells}-1}, \ldots,$$
$$d_{n,s,N_{xBLOCK\_n}(n,s)-1,0}, \ldots, d_{n,s,N_{xBLOCK\_n}(n,s)-1, N_{cells}-1}),$$

where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q}, & \text{the output of SSD encoding} \\ g_{n,s,r,q}, & \text{the output of MIMO encoding} \end{cases}$$

In addition, assume that output XFECBLOCKs from the time interleaver are defined as $$(h_{n,s,0}, h_{n,s,1}, \ldots, h_{n,s,i}, \ldots, h_{n,s,N_{xBLOCK\_n}(n,s) \times N_{cells}-1}),$$

where $h_{n,s,i}$ is the ith output cell (for i=0, ..., $N_{xBLOCK\_TI}(n,s) \times N_{cells}-1$) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$.

Figure 26:
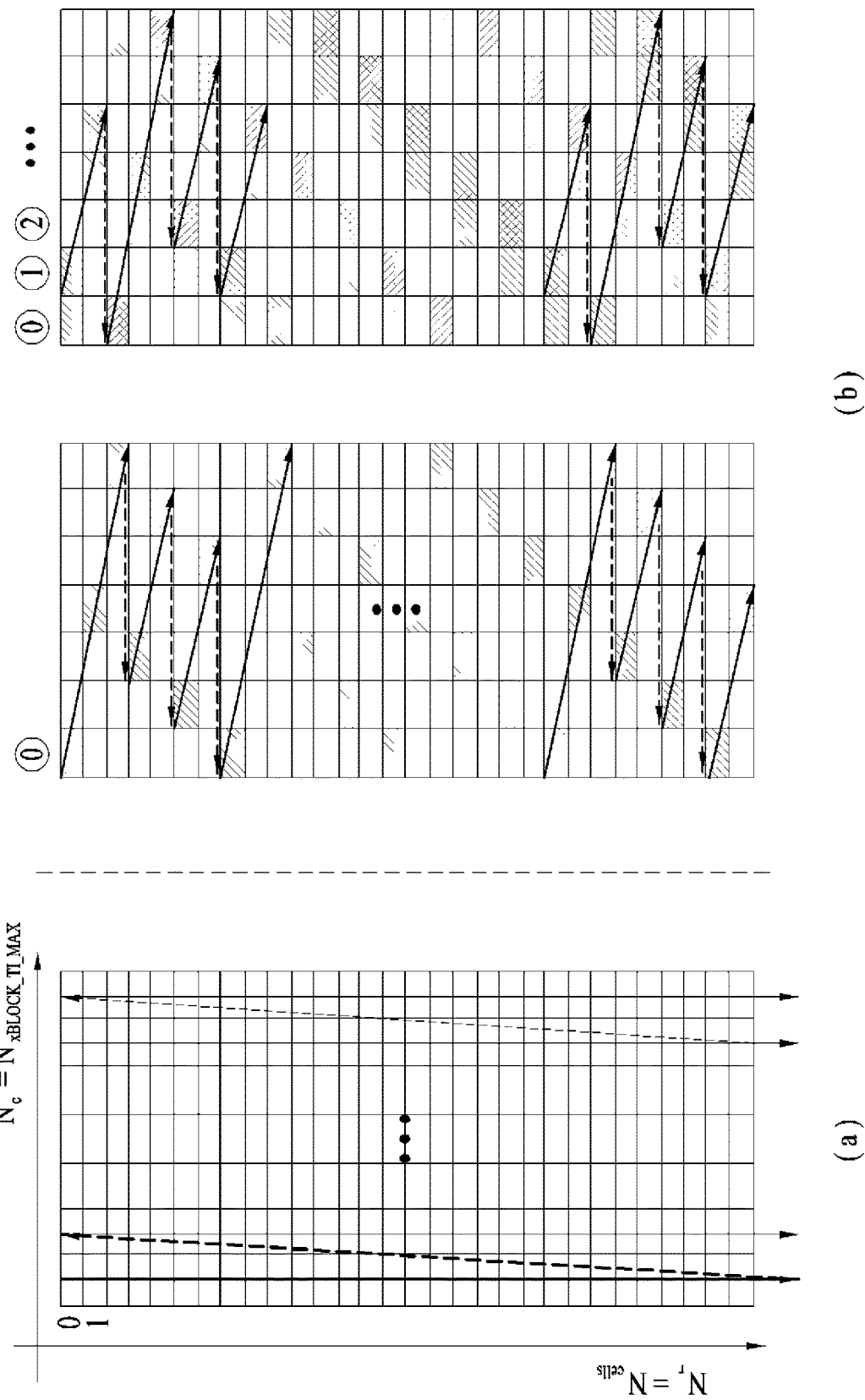
FIG. 26 illustrates the basic operation of a twisted row-column block interleaver according to an embodiment of the present invention.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$\text{GENERATE } (R_{n,s,i}, C_{n,s,i}) = \quad \text{[Math Figure 9]}$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

for [Math Figure 10]

$$\begin{cases} N'_{xBLOCK\_TI\_MAX} = & \text{if } N_{xBLOCK\_TI\_MAX} \mod 2 = 0 \\ N_{xBLOCK\_TI\_MAX} + 1, \\ N'_{xBLOCK\_TI\_MAX} = & \text{if } N_{xBLOCK\_TI\_MAX} \mod 2 = 1 \\ N_{xBLOCK\_TI\_MAX}, \end{cases}$$

$$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

Figure 27:
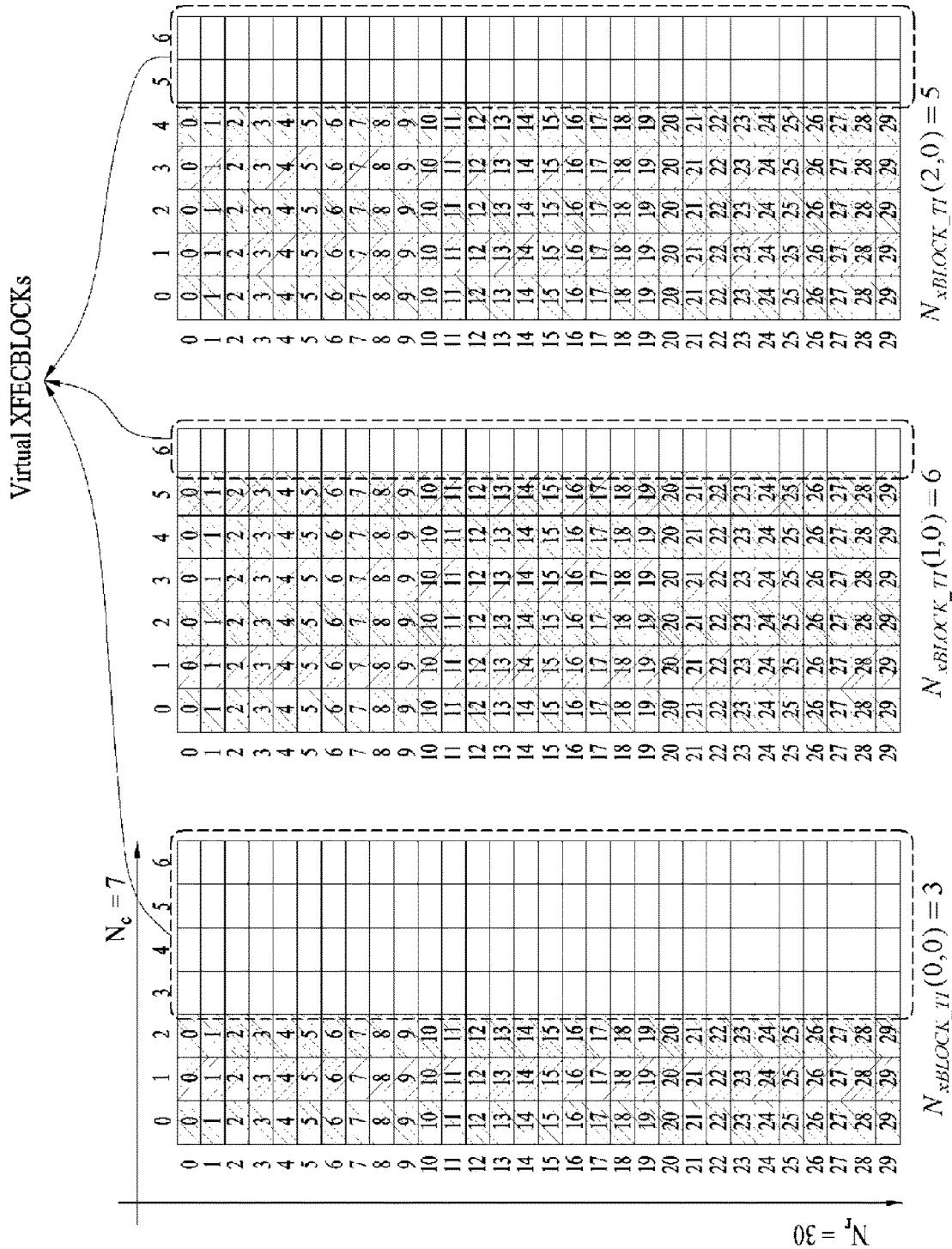
FIG. 27 illustrates an operation of a twisted row-column block interleaver according to another embodiment of the present invention.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N_{xBLOCK\_TI\_MAX}{'}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N_{xBLOCK\_TI\_MAX}{'}$ by inserting the virtual XFECBLOCKs into the TI memory and the reading process is accomplished as follow expression.

[Math Figure 11]

```
p = 0;
for i = 0; i < N_cells N'_xBLOCK_TI_MAX; i = i + 1
{GENERATE(R_{n,s,j}, C_{n,s,j});
V_i = N_r C_{n,s,j} + R_{n,s,j}
  if V_i < N_cells N_xBLOCK_TI(n,s)
  {
    Z_{n,s,p} = V_i; p = p + 1;
  }
}
```

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

Figure 28:
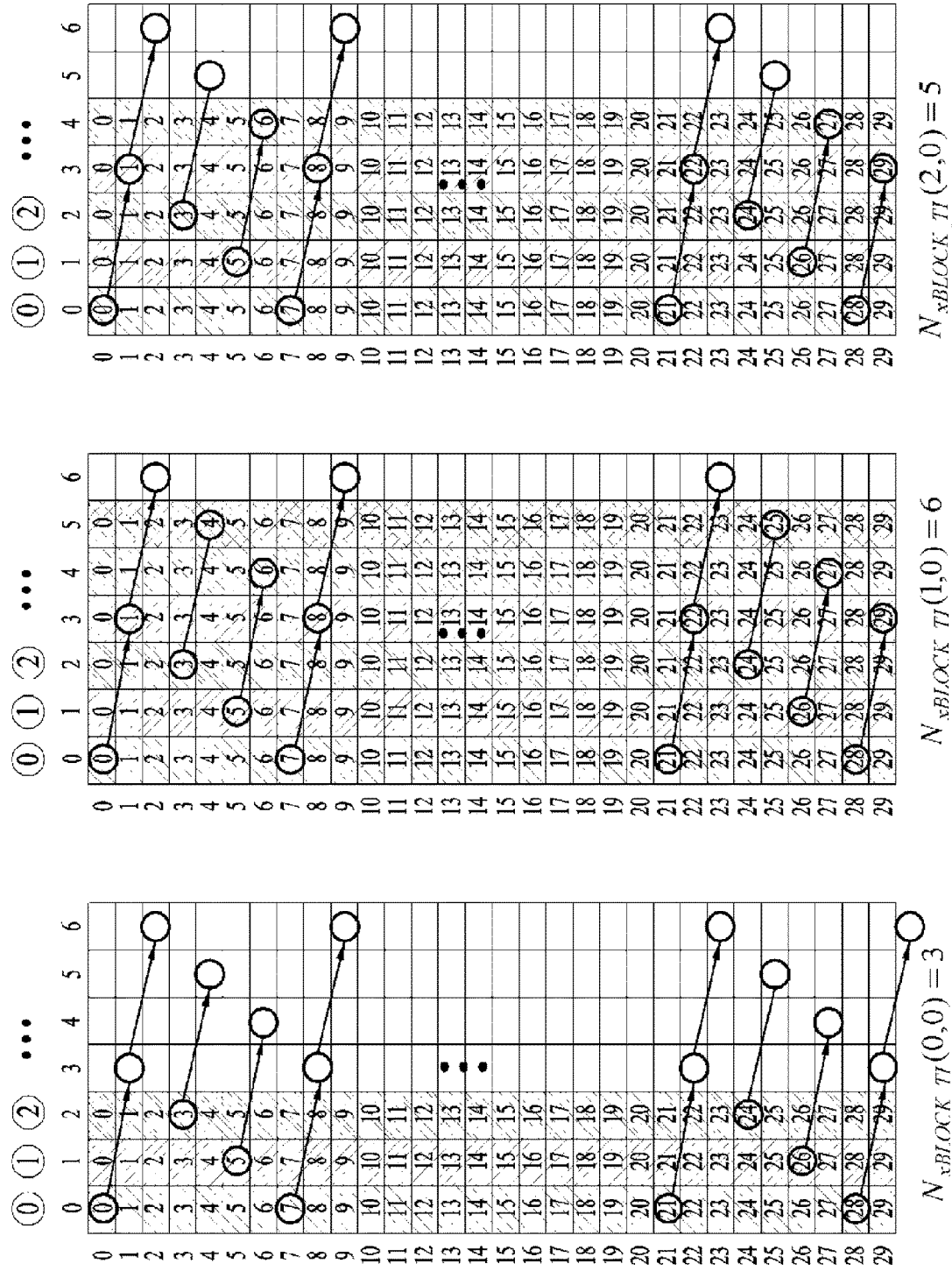
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N_{xBLOCK\_TI\_MAX}{'}=7$ and Sshift=(7−1)/2=3. Note that in the reading process shown as pseudocode above, if $V_i \geq N_{cells} N_{xBLOCK\_TI}(n,s)$, the value of Vi is skipped and the next calculated value of Vi is used.

Figure 29:
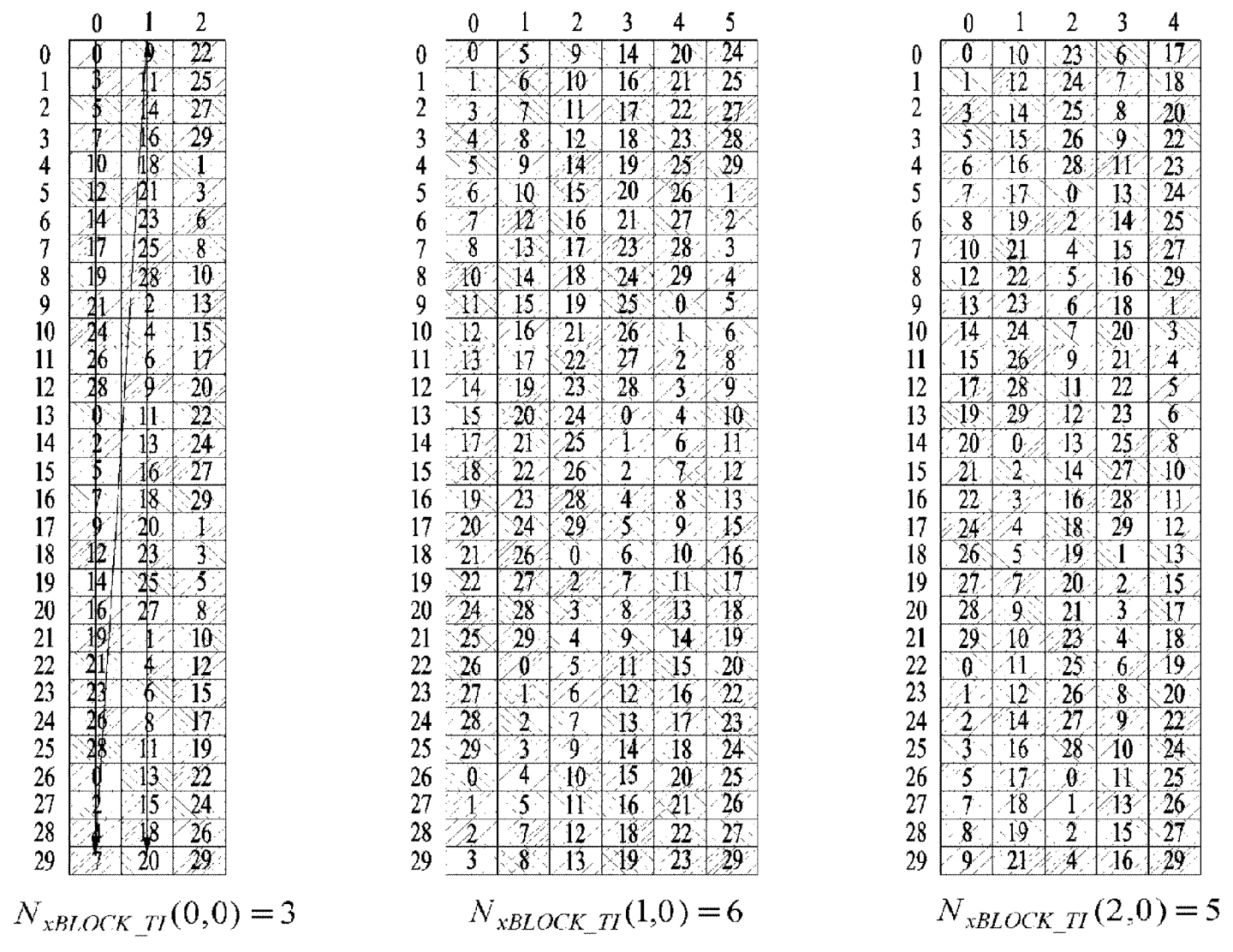

FIG. 29 illustrates interleaved XFECBLOCKs from each interleaving array according to an embodiment of the present invention.

FIG. 29 illustrates the interleaved XFECBLOCKs from each interleaving array with parameters of $N_{xBLOCK\_TI\_MAX}{'}=7$ and Sshift=3.

Figure 30:
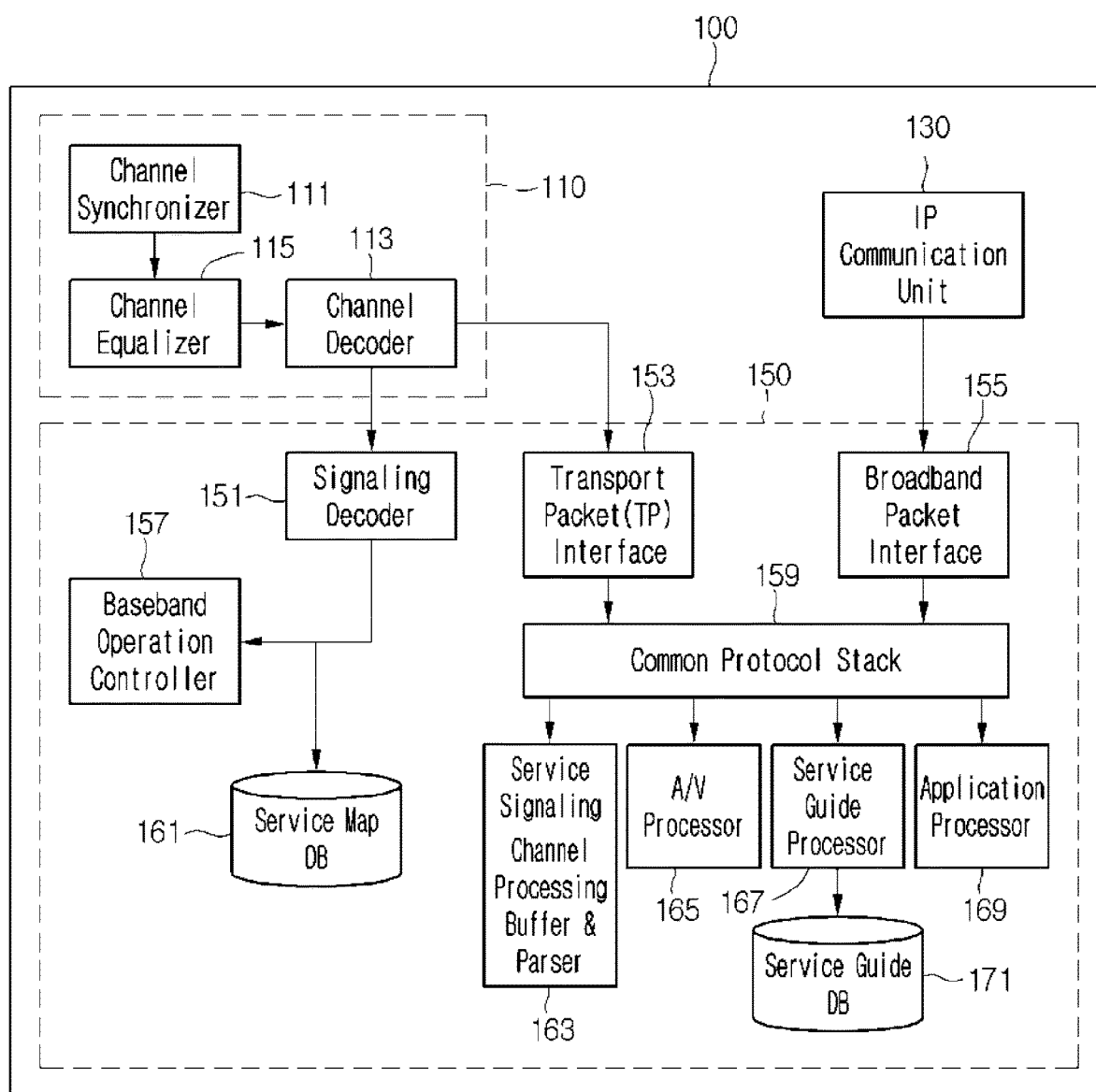
FIG. 30 is a view illustrating a configuration of a broadcast reception device according to an embodiment of the present invention.

FIG. 30 is a view illustrating a configuration of a broadcast reception device according to an embodiment of the present invention.

A case that a broadcast reception device scans broadcast service by using fast information will be described with reference to FIGS. 30 to 57.

The broadcast reception device 100 of FIG. 30 includes a broadcast reception unit 110, an internet protocol (IP) communication unit 130, and a control unit 150.

The broadcast reception unit 110 includes a channel synchronizer 111, a channel equalizer 113, and a channel decoder 115.

The channel synchronizer 111 synchronizes a symbol frequency with a timing in order for decoding in a baseband where a broadcast signal is received.

The channel equalizer 113 corrects the distortion of a synchronized broadcast signal. In more detail, the channel equalizer 113 corrects the distortion of a synchronized signal due to multipath and Doppler effects.

The channel decoder 115 decodes a distortion corrected broadcast signal. In more detail, the channel decoder 115 extracts a transport frame from the distortion corrected broadcast signal. At this point, the channel decoder 115 may perform forward error correction (FEC).

The IP communication unit 130 receives and transmits data through internet network.

The control unit 150 includes a signaling decoder 151, a transport packet interface 153, a broadband packet interface 155, a baseband operation control unit 157, a common protocol stack 159, a service map database 161, a service signaling channel processing buffer and parser 163, an A/V processor 165, a broadcast service guide processor 167, an application processor 169, and a service guide database 171.

The signaling decoder 151 decodes signaling information of a broadcast signal.

The transport packet interface 153 extracts a transport packet from a broadcast signal. At this point, the transport packet interface 153 may extract data such as signaling information or IP datagram from the extracted transport packet.

The broadcast packet interface 155 extracts an IP packet from data received from internet network. At this point, the broadcast packet interface 155 may extract signaling data or IP datagram from an IP packet.

The baseband operation control unit 157 controls an operation relating to receiving broadcast information from a baseband.

The common protocol stack 159 extracts audio or video from a transport packet.

The AN processor 547 processes audio or video.

The service signaling channel processing buffer and parser 163 parses and buffers signaling information that signals broadcast service. In more detail, the service signaling channel processing buffer and parser 163 parses and buffers signaling information that signals broadcast service from the IP datagram.

The service map database 165 stores a broadcast service list including information on broadcast services.

The service guide processor 167 processes terrestrial broadcast service guide data guiding programs of terrestrial broadcast service.

The application processor 169 extracts and processes application related information from a broadcast signal.

The serviced guide database 171 stores program information of broadcast service.

Figure 31:
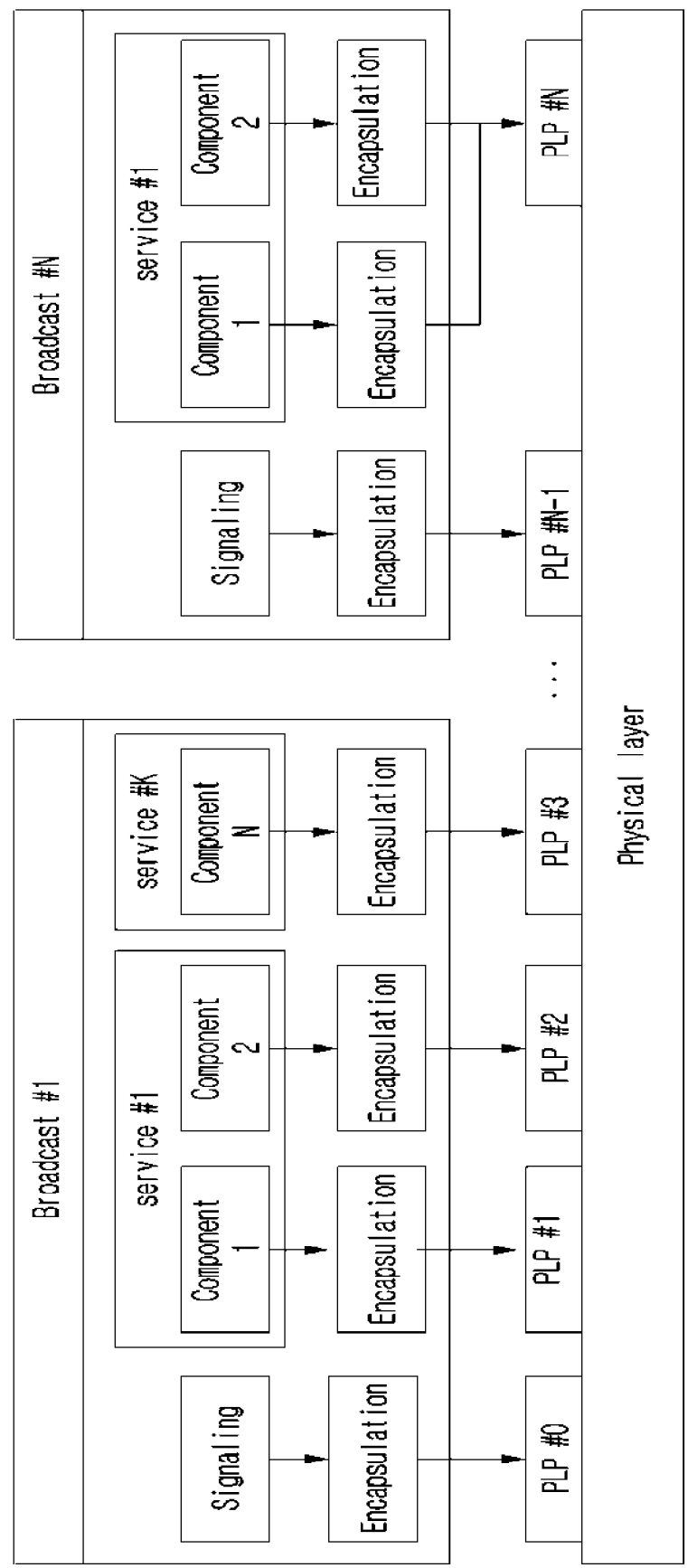
FIG. 31 is a view illustrating a transport layer of broadcast service according to an embodiment of the present invention.

FIG. 31 is a view illustrating a transport layer of broadcast service according to an embodiment of the present invention.

A broadcast transmission device may transport broadcast service and broadcast service related data through at least one physical layer pipe (PLP) on one frequency or a plurality of frequencies. At this point, the PLP is a series of logical data delivery paths identifiable on a physical layer. The PLP may be also referred to as a data pipe. One broadcast service may include a plurality of components. At this point, each of the plurality of components may be one of audio, video, and data components. Each broadcasting station may transmit encapsulated broadcast service by using a broadcast transmission device through one PLP or a plurality of PLPs. In more detail, a broadcasting station may transmit a plurality of components included in one service to a plurality of PLPs through a broadcast transmission device. Additionally, a broadcasting station may transmit a plurality of components included in one service to one PLP through a broadcast transmission device. For example, according to the embodiment of FIG. 31, a first broadcasting station Broadcast #1 may transmit signaling information by using a broadcast transmission device through one PLP PLP #0. Additionally, according to the embodiment of FIG. 31, the first broadcasting station Broadcast #1 may transmit a first component Component 1 and a second component Component 2 included in a first broadcast service by using a broadcast transmission device through a different first PLP PLP #1 and second PLP PLP #2. Additionally, according to the embodiment of FIG. 31, the Nth broadcasting station Broadcast #N may transmit a first component Component 1 and a second component Component 2 included in a first broadcast service Service #1 through an $N_{th}$ PLP PLP #N. At this point, realtime broadcast service may be encapsulated into one of the user datagram protocol (UDP) and a protocol for realtime contents transmission, for example, the realtime transport protocol (RTP). In the case of non-realtime contents and non-realtime data, realtime broadcast service may be encapsulated into a packet of at least one of IP, UDP, and a contents transmission protocol, for example, FLUTE. Therefore, a plurality of PLPs delivering a least one component may be included in a transport frame that a broadcast transmission device transmits. Accordingly, the broadcast reception device 100 may need to check all of a plurality of PLPs to perform a broadcast service scan for obtaining broadcast service connection information. Therefore, a broadcast transmission method and a broadcast reception method of the broadcast reception device 100 to perform a broadcast service scan are required.

FIG. 32 is a view illustrating a broadcast transport layer according to an embodiment of the present invention.

According to the embodiment of FIG. 32, the broadcast transport frame includes a P1 part, an L1 part, a common PLP part, an interleaved PLP part (e.g., a scheduled & interleaved PLP's part), and an auxiliary data part.

According to the embodiment of FIG. 32, the broadcast transmission device transmits information on transport signal detection through the P1 part of the transport frame. Additionally, the broadcast transmission device may transmit tuning information on broadcast signal tuning through the P1 part.

According to the embodiment of FIG. 32, the broadcast transmission device transmits a configuration of the broadcast transmission frame and characteristics of each PLP through the L1 part. At this point, the broadcast reception device 100 decodes the L1 part on the basis of the P1 part to obtain the configuration of the broadcast transport frame and the characteristics of each PLP.

According to the embodiment of FIG. 32, the broadcast transmission device may transmit information commonly applied to PLPs through the common PLP part. According to a specific embodiment, the broadcast transport frame may not include the common PLP part.

According to the embodiment of FIG. 32, the broadcast transmission device transmits a plurality of components included in broadcast service through an interleaved PLP part. At this point, the interleaved PLP part includes a plurality of PLPs.

Moreover, according to the embodiment of FIG. 32, the broadcast transmission device may signal to which PLP components configuring each broadcast service are transmitted through an L1 part or a common PLP part. However, the broadcast reception device 100 decodes all of a plurality of PLPs of an interleaved PLP part in order to obtain specific broadcast service information on broadcast service scan.

Unlike the embodiment of FIG. 32, the broadcast transmission device may transmit a broadcast transport frame including a broadcast service transmitted through a broadcast transport frame and an additional part that includes information on a component included in the broadcast service. At this point, the broadcast reception device 100 may instantly obtain information on the broadcast service and the components therein through the additional part. This will be described with reference to FIGS. 33 to 45.

FIG. 33 is a view of a broadcast transport frame according to another embodiment of the present invention.

According to the embodiment of FIG. 33, the broadcast transport frame includes a P1 part, an L1 part, a fast information channel (FIC) part, an interleaved PLP part (e.g., a scheduled & interleaved PLP's part), and an auxiliary data part.

Except the L1 part and the FIC part, other parts are identical to those of FIG. 32.

The broadcast transmission device transmits fast information through the FIC part. The fast information may include configuration information of a broadcast stream transmitted through a transport frame, simple broadcast service information, and component information. The broadcast reception device 100 may scan broadcast service on the basis of the FIC part. In more detail, the broadcast reception device 100 may extract information on broadcast service from the FIC part.

The L1 part may further include version information of fast information representing whether fast information in the FIC part changes. When the fast information is changed, the broadcast transmission device may change the version information of the fast information. Additionally, the broadcast reception device 100 may determine whether the fast information is received on the basis of the version information of the fast information. In more detail, when the version information of the previously received fast information is identical to the version information of the fast information of the L1 part, the broadcast reception device 100 may not receive the fast information.

Information in the FIC part will be described in more detail with reference to FIG. 34.

FIG. 34 illustrates a syntax of a fast information chunk according to an embodiment of the present invention.

The fast information chunk transmitted through the FIC part of a broadcast transport frame includes at least one of an FIT_data_version field, a num_broadcast field, a broadcast_id field, a delivery_system_id field, a num_service field, a service_id field, a service_category field, a service_hidden_flag field, and an SP_indicator field.

The FIT_data_version field represents version information on the syntax and semantics of a fast information chunk. The broadcast reception device 100 may determine whether to process a corresponding fast information chunk by using the above. For example, when a value of the FIT_data_version field represents a version that the broadcast reception device 100 does not support, the broadcast reception device 100 may not process a fast information chunk. According to a specific embodiment of the present invention, the FIT_data_version field may be an 8-bit field.

The num_broadcast field represents the number of broadcasting stations transmitting broadcast services through a corresponding frequency or a transmitted transport frame. According to a specific embodiment of the present invention, the num_broadcast field may be an 8-bit field.

The broadcast_id field represents an identifier indentifying a broadcasting station transmitting broadcast service through a corresponding frequency or transport frame. When the broadcast transmission device transmits MPEG-2 TS based data, broadcast_id may have the same value as transport_stream_id of MPEG-2 TS. According to a specific embodiment of the present invention, the broadcast_id field may be a 16-bit field.

The delivery_system_id field represents an identifier identifying a broadcast transmission system by applying the same transmission parameter on a broadcast network and processing it. According to a specific embodiment of the present invention, the delivery_system_id field may be a 16-bit field.

The num_service field represents the number of broadcast services that a broadcasting station corresponding to broadcast_id transmits in a corresponding frequency or transport frame. According to a specific embodiment of the present invention, the num_service field may be an 8-bit field.

The service_id field represents an identifier indentifying broadcast service. According to a specific embodiment of the present invention, the service_id field may be a 16-bit field.

The service_category field represents a category of broadcast service. In more detail, the service_category field may represent at least one of TV service, radio service, broadcast service guide, RI service, and emergency alerting. For example, in the case of a value of the service_category field is 0x01, it represents TV service. In the case of a value of the service_category field is 0x02, it represents radio service. In the case of a value of the service_category field is 0x03, it represents RI service. In the case of a value of the service_category field is 0x08, it represents service guide. In the case of a value of the service_category field is 0x09, it represents emergency alerting. According to a specific embodiment of the present invention, the service_category field may be a 6-bit field.

The service_hidden_flag field represents whether a corresponding broadcast service is hidden service. If the broadcast service is the hidden service, it is test service or special service. Accordingly, if the corresponding service is the hidden service, the broadcast reception device 100 may not display the corresponding service in a service guide or service list. Moreover, when the corresponding service is the hidden service, the broadcast reception device 100 may allow the corresponding service not to be selected by a channel up/down key input and the corresponding service to be selected by a number key input. According to a specific embodiment of the present invention, the service_hidden_flag may be a 1-bit field.

The SP_indicator field may represent whether service protection is applied to at least one component in the corresponding broadcast service. For example, when a value of SP_indicator is 1, it may represent that service protection is applied to at least one component in the corresponding broadcast service. According to a specific embodiment of the present invention, the SP_indicator field may be a 1-bit field. A broadcast service transmitting method and a broadcast service receiving method using a fast information chunk will be described with reference to FIGS. 35 and 36.

Figure 35:
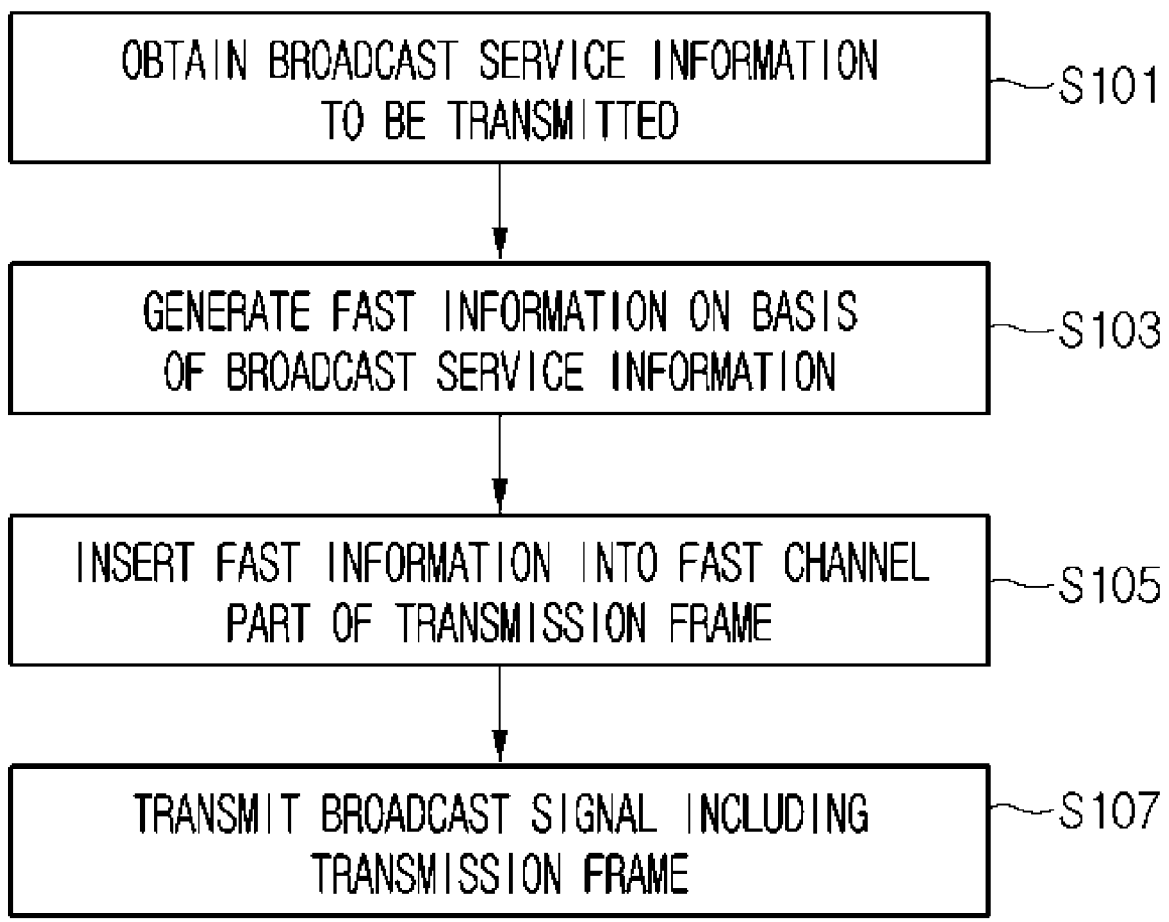
FIG. 35 is a view when a broadcast transmission device transmits broadcast service according to an embodiment of the present invention.

FIG. 35 is a view when a broadcast transmission device transmits broadcast service according to an embodiment of the present invention.

The broadcast transmission device obtains information of a broadcast service to be transmitted through a control unit in operation S101. In more detail, the broadcast transmission device obtains information of a broadcast service to be included in one frequency or transport frame. According to a specific embodiment of the present invention, the broadcast transmission device may obtain at least one of a broadcasting station identifier identifying a broadcasting station that transmits a broadcast, a delivery system deliv- ering a broadcast, an identifier identifying broadcast service, category information of broadcast service, information representing whether it is hidden service, and information representing whether service protection is applied to a component of broadcast service.

The broadcast transmission device generates fast information on the basis of broadcast service information through a control unit in operation S103. At this point, the fast information may include at least one of a broadcasting station identifier identifying a broadcasting station transmitting a broadcast, a delivery system identifier identifying a delivery system delivering a broadcast, an identifier identifying broadcast service, category information of broadcast service, information representing whether it is hidden service, information on whether service protection is applied to a component of broadcast service, information representing the number of broadcasting stations transmitting broadcast services in a transport frame where fast information is to be inserted, and information representing the number of broadcast services corresponding to each broadcasting station identifier in a transport frame. According to a specific embodiment of the present invention, the broadcast transmission device may generate a fast information chunk as shown in the embodiment of FIG. 34.

The broadcast transmission device inserts fast information into a fast information channel part of a transport frame through a control unit in operation S105. The broadcast transmission device may insert fast information into a fast information channel part of a transport frame as shown in the embodiment of FIG. 33.

The broadcast transmission device transmits a broadcast signal including a transport frame through a transmission unit in operation S107.

Figure 36:
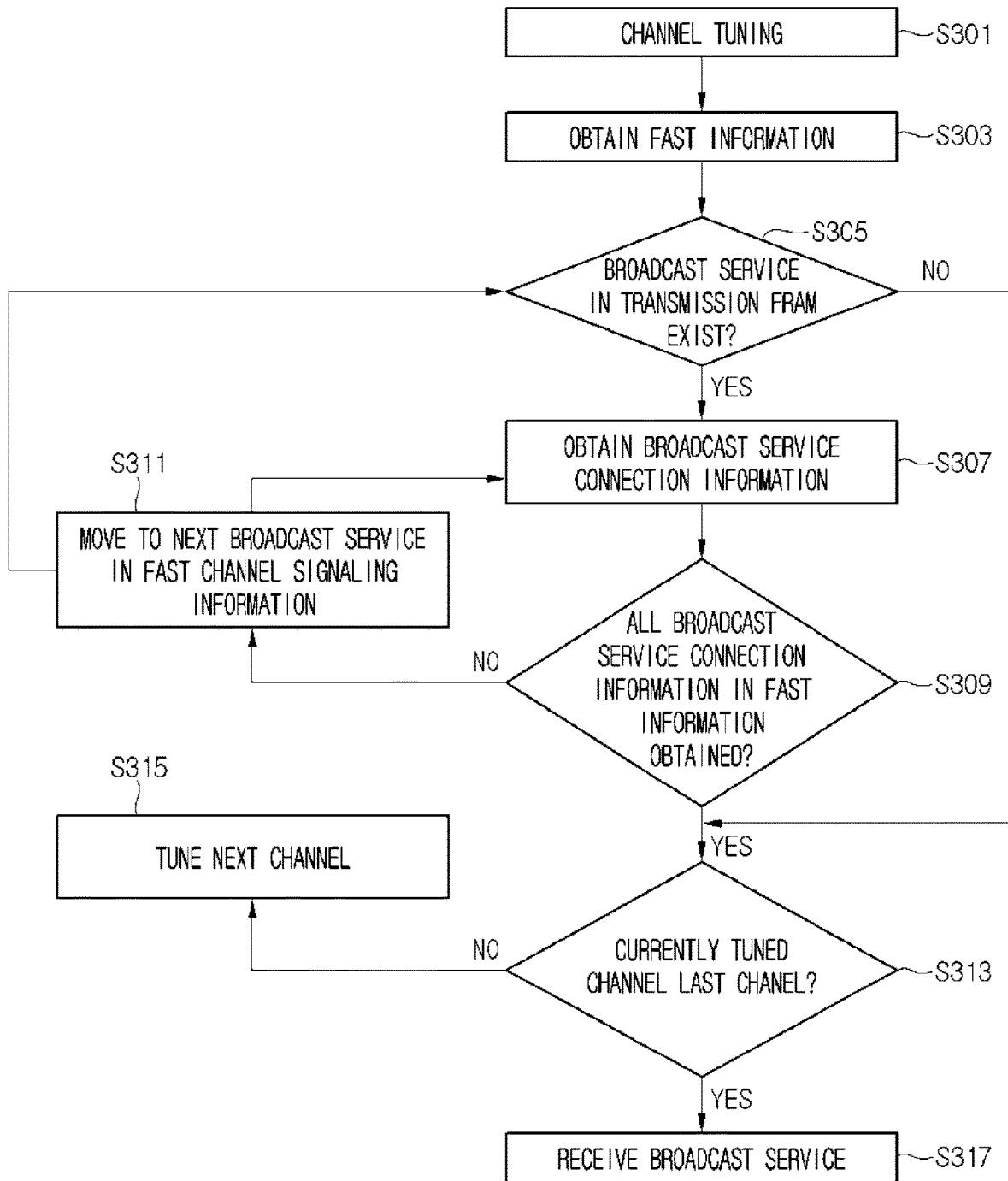
FIG. 36 is a view when a broadcast reception device scans broadcast service according to an embodiment of the present invention.

FIG. 36 is a view when a broadcast reception device receives broadcast service according to an embodiment of the present invention.

The broadcast reception device 100 tunes a channel for receiving broadcast signal through a broadcast reception unit 110 in operation S301. In general, in the case of terrestrial broadcast, a channel list including information of a frequency for transmitting broadcast service for each region and a specific transmission parameter is defined. Additionally, in the case of cable broadcast, a channel list including information of a frequency for transmitting broadcast service for each cable broadcast operator and a specific transmission parameter is defined. Therefore, according to a specific embodiment of the present invention, the broadcast reception device 100 may tune a channel for receiving broadcast signal on the basis of a predetermined channel list.

The broadcast reception device 100 obtains fast information through the control unit 150 in operation S303. In more detail, the broadcast reception device 100 may extract fast information from the FIC part of a transport frame. At this point, the fast information may be the fast information chunk of FIG. 34.

When there is a broadcast service in a transport frame, the broadcast reception device 100 obtains broadcast service connection information through the control unit 150 in operations S305 and S307. Additionally, the broadcast reception device 100 may determine whether there is a broadcast service in a transport frame on the basis of information representing the number of broadcasting stations transmitting a broadcast service in a transport frame. According to another specific embodiment of the present invention, the broadcast reception device 100 may determine whether there is a broadcast service in a transport frame on the basis of whether there is a broadcast service corresponding to each broadcasting station identifier in a transport frame.

The broadcast service connection information may be minimum information necessary for receiving broadcast service. In more detail, the broadcast service connection information may include at least one of a broadcasting station identifier identifying a broadcasting station transmitting a broadcast, a delivery system identifier identifying a delivery system delivering a broadcast, an identifier identifying broadcast service, category information of broadcast service, information representing whether it is hidden service, information on whether service protection is applied to a component of broadcast service, information representing the number of broadcasting stations transmitting broadcast services in a transport frame where fast information is to be inserted, and information representing the number of broadcast services corresponding to each broadcasting station identifier in a transport frame. According to a specific embodiment of the present invention, the broadcast reception device 100 may generate a broadcast service list including connection information on a plurality of broadcast services on the basis of the obtained broadcast service connection information.

When all broadcast service connection information in fast information is not obtained, the broadcast reception device 100 obtains broadcast service connection information of the next broadcast service in operations S309 and S311. According to a specific embodiment of the present invention, the fast information may include broadcast service connection information on a plurality of broadcast services. At this point, the fast information may include broadcast service connection information in loop form in which broadcast service connection information on a plurality of broadcast services is sequentially stored. In more detail, the fast information may include broadcast service connection information on a broadcast service that each broadcasting station services in loop form.

When there is no broadcast service in a transport frame or all broadcast service connection information in fast information is obtained, the broadcast reception device 100 determines whether a currently tuned channel is the last channel in operations S305, S309, and S313. In more detail, the broadcast reception device 100 determines whether a currently tuned channel is the last channel of the above-described predetermined channel list.

If the currently tuned channel is not the last channel, the broadcast reception device 100 obtains fast information by tuning the next channel in operation S315.

If the currently tuned channel is the last channel, the broadcast reception device 100 receives broadcast service in operation S317. At this point, a broadcast service that the broadcast reception device 100 receives may be a pre-set broadcast service. According to another specific embodiment of the present invention, a broadcast service that the broadcast reception device 100 receives may be a broadcast service obtaining the connection information lastly. According to another specific embodiment of the present invention, a broadcast service that the broadcast reception device 100 receives may be a broadcast service obtaining the connection information firstly. However, according to the embodiments of FIGS. 33 to 35, the broadcast reception device 100 may obtain only simple information on a broadcasting station in a corresponding frequency or transport frame and a broadcast service of a corresponding broadcasting station. Accordingly, in order to obtain specific information on each broadcast service transmitted in a corresponding frequency or transport frame, the broadcast reception device 100 needs to perform an additional operation. For example, in order to obtain information on a component configuring each broadcast service, the broadcast reception device 100 needs to extract signaling information in an interleaved PLP part in a transport frame. Therefore, a new broadcast transmission device, operation method thereof, broadcast reception device, and operation method thereof are required to allow the broadcast reception device 100 to quickly and efficiently obtain specific information on a broadcast service in a transport frame. This will be described with reference to FIGS. 37 to 48.

When a transport frame includes an additional PLP part including specific information on broadcast services transmitted through a transport frame in an interleaved PLP part, the broadcast reception device 100 may obtain specific information on broadcast services transmitted through a transport frame by extracting only an additional PLP part. Moreover, when a fast information chunk includes information of an additional PLP part including specific information on broadcast services transmitted through a transport frame, the broadcast reception device 100 may efficiently obtain information of an additional PLP part including specific information on broadcast services transmitted through a transport frame. Accordingly, a transport frame may include an additional PLP part including specific information on broadcast services transmitted through a transport frame in an interleaved PLP part. At this point, an additional PLP part including specific information on broadcast services transmitted through a transport frame may include signaling information signaling broadcast service. According to another specific embodiment, an additional PLP part including specific information on broadcast services transmitted through a transport frame may include a component included in broadcast service.

Moreover, a fast information chunk may include information on an additional PLP part including specific information on broadcast services transmitted through a transport frame. In more detail, the fast information chunk may include an identifier identifying an additional PLP part including specific information on broadcast services transmitted through a transport frame. This will be described in more detail with reference to FIGS. 37 to 40. Hereinafter, an additional PLP part including specific information on broadcast services transmitted through a transport frame is referred to as a base PLP.

FIGS. 37 to 40 illustrate a syntax of a fast information chunk according to another embodiment of the present invention.

According to the embodiment of FIG. 37, unlike the embodiment of FIG. 34, the fast information chunk further includes a base_PLP_id field and a base_PLP_version field.

The base_PLP_id field is an identifier identifying a base PLP for broadcast service of a broadcasting station corresponding to broadcast_id. According to a specific embodiment of the present invention, a base PLP may deliver signaling information signaling a broadcast service transmitted through a transport frame. At this point, according to a specific embodiment of the present invention, signaling information signaling broadcast service may be PSI of MPEG2-TS standard. Additionally, according to a specific embodiment of the present invention, signaling information signaling broadcast service may be PSIP of ATSC standard. Additionally, according to a specific embodiment of the present invention, signaling information signaling broadcast service may be SI of DVB standard. According to another specific embodiment of the present invention, a base PLP may include a component included in a broadcast service transmitted through a transport frame. According to a specific embodiment of the present invention, the base_PLP_id field may be an 8-bit field.

The base_PLP_version field may represent version information on a change in data transmitted through a base PLP. For example, when signaling information is delivered through a base PLP, if there is a change in service signaling, a value of the base_PLP_version field may be increased by 1. According to a specific embodiment of the present invention, the base_PLP_version field may be a 5-bit field. The broadcast reception device 100 may determine whether to receive data transmitted through a base PLP on the basis of the base_PLP_version field. For example, when a value of the base_PLP_version field is identical to a value of the base_PLP_version field transmitted through a previously received base PLP, the broadcast reception device 100 may not receive data transmitted through a base PLP.

However, the number of PLPs in a transport frame may be set to the maximum 32. In such a case, since the maximum value for the base_PLP_id field is less than 32, the base_PLP_id field may be a 6-bit field. Additionally, since a value that the num_service field has is less than 32, the num_service field may be a 5-bit field.

FIG. 38 is a view when the base_PLP_id field is a 6-bit field and the num_service field is a 5-bit field.

Additionally, a fast information chunk may include information on a component of broadcast service. According to a specific embodiment of the present invention, a fast information chunk may include a num_component field, a component_id field, and a PLP_id field.

The num_component field represents the number of components configuring a corresponding broadcast service. According to a specific embodiment of the present invention, the num_component field may be an 8-bit field.

The component_id field represents an identifier identifying a corresponding component in broadcast service. According to a specific embodiment of the present invention, the component_id field may be an 8-bit field.

The PLP_id field represents an identifier identifying a PLP where a corresponding component is transmitted in a transport frame. According to a specific embodiment of the present invention, the PLP_id field may be an 8-bit field.

FIG. 39 is a view when a fast information chunk includes a num_component field, a component_id field, and a PLP_id field.

Additionally, as described above, the number of PLPs in a transport frame may be set to the maximum 32. In such a case, when a fast information chunk includes a num_component field, a component_id field, and a PLP_id field, the base_PLP_id field may be a 6-bit field. Additionally, the num_service field may be a 5-bit field.

FIG. 40 is a view when a fast information chunk includes a num_component field, a component_id field, and a PLP_id field, a base_PLP_id field is a 6-bit field, and a num_service field is a 5-bit field.

Figure 41:
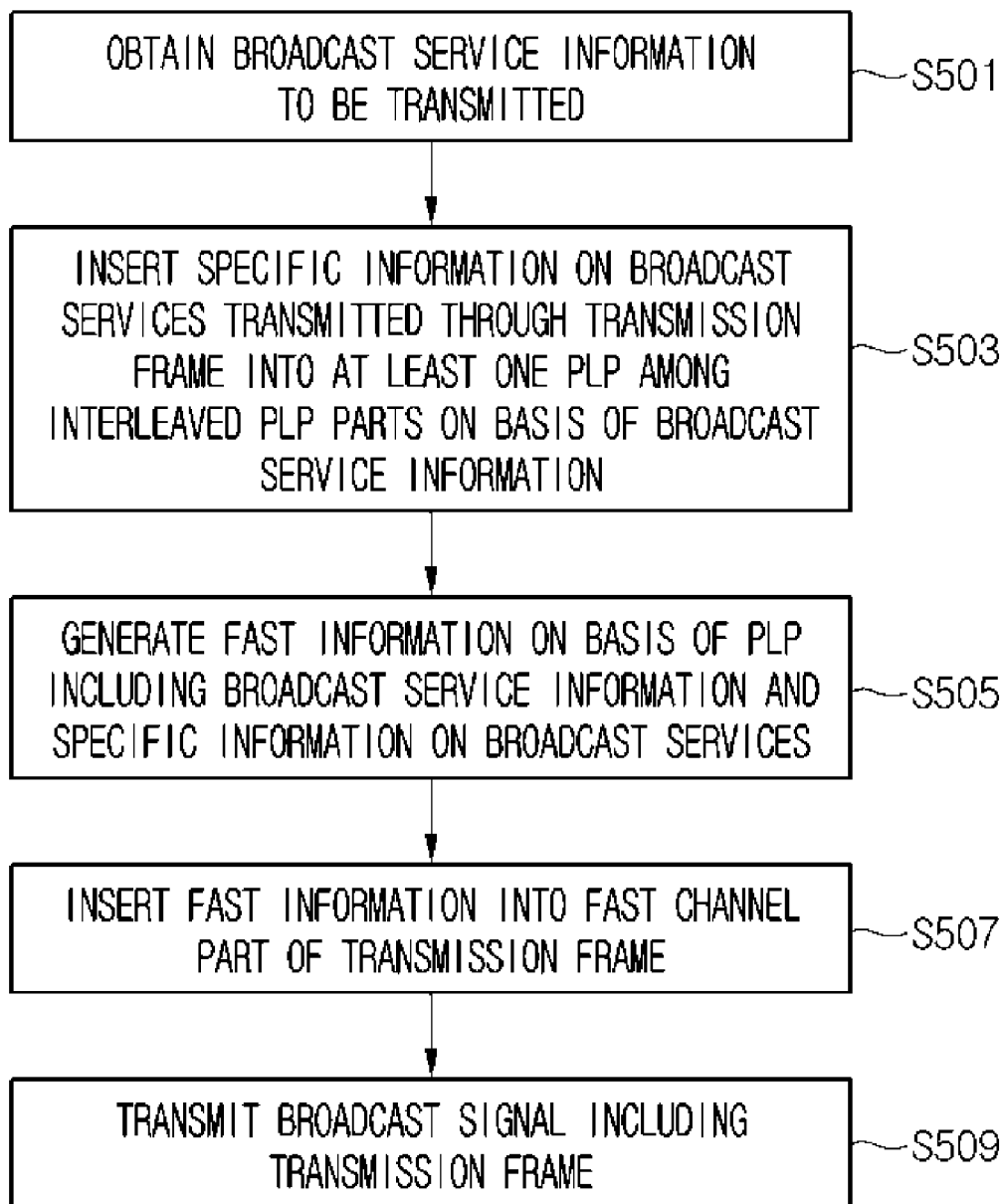
FIG. 41 is a view when a broadcast transmission device transmits broadcast service according to another embodiment of the present invention.

FIG. 41 is a view when a broadcast transmission device transmits broadcast service according to another embodiment of the present invention.

The broadcast transmission device obtains information of a broadcast service to be transmitted through a control unit in operation S501. In more detail, the broadcast transmission device obtains information of a broadcast service to be included in one frequency or transport frame. According to a specific embodiment of the present invention, the broadcast transmission device may obtain at least one of a broadcasting station identifier identifying a broadcasting station that transmits a broadcast, a delivery system delivering a broadcast, an identifier identifying broadcast service, category information of broadcast service, information representing whether it is hidden service, information representing whether service protection is applied to a component of broadcast service, and signaling information signaling broadcast service. At this point, the signaling information may be one of PSI of MPEG2-TS standard, PSIP of ATSC standard, and SI of DVB standard. Additionally, the signaling information may include signaling information signaling broadcast service on a newly established standard besides the above-mentioned standards.

The broadcast transmission device inserts specific information on broadcast services transmitted through a transport frame into at least one PLP in an interleaved PLP part through a control unit in operation S503 on the basis of broadcast service information. As described above, specific information on broadcast services may be signaling information signaling broadcast service. At this point, the signaling information may be one of PSI of MPEG2-TS standard, PSIP of ATSC standard, and SI of DVB standard. Additionally, the signaling information may include signaling information signaling broadcast service on a newly established standard besides the above-mentioned standards. Additionally, a component of a broadcast service among broadcast services transmitted through a transport frame may be inserted into at least one PLP in an interleaved PLP part on the basis of broadcast service information. At this point, a PLP including specific information on broadcast services transmitted through a transport frame is a base PLP.

The broadcast transmission device generates fast information through a control unit on the basis of a PLP including broadcast service information and specific information on broadcast services in operation S505. At this point, the fast information may include at least one of a broadcasting station identifier identifying a broadcasting station transmitting a broadcast, a delivery system identifier identifying a delivery system delivering a broadcast, an identifier identifying broadcast service, category information of broadcast service, information representing whether it is hidden service, information on whether service protection is applied to a component of broadcast service, information representing the number of broadcasting stations transmitting broadcast services in a transport frame where fast information is to be inserted, information representing the number of broadcast services corresponding to each broadcasting station identifier in a transport frame, information representing the number of components included in broadcast service, an identifier identifying a component included in broadcast service, and an identifier identifying a PLP including a corresponding component. Additionally, the fast information includes information on a base PLP. In more detail, the fast information may include an identifier identifying a base PLP. Additionally, the fast information may include information representing an information change in a base PLP. According to a specific embodiment of the present invention, the broadcast transmission device may generate a fast information chunk as shown in the embodiment of FIGS. 37 to 40.

The broadcast transmission device inserts the fast information into a fast information channel part of a transport frame through a control unit in operation S507. The broadcast transmission device may insert fast information into a fast information channel part of a transport frame as shown in the embodiment of FIG. 33.

The broadcast transmission device transmits a broadcast signal including a transport frame through a transmission unit in operation S509.

Figure 42:
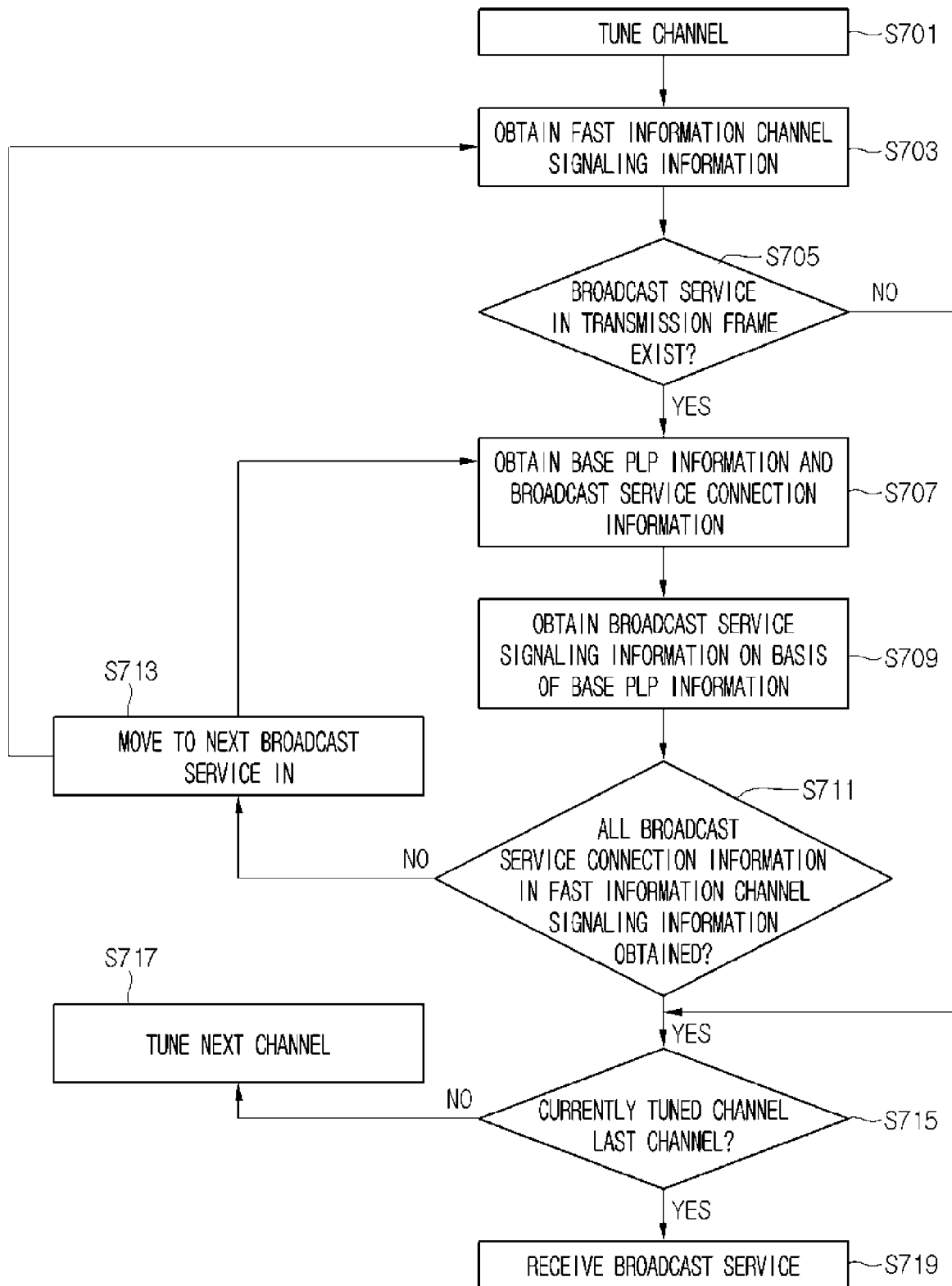
FIG. 42 is a view when a broadcast reception device scans broadcast service according to another embodiment of the present invention.

FIG. 42 is a view when a broadcast reception device scans broadcast service according to another embodiment of the present invention.

The broadcast reception device 100 tunes a channel for receiving broadcast signal through a broadcast reception unit 110 in operation S701. As described above, in general, in the case of terrestrial broadcast, a channel list including information of a frequency for transmitting broadcast service to each region and a specific transmission parameter is defined. Additionally, in the case of cable broadcast, a channel list including information of a frequency for transmitting broadcast service for each cable broadcast operator and a specific transmission parameter is defined. Therefore, according to a specific embodiment of the present invention, the broadcast reception device 100 may tune a channel for receiving broadcast signal on the basis of a predetermined channel list.

The broadcast reception device 100 obtains fast information through the control unit 150 in operation S703. In more detail, the broadcast reception device 100 may extract fast information from the FIC part of a transport frame. At this point, the fast information may be the fast information chunk in the embodiment of FIGS. 37 to 40.

When there is a broadcast service in a transport frame, the broadcast reception device 100 obtains base PLP information and broadcast service connection information through the control unit 150 in operations S705 and S707. Additionally, the broadcast reception device 100 may determine whether there is a broadcast service in a transport frame on the basis of information representing whether the number of broadcasting stations transmitting a broadcast service in a transport frame. According to another specific embodiment, the broadcast reception device 100 may determine whether there is a broadcast service in a transport frame on the basis of information representing whether there is a broadcast service corresponding to each broadcasting station identifier in a transport frame.

The broadcast service connection information may be minimum information necessary for receiving broadcast service. In more detail, the broadcast service connection information may include at least one of a broadcasting station identifier identifying a broadcasting station transmitting a broadcast, a delivery system identifier identifying a delivery system delivering a broadcast, an identifier identifying broadcast service, category information of broadcast service, information representing whether it is hidden service, information on whether service protection is applied to a component of broadcast service, information representing the number of broadcasting stations transmitting broadcast services in a transport frame where fast information is to be inserted, information representing the number of broadcast services corresponding to each broadcasting station identifier in a transport frame, information representing the number of components included in broadcast service, an identifier identifying a component included in broadcast service, and an identifier identifying a PLP including a corresponding component. According to a specific embodiment of the present invention, the broadcast reception device 100 may generate a broadcast service list including connection information on a plurality of broadcast services on the basis of the obtained broadcast service connection information. The base PLP information may include at least one of an identifier identifying a base PLP and information representing an information change in a base PLP.

The broadcast reception device 100 obtains signaling information on a broadcast service on the basis of the base PLP information through the control unit 150. As described above, the signaling information may be one of PSI of MPEG2-TS standard, PSIP of ATSC standard, and SI of DVB standard. Additionally, the signaling information may include signaling information signaling broadcast service on a newly established standard besides the above-mentioned standards.

At this point, specific operations of the broadcast reception device 100 will be described with reference to FIGS. 43 and 44.

Figure 43:
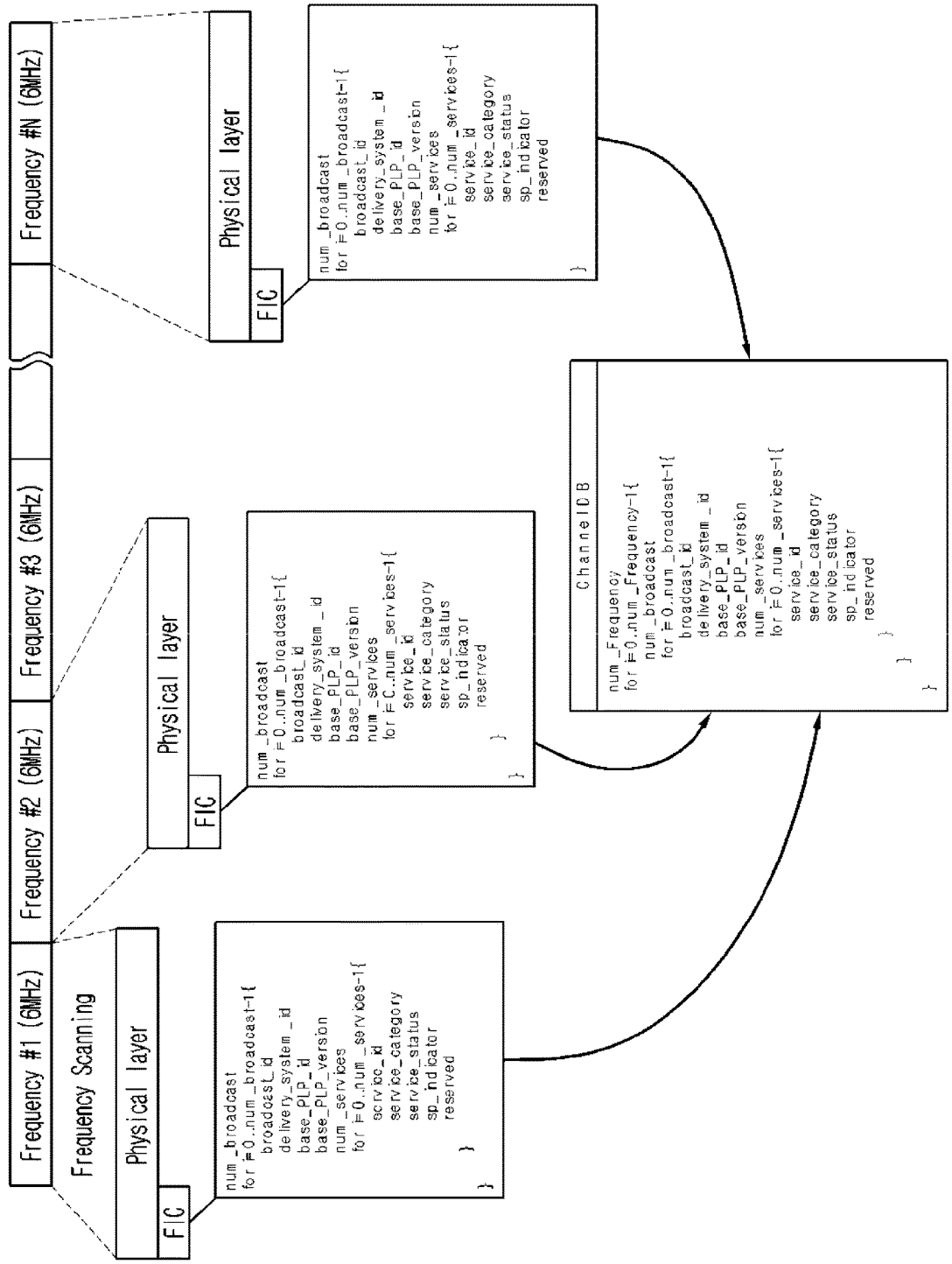
FIG. 43 is a flowchart of broadcast data allowing a broadcast reception device to scan broadcast service according to an embodiment of the present invention.
Figure 44:
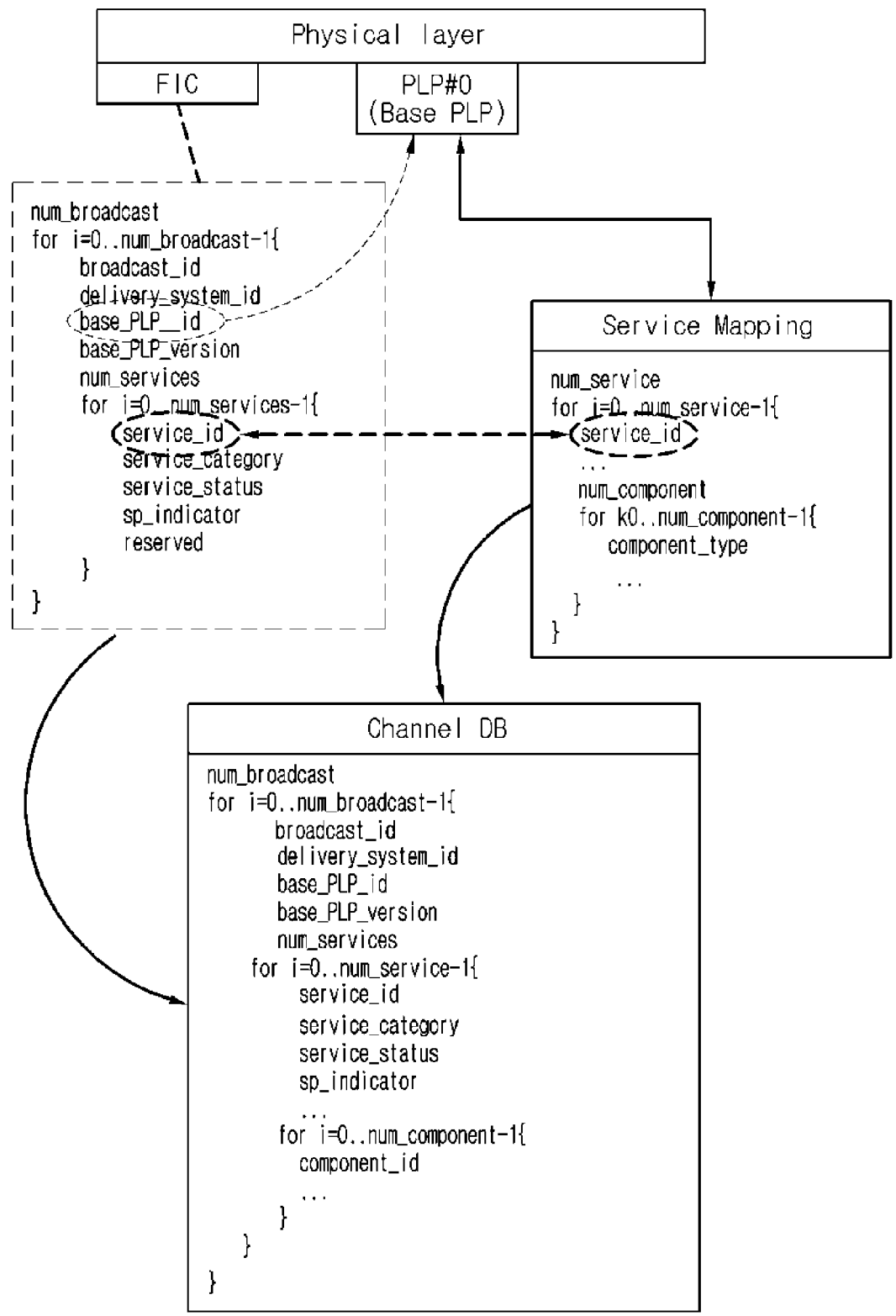
FIG. 44 is a flowchart of broadcast data allowing a broadcast reception device to obtain broadcast service information according to an embodiment of the present invention.

As shown in the embodiment of FIG. 43, the broadcast reception device 100 may obtain broadcast service connection information from fast information. Additionally, the broadcast reception device 100 may generate a broadcast service list including connection information on broadcast service on the basis of the broadcast service connection information. However, in order to allow the broadcast reception device 100 to obtain specific information on broadcast service, information needs to be obtained from a base PLP. For this, the broadcast reception device 100 identifies a base PLP on the basis of base PLP information. In more detail, like the embodiment of FIG. 44, the broadcast reception device 100 may obtain a base PLP identifier from the fast information and may identify a base PLP from a plurality of PLPs on the basis of the base PLP identifier. Additionally, the broadcast reception device 100 may obtain signaling information in the base PLP on the basis of the broadcast service connection information. In more detail, the broadcast reception device 100 may obtain signaling information corresponding to the broadcast service connection information. For example, the broadcast reception device 100 may obtain from the base PLP the type of a component included in a broadcast service corresponding to the broadcast service identifier obtained from the fast information.

When all broadcast service connection information in the fast information is not obtained, the broadcast reception device 100 obtains broadcast service connection information of the next broadcast service in operations S711 and S713. According to a specific embodiment of the present invention, the fast information may include broadcast service connection information on a plurality of broadcast services. At this point, the fast information may include broadcast service connection information in loop form in which broadcast service connection information on a plurality of broadcast services is sequentially stored. In more detail, the fast information may include broadcast service connection information on a broadcast service that each broadcasting station services in loop form.

When there is no broadcast service in a transport frame or all broadcast service connection information in the fast information is obtained, the broadcast reception device 100 determines whether a currently tuned channel is the last channel in operations S705, S711, and S715. In more detail, the broadcast reception device 100 determines whether a currently tuned channel is the last channel of the above-described predetermined channel list.

If the currently tuned channel is not the last channel, the broadcast reception device 100 tunes the next channel to obtain the fast information in operation S717.

If the currently tuned channel is the last channel, the broadcast reception device 100 receives broadcast service in operation S719. At this point, a broadcast service that the broadcast reception device 100 receives may be a pre-set broadcast service. According to another specific embodiment of the present invention, a broadcast service that the broadcast reception device 100 receives may be a broadcast service obtaining the connection information lastly. According to another specific embodiment of the present invention, a broadcast service that the broadcast reception device 100 receives may be a broadcast service obtaining the connection information firstly.

The broadcast reception device 100 may efficiently obtain specific information on broadcast service in addition to simple information on broadcast service through a base PLP. Additionally, the broadcast reception device 100 may instantly obtain specific information on broadcast service in addition to simple information on broadcast service through a base PLP.

However, if there is no additional FIC part in a transport frame, the broadcast transmission device may transmit fast information in a table format through a common PLP part delivering information shared in a PLP or an additional PLP. At this point, at this point, the fast information table may be encapsulated into a generic packet including MPEG2-TS, IP/UDP datagram, or IP/UDP datagram. Additionally, the broadcast reception device 100 may receive a fast information table from a common PLP part or an additional PLP through the control unit 150. Additionally, the broadcast reception device 100 may perform an operation of FIG. 44 on a fast information table. The format of a fast information table will be described with reference to FIGS. 45 to 48.

FIG. 45 illustrates a syntax of a fast information table according to an embodiment of the present invention.

The fast information table may include at least one of a table_id field, a section_syntax_indicator field, a private_indicator field, a section_length field, a table_id_extension field, a table_id_extension field, a FIT_data_version field, a current_next_indicator field, a section_number field, a last_section_number field, a num_broadcast field, a broadcast_id field, a delivery_system_id field, a base_PLP_id field, a base_PLP_version field, num_service field, a service_id field, a service_category field, a service_hidden_flag field, a SP_indicator field, a num_component field, a component_id field, and a PLP_id field.

The table_id field represents an identifier of a fast information table. At this point, the table_id may be 0xFA, that is, one of reserved id values defined in ATSC A/65. According to a specific embodiment of the present invention, the table_id field may be an 8-bit field.

The section_syntax_indicator field represents whether a fast information table is a private section table in the long formant of MEPG-2 TS standard. According to a specific embodiment of the present invention, the section_syntax_indicator may be a 1-bit field.

The private_indicator field represents whether a current table corresponds to a private section. According to a specific embodiment of the present invention, the private_indicator field may be a 1-bit field.

The section_length field represents the length of a section included following the section_length field. According to a specific embodiment of the present invention, the section_length field may be a 12-bit field.

The table_id_extension field represents an identifier identifying fast information. According to a specific embodiment of the present invention, the table_id_extension field may be a 16-bit field.

The FIT_data_version field represents version information on the syntax and semantics of a fast information table. The broadcast reception device 100 may determine whether to process a corresponding fast information table by using the FIT_data_version field. For example, when a value of the FIT_data_version field represents a version that the broadcast reception device 100 does not support, the broadcast reception device 100 may not process a fast information table. According to a specific embodiment of the present invention, the FIT_data_version field may be a 5-bit field.

The current_next_indicator field represents whether information of a fast information table is currently available. In more detail, when a value of the current_next_indicator field is 1, the current_next_indicator field may represent that information of a fast information table is available. Moreover, when a value of the current_next_indicator field is 1, information of a fast information table is available for the next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of a fast information table is large, the fast information table may be divided into a plurality of sections and then transmitted. At this point, the broadcast reception device 100 determines whether all sections necessary for a fast information table are received on the basis of the section_number field and the last_section_number field. According to a specific embodiment of the present invention, the last_section_number field may be an 8-bit field.

The num_broadcast field represents the number of broadcasting stations transmitting broadcast services through a corresponding frequency or a transmitted transport frame. According to a specific embodiment of the present invention, the num_broadcast field may be an 8-bit field.

The broadcast_id field represents an identifier indentifying a broadcasting station transmitting broadcast service through a corresponding frequency or transport frame. When the broadcast transmission device transmits MPEG-2 TS based data, broadcast_id may have the same value as transport_stream_id of MPEG-2 TS. According to a specific embodiment of the present invention, the broadcast_id field may be a 16-bit field.

The delivery_system_id field represents an identifier identifying a broadcast transmission system by applying the same transmission parameter on a broadcast network and processing it. According to a specific embodiment of the present invention, the delivery_system_id field may be a 16-bit field.

The base_PLP_id field is an identifier identifying a base PLP for broadcast service of a broadcasting station corresponding to broadcast_id. According to a specific embodiment of the present invention, a base PLP may deliver signaling information signaling a broadcast service transmitted through a transport frame. At this point, according to a specific embodiment of the present invention, signaling information signaling broadcast service may be PSI of MPEG2-TS standard. Additionally, according to a specific embodiment of the present invention, signaling information signaling broadcast service may be PSIP of ATSC standard. Additionally, according to a specific embodiment of the present invention, signaling information signaling broadcast service may be SI of DVB standard. According to another specific embodiment of the present invention, a base PLP may include a component included in a broadcast service transmitted through a transport frame. According to a specific embodiment of the present invention, the base_PLP_id field may be an 8-bit field.

The base_PLP_version field may represent version information on a change in data transmitted through a base PLP. For example, when signaling information is delivered through a base PLP, if there is a change in service signaling, a value of the base_PLP_version field may be increased by 1. According to a specific embodiment of the present invention, the base_PLP_version field may be a 5-bit field.

The num_service field represents the number of broadcast services that a broadcasting station corresponding to broadcast_id transmits in a corresponding frequency or transport frame. According to a specific embodiment of the present invention, the num_service field may be an 8-bit field.

The service_id field represents an identifier indentifying broadcast service. According to a specific embodiment of the present invention, the service_id field may be a 16-bit field.

The service_category field represents a category of broadcast service. In more detail, the service_category field may represent at least one of TV service, radio service, broadcast service guide, RI service, and emergency alerting. For example, in the case of a value of the service_category field is 0x01, it represents TV service. In the case of a value of the service_category field is 0x02, it represents radio service. In the case of a value of the service_category field is 0x03, it represents RI service. In the case of a value of the service_category field is 0x08, it represents service guide. In the case of a value of the service_category field is 0x09, it represents emergency alerting. According to a specific embodiment of the present invention, the service_category field may be a 6-bit field.

The service_hidden_flag field represents whether a corresponding broadcast service is hidden service. If the broadcast service is the hidden service, it is test service or special service. Accordingly, if the corresponding service is the hidden service, the broadcast reception device 100 may not display the corresponding service in a service guide or service list. Moreover, when the corresponding service is the hidden service, the broadcast reception device 100 may allow the corresponding service not to be selected by a channel up/down key input and the corresponding service to be selected by a number key input. According to a specific embodiment of the present invention, the service_hidden_flag may be a 1-bit field.

The SP_indicator field may represent whether service protection is applied to at least one component in the corresponding broadcast service. For example, when a value of SP_indicator is 1, it may represent that service protection is applied to at least one component in the corresponding broadcast service. According to a specific embodiment of the present invention, the SP_indicator field may be a 1-bit field.

The num_component field represents the number of components configuring a corresponding broadcast service. According to a specific embodiment of the present invention, the num_component field may be an 8-bit field.

The component_id field represents an identifier identifying a corresponding component in broadcast service. According to a specific embodiment of the present invention, the component_id field may be an 8-bit field.

The PLP_id field represents an identifier identifying a PLP where a corresponding component is transmitted in a transport frame. According to a specific embodiment of the present invention, the PLP_id field may be an 8-bit field. The contents of information in a fast information table are similar to the contents of the above-described fast information chunk. However, in the case of a fast information table, since information is not transmitted through an FIC channel part, the size of information in a fast information table is less limited than that of fast information chunk. Accordingly, the fast information table may include other information that a fast information chunk does not include. This will be described with reference to FIG. 46.

FIG. 46 illustrates a syntax of a fast information table according to another embodiment of the present invention.

As shown in an embodiment of FIG. 46, a fast information table may include at least one of a short_service_name_length field, a shoert_service_name field, a num_desciptors field, and a service_descriptor field.

The short_service_name_length field represents the length of a value of the shoert_service_name field. According to a specific embodiment of the present invention, the short_service_name_length field may be a 3-bit field.

The shoert_service_name field represents a short name of a corresponding broadcast service. According to a specific embodiment of the present invention, the short_service_name field may be a field having a bit size value obtained by multiplying a value of the short_service_name_length field by 8.

The num_desciptors field represents the number of descriptors in service level including specific information of a corresponding service. According to a specific embodiment of the present invention, the num_desciptors field may be an 8-bit field.

The service_descriptor field represents a service descriptor including specific information of a corresponding service. As described above, in the case of a fast information table, since it is less limited than a fast information chunk, specific information on broadcast service may be transmitted and received together through service_descriptor. Additionally, the fast information table may be transmitted and received in an XML file format in addition to the bit stream format described through FIGS. 45 and 48. This will be described with reference to FIG. 47.

FIG. 47 illustrates a syntax of a fast information table according to another embodiment of the present invention.

A fast information table in an XML format may include at least one of a FITdataversion attribute, a broadcastID attribute, a deliverySystemID attribute, a basePLPID attribute, a basePLPversion attribute, a serviceID attribute, a serviceCategory attribute, a serviceHidden attribute, a ServiceProtection attribute, a componentID attribute, and a PLPID attribute.

The FITdataversion attribute represents version information on a syntax and semantics of a fast information table. The broadcast reception device 100 may determine whether to process a corresponding fast information chunk by using the above. For example, when a value of the FITdataversion attribute represents a version that the broadcast reception device 100 does not support, the broadcast reception device 100 may not process a fast information table.

The broadcastID attribute represents an identifier identifying a broadcasting station transmitting broadcast service through a corresponding frequency of transport frame. When the broadcast transmission device transmits MPEG-2 TS based data, the broadcastID attribute may have the same value as transport_stream_id of MPEG-2 TS.

The deliverySystemID attribute represents an identifier identifying a broadcast transmission system applying the same transmission parameter and processing it on a broadcast network.

The basePLPID attribute is an identifier identifying a base PLP for a broadcast service of a broadcasting station corresponding to the broadcastID attribute. According to a specific embodiment of the present invention, a base PLP may deliver signaling information signaling a broadcast service transmitted through a transport frame. At this point, according to a specific embodiment of the present invention, signaling information signaling broadcast service may be PSI of MPEG2-TS standard. Additionally, according to a specific embodiment of the present invention, signaling information signaling broadcast service may be PSIP of ATSC standard. Additionally, according to a specific embodiment of the present invention, signaling information signaling broadcast service may be SI of DVB standard. According to another specific embodiment of the present invention, a base PLP may include a component included in a broadcast service transmitted through a transport frame.

The basePLPversion attribute may represent version information on a change in data transmitted through a base PLP. For example, when signaling information is delivered through a base PLP, if there is a change in service signaling, a value of the base_PLP_version field may be increased by 1.

The serviceID attribute represents an identifier identifying broadcast service.

The serviceCategory attribute represents a category of broadcast service. In more detail, the service_category field may represent at least one of TV service, radio service, broadcast service guide, RI service, and emergency alerting. For example, in the case of a value of the serviceCategory attribute is 0x01, it represents TV service. In the case of a value of the serviceCategory attribute is 0x02, it represents radio service. In the case of a value of the serviceCategory attribute is 0x03, it represents RI service. In the case of a value of the serviceCategory attribute is 0x08, it represents service guide. In the case of a value of the serviceCategory attribute is 0x09, it represents emergency alerting.

The serviceHidden attribute represents whether a corresponding broadcast service is hidden service. If the broadcast service is the hidden service, it is test service or special service. Accordingly, if the corresponding service is the hidden service, the broadcast reception device 100 may not display the corresponding service in a service guide or service list. Moreover, when the corresponding service is the hidden service, the broadcast reception device 100 may allow the corresponding service not to be selected by a channel up/down key input and the corresponding service to be selected by a number key input.

The ServiceProtection attribute may represent whether service protection is applied to at least one component in a corresponding broadcast service. For example, when a value of the ServiceProtection attribute is 1, it may represent that service protection is applied to at least one component in a corresponding broadcast service.

The componentID attribute represents an identifier identifying a corresponding component in broadcast service.

The PLPID attribute represents an identifier identifying a PLP where a corresponding component is transmitted in a transport frame.

The broadcast transmission device may transmit a fast information table in an XML format through an internet network in addition to a broadcast network. In more detail, the broadcast reception device 100 may request a fast information table for specific frequency and may receive a fast information table from an internet network through the IP communication unit 130. It takes a predetermined time that the broadcast reception device 100 tunes a specific frequency to receive a broadcast signal and analyzes and processes the received broadcast signal. Additionally, when a broadcast signal is not received, it may be difficult for the broadcast reception device 100 to scan a broadcast service for corresponding frequency. Accordingly, when a fast information table is received from an internet network through the IP communication unit 130, the broadcast reception device 100 may efficiently perform a broadcast service scan. Moreover, when a fast information table is received from an internet network through the IP communication unit 130, the broadcast reception device 100 may instantly perform a broadcast service scan. Additionally, as described above, the broadcast reception device 100 may receive a fast information table in an XML format through a broadcast network. This will be described in more detail with reference to FIG. 48.

FIG. 48 illustrates a syntax of a fast information table according to another embodiment of the present invention.

The broadcast transmission device may transmit a fast information table in an XML file format by using a section format and the broadcast reception device 100 may receive a fast information table in an XML file format.

At this point, a section including a fast information table may include at least one of a table_id field, a section_syntax_indicator field, a private_indicator field, a section_length field, a table_id_extension field, a table_id_extension field, an FIT_data_version field, a current_next_indicator field, a section_number field, a last_section_number field, and a fit_byte( ) field.

The table_id field represents an identifier of a section including a fast information table. At this point, the table_id may be 0xFA, that is, one of reserved id values defined in ATSC A/65. According to a specific embodiment of the present invention, the table_id field may be an 8-bit field.

The section_syntax_indicator field represents whether a fast information table is a private section table in the long formant of MEPG-2 TS standard. According to a specific embodiment of the present invention, the section_syntax_indicator may be a 1-bit field.

The private_indicator field represents whether a current table corresponds to a private section. According to a specific embodiment of the present invention, the private_indicator may be a 1-bit field.

The section_length field represents the length of a section included following the section_length field. According to a specific embodiment of the present invention, the section_length field may be a 12-bit field.

The table_id_extension field represents an identifier identifying fast information. According to a specific embodiment of the present invention, the table_id_extension field may be a 16-bit field.

The FIT_data_version field represents version information on the syntax and semantics of a fast information table. The broadcast reception device 100 may determine whether to process a corresponding fast information table by using the FIT_data_version field. For example, when a value of the FIT_data_version field represents a version that the broadcast reception device 100 does not support, the broadcast reception device 100 may not process a fast information table. According to a specific embodiment of the present invention, the FIT_data_version field may be a 5-bit field.

The current_next_indicator field represents whether information of a fast information table is currently available. In more detail, when a value of the current_next_indicator field is 1, the current_next_indicator field may represent that information of a fast information table is available. Moreover, when a value of the current_next_indicator field is 1, information of a fast information table is available for the next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of a fast information table is large, the fast information table may be divided into a plurality of sections and then transmitted. At this point, the broadcast reception device 100 determines whether all sections necessary for a fast information table are received on the basis of the section_number field and the last_section_number field. According to a specific embodiment of the present invention, the last_section_number field may be an 8-bit field.

The fit_byte( ) field includes a fast information table in an XML format. According to a specific embodiment of the present invention, the fit_byte( ) field may include a fast information table in a compressed XML format.

According to an embodiment of the present invention, provided are a broadcast transmission device, an operation method thereof, a broadcast reception device, and an operation method thereof for efficient broadcast service scan.

According to an embodiment of the present invention, provided are a broadcast transmission device, an operation method thereof, a broadcast reception device, and an operation method thereof for instant acquisition of broadcast service connection information.

FIG. 49 is a diagram illustrating configuration of ROHC_init_descriptor( ) according to an embodiment of the present invention.

Robust header compression (RoHC) according to an embodiment of the present invention may be configured for a bidirectional transmission system. In the bidirectional transmission system, a RoHC compressor and a RoHC decompressor according to an embodiment of the present invention may perform an initial set up procedure and in this procedure, transmit and receive a parameter required for the initial procedure. According to an embodiment of the present invention, the procedure for transmitting and receiving the parameter required for aforementioned initial procedure can be referred as a negotiation procedure or an initialization procedure. However, according to an embodiment of the present invention, a unidirectional system such as a broadcast system cannot perform the aforementioned negotiation procedure and can replace the aforementioned initialization procedure with a separate method.

According to an embodiment of the present invention, during the initialization procedure, the RoHC compressor and the RoHC decompressor may transmit and receive the following parameters. The parameter required for the initial procedure according to an embodiment of the present invention may include MAX_CID, LARGE_CIDS, PROFILES, FEEDBACK_FOR, and/or MRRU.

MAX_CID may be used to notify the decompressor of a maximum value of a context ID (CID).

LARGE_CIDS may indicate whether a short CID (0 to 15 (decimal number)) and an embedded CID (0 to 16383 (decimal number)) are used for configuration of the CID. Thus, a size of a byte for representation of the CID may also be determined.

PROFILES may indicate a range of a protocol for header compression via RoHC. According to an embodiment of the present invention, RoHC can compress and restore a stream when the compressor and the decompressor have the same profile.

FEEDBACK_FOR may correspond to an optionally used field and indicate whether a backward channel for transmission of feedback information is present in a corresponding RoHC channel.

A maximum reconstructed reception unit (MRRU) may indicate a maximum size of a segment when segmentation is used in the RoHC compressor.

According to an embodiment of the present invention, a descriptor including parameters may be transmitted in order to transmit a parameter required for the aforementioned RoHC initial procedure.

According to an embodiment of the present invention, ROHC_init_descriptor( ) may include a descriptor_tag field, a descriptor_length field, a context_id field, a context_profile field, a max_cid field, and/or a large_cid field.

The descriptor_tag field may identify whether the descriptor is a descriptor including a parameter required for a RoHC initial procedure.

The descriptor_length field may indicate a length of the descriptor.

The context_id field may indicate a CID of a corresponding RoHC packet stream.

The context_profile field may be a field including the aforementioned PROFILES parameter and indicate a range of a protocol for header compression via RoHC.

The max_cid field may be a field including the aforementioned MAX_CID parameter and may indicate a maximum value of a CID.

The large_cid field may be a field including the aforementioned LARGE_CIDS parameter and may indicate whether a short CID (0 to 15 (decimal number)) and an embedded CID (0 to 16383 (decimal number)) are used for configuration of the CID.

According to an embodiment of the present invention, ROHC_init_descriptor( ) may include the aforementioned FEEDBACK_FOR parameter and/or MRRU parameter.

FIG. 50 is a diagram illustrating configuration of Fast_Information_Chunk( ) including ROHC_init_descriptor( ) according to an embodiment of the present invention.

ROHC_init_descriptor( ) according to an embodiment of the present invention may be transmitted through a fast information channel (FIC). In this case, ROHC_init_descriptor( ) may be included in Fast_Information_Chunk( ) and transmitted. According to an embodiment of the present invention, ROHC_init_descriptor( ) may be included in a service level of Fast_Information_Chunk( ) and transmitted.

A field included in Fast_Information_Chunk( ) including ROHC_init_descriptor( ) according to an embodiment of the present invention has been described above.

ROHC_init_descriptor( ) according to an embodiment of the present invention may be changed in its term according to system configuration and changed in its size according to a system optimization situation.

Fast_Information_Chunk( ) according to an embodiment of the present invention may be referred to as fast information chunk.

FIG. 51 is a diagram illustrating configuration of Fast_Information_Chunk( ) including a parameter required for a RoHC initial procedure according to an embodiment of the present invention.

The parameter required for the RoHC initial procedure according to an embodiment of the present invention may be transmitted through a fast information channel (FIC). In this case, the parameter required for the RoHC initial procedure may be included in Fast_Information_Chunk( ) and transmitted. According to an embodiment of the present invention, the parameter required for the RoHC initial procedure may be included in a service level of Fast_Information_Chunk( ) and transmitted.

A field included in Fast_Information_Chunk( ) including the parameter required for the RoHC initial procedure according to an embodiment of the present invention has been described above.

The parameter required for the RoHC initial procedure according to an embodiment of the present invention may be changed in its term according to system configuration and changed in its size according to a system optimization situation.

FIG. 52 is a diagram illustrating configuration of Fast_Information_Chunk( ) including ROHC_init_descriptor( ) according to another embodiment of the present invention.

According to an embodiment of the present invention, when important information about a component included in a broadcast service is included in Fast_Information_Chunk( ) and transmitted, ROHC_init_descriptor( ) may be included in a component level of Fast_Information_Chunk( ) and transmitted. That is, ROHC_init_descriptor( ) may be transmitted for each respective component included in Fast_Information_Chunk( ).

A field included in Fast_Information_Chunk( ) including ROHC_init_descriptor( ) according to another embodiment of the present invention has been described above.

ROHC_init_descriptor( ) according to an embodiment of the present invention may be changed in its term according to system configuration and changed in its size according to a system optimization situation.

FIG. 53 is a diagram illustrating configuration of Fast_Information_Chunk( ) including a parameter required for a RoHC initial procedure according to another embodiment of the present invention.

According to an embodiment of the present invention, when important information about a component included in a broadcast service is included in Fast_Information_Chunk( ) and transmitted, a parameter required for the RoHC initial procedure may be included in a component level of Fast_Information_Chunk( ) and transmitted. That is, the parameter required for the RoHC initial procedure may be transmitted or each respective component included in Fast_Information_Chunk( ).

A field included in Fast_Information_Chunk( ) including a parameter required for the RoHC initial procedure according to another embodiment of the present invention has been described above.

The parameter required for the RoHC initial procedure according to an embodiment of the present invention may be changed in its term according to system configuration and changed in its size according to a system optimization situation.

Figure 54:
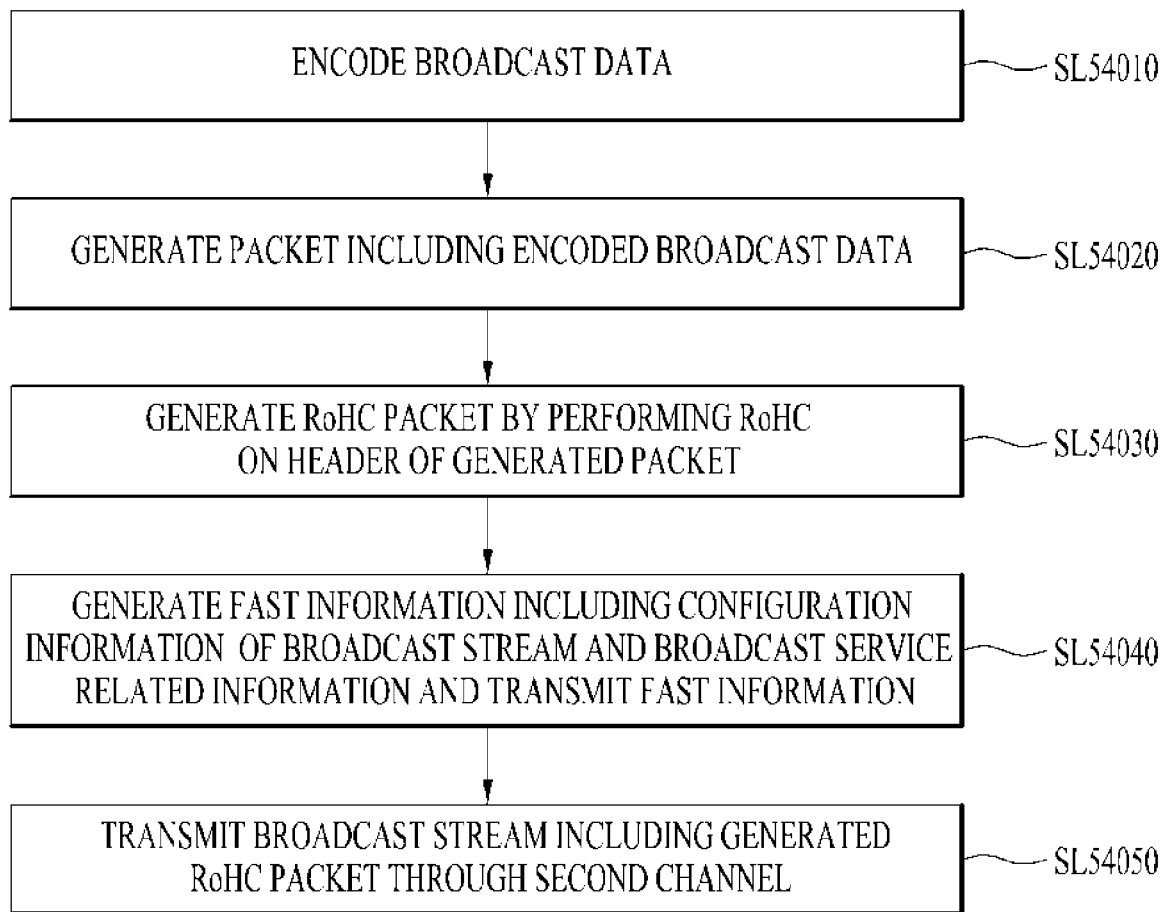
FIG. 54 is a flowchart of a method for transmitting a broadcast signal according to an embodiment of the present invention.

FIG. 54 is a flowchart of a method for transmitting a broadcast signal according to an embodiment of the present invention.

A transmitter according to an embodiment of the present invention may transmit a broadcast signal through the following procedure. First, the transmitter according to an embodiment of the present invention may encode broadcast data (SL54010). Then the transmitter according to an embodiment of the present invention may generate a packet including the encoded broadcast data (SL54020). Here, the transmitter according to an embodiment of the present invention may add an RTP header, a UDP header, and an IP header to the broadcast data to generate an IP/UDP/RTP packet. According to an embodiment of the present invention, when transmission is not performed in real time, a FLUTE header, etc. may be added instead of the aforementioned RTP header. Then the transmitter according to an embodiment of the present invention may apply robust header compression (RoHC) on a header of the packet generated in the previous procedure to generate a RoHC packet (SL54030). Then the transmitter according to an embodiment of the present invention may generate fast information including configuration information of a broadcast stream and broadcast service related information and transmit the fast information through a first channel (SL54040). The fast information according to an embodiment of the present invention may refer to fast information. According to an embodiment of the present invention, the fast information may be included in fast information chunk and transmitted. The first channel according to an embodiment of the present invention may refer to a fast information channel (FIC). A detailed description thereof has been given with reference to FIGS. 34, 37, 38, 39, and 40. Then the transmitter according to an embodiment of the present invention may transmit the broadcast stream including the RoHC packet generated in the previous procedure through a second channel (SL54050). The second channel according to an embodiment of the present invention may refer to PLP or DP. The broadcast data according to an embodiment of the present invention may include video data, audio data, additional data, etc. A detailed description thereof has been given with reference to FIGS. 31 to 33.

According to another embodiment of the present invention, fast information may include RoHC initialization information for initialization of information about robust header compression. According to an embodiment of the present invention, information included in a RoHC header may be initialized for each unit of context including one or more RoHC packets. The RoHC initialization information according to an embodiment of the present invention may refer to information used in the aforementioned initialization procedure. The RoHC initialization information according to an embodiment of the present invention may refer to information included in ROHC_init_descriptor( ) which has been described with reference to FIG. 49.

According to another embodiment of the present invention, the RoHC initialization information may include context identification information for identification of context indicating one or more RoHC packet units, context profile information indicating a range of a protocol for header compression of a RoHC packet, maximum context identification information indicating a maximum value of the context identification information, and/or large context identification information indicating representation format of the context identification information. According to an embodiment of the present invention, the context identification information may refer to context_id, the context profile information may refer to context_profile, the maximum context identification information may refer to max_cid, and the large context identification information may refer to large_cid, which has been described with reference to FIG. 49.

According to another embodiment of the present invention, the RoHC initialization information may include feedback channel information indicating whether a backward channel for transmission of feedback information is present in a channel for transmission of a RoHC packet and/or maximum segment size information indicating a maximum size of one segment when a RoHC packet is segmented to one or more segments. According to an embodiment of the present invention, the feedback channel information may refer to FEEDBACK_FOR and the maximum segment size information may refer to a maximum reconstructed reception unit (MRRU), which has been described with reference to FIG. 49.

According to another embodiment of the present invention, the RoHC initialization information may be included in a service level in fast information. The fast information according to an embodiment of the present invention may include broadcast service related information and include a service ID for identification of a broadcast service. The RoHC initialization information according to an embodiment of the present invention may be included in a service level identified by the service ID, which has been described with reference to FIGS. 50 and 51.

According to another embodiment of the present invention, the fast information may further include component related information included in a broadcast service and the RoHC initialization information may be included in a component level in the fast information. The fast information according to an embodiment of the present invention may include information about one or more components included in one service and include a component ID for identification of a component. The RoHC initialization information according to an embodiment of the present invention may be included in a component level identified by the component ID, which has been described with reference to FIGS. 52 and 53.

According to another embodiment of the present invention, the RoHC initialization information may be included in a descriptor. A descriptor including the RoHC initialization information according to an embodiment of the present invention may refer to ROHC_init_descriptor( ). A descriptor including the RoHC initialization information according to an embodiment of the present invention may be included in a component level or service level of fast information, which has been described with reference to FIGS. 50 and 52.

Figure 55:
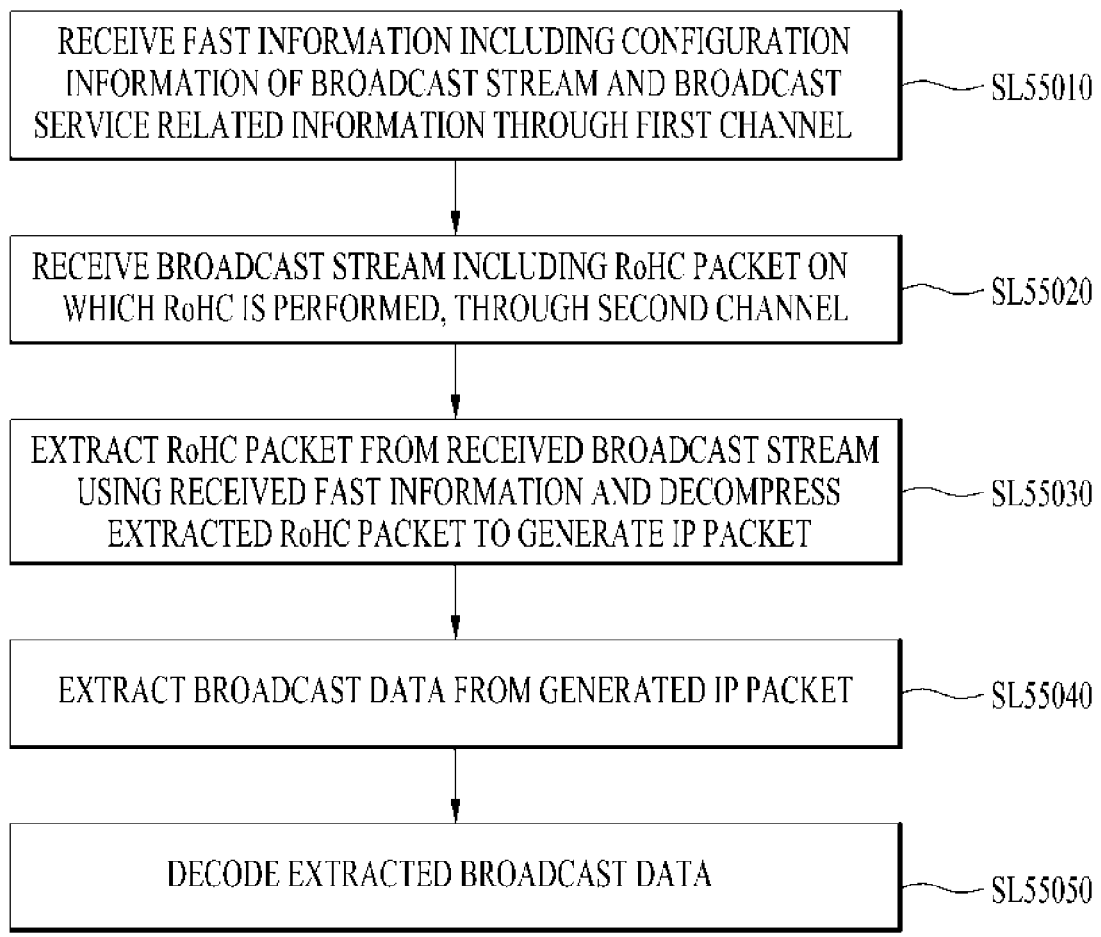
FIG. 55 is a flowchart of a method for receiving a broadcast signal according to an embodiment of the present invention.

FIG. 55 is a flowchart of a method for receiving a broadcast signal according to an embodiment of the present invention.

A receiver according to an embodiment of the present invention may receive a broadcast signal through the following procedure. First, the receiver according to an embodiment of the present invention may receive fast information including configuration information of a broadcast stream and broadcast service related information through a first channel (SL55010), which has been described with reference to FIGS. 34, 37, 38, 39, and 40. Then the receiver according to an embodiment of the present invention may receive the broadcast stream including a RoHC packet on which robust header compression (RoHC) is performed, through a second channel (SL55020), which has been described with reference to FIGS. 31 to 33. Then the receiver may extract a RoHC packet from the broadcast stream received in the previous procedure using the fast information received in the previous procedure and decompress the extracted RoHC packet to generate an IP packet (SL55030). According to an embodiment of the present invention, the receiver may extract a RoHC packet including a desired service or component based on the service or component related information included in the fast information. The receiver according to an embodiment of the present invention may decompress the compressed header of the RoHC packet. Then the receiver may extract broadcast data from the IP packet generated in the previous procedure (SL55040). Then the receiver may decode the extracted broadcast data (SL55050).

According to another embodiment of the present invention, the fast information may include RoHC initialization information for initialization of information about robust header compression. According to another embodiment of the present invention, information included in a RoHC header may be initialized for each unit of context including one or more RoHC packets. The RoHC initialization information according an embodiment of the present invention may refer to information used in the aforementioned initialization procedure. The RoHC initialization information according to an embodiment of the present invention may refer to information included in ROHC_init_descriptor( ) which has been described with reference to FIG. 49.

According to another embodiment of the present invention, RoHC initialization information may include context identification information for identification of context indicating one or more RoHC packet units, context profile information indicating a range of a protocol of compression of an RoHC packet, maximum context identification information indicating a maximum value of the context identification information, and/or large context identification information indicating representation format of the context identification information. According to an embodiment of the present invention, the context identification information may refer to context_id, the context profile information may refer to context_profile, the maximum context identification information may refer to max_cid, and the large context identification information may refer to large_cid, which has been described with reference to FIG. 49.

According to another embodiment of the present invention, RoHC initialization information may include feedback channel information whether a backward channel for transmission of feedback information is present in a channel for transmission of a RoHC packet and/or maximum segment size information indicating a maximum size of one segment when a RoHC packet is segmented to one or more segments. According to an embodiment of the present invention, the feedback channel information may refer to FEEDBACK_FOR and the maximum segment size information may refer to a maximum reconstructed reception unit (MRRU), which has been described with reference to FIG. 49.

According to another embodiment of the present invention, the RoHC initialization information may be included in a service level in fast information. The fast information according to an embodiment of the present invention may include broadcast service related information and include a service ID for identification of a broadcast service. The RoHC initialization information according to an embodiment of the present invention may be included in a service level identified by the service ID, which has been described with reference to FIGS. 50 and 51.

According to another embodiment of the present invention, the fast information may further include component related information included in a broadcast service and the RoHC initialization information may be included in a component level in the fast information. The fast information according to an embodiment of the present invention may include information about one or more components included in one service and include a component ID for identification of a component. The RoHC initialization information according to an embodiment of the present invention may be included in a component level identified by the component ID, which has been described with reference to FIGS. 52 and 53.

According to another embodiment of the present invention, the RoHC initialization information may be included in a descriptor. A descriptor including the RoHC initialization information according to an embodiment of the present invention may refer to ROHC_init_descriptor( ). A descriptor including the RoHC initialization information according to an embodiment of the present invention may be included in a component level or service level of fast information, which has been described with reference to FIGS. 50 and 52.

Figure 56:
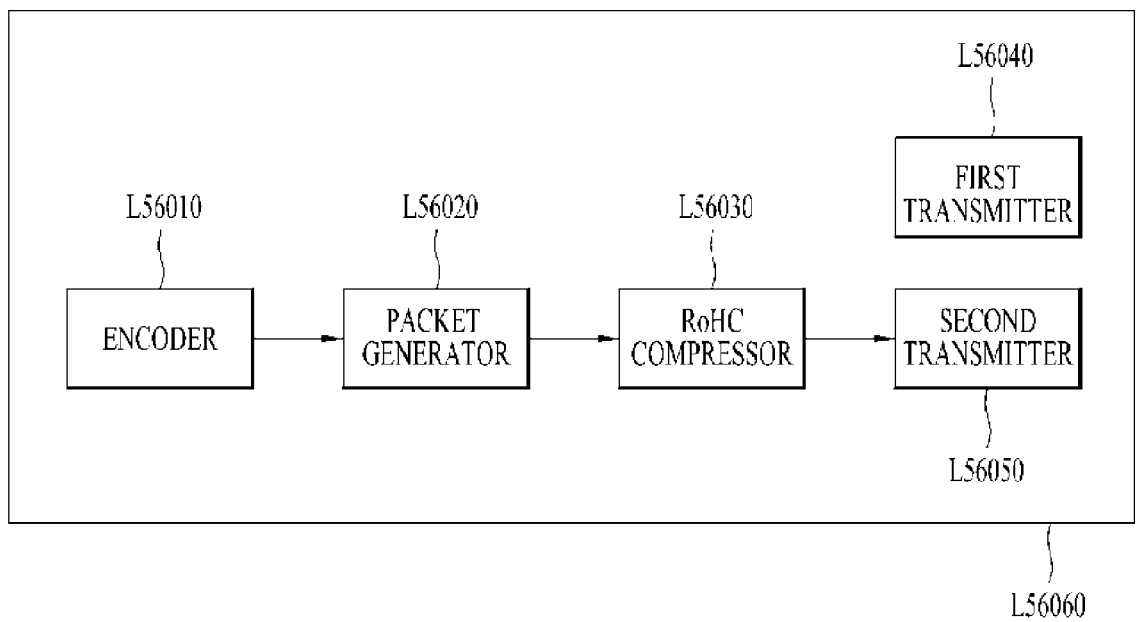
FIG. 56 is a diagram illustrating configuration of a broadcast signal transmitting apparatus L56060 according to an embodiment of the present invention.

FIG. 56 is a diagram illustrating configuration of a broadcast signal transmitting apparatus L56060 according to an embodiment of the present invention.

The transmitting apparatus L56060 according to an embodiment of the present invention may include an encoder L56010, a packet generator L56020, a RoHC compressor L56030, a first transmitter L56040, and/or a second transmitter L56050.

Components included in the transmitting apparatus according to an embodiment of the present invention may perform the respective corresponding procedures of the aforementioned method for transmitting a broadcast signal according to an embodiment of the present invention.

The encoder L56010 may encode broadcast data.

The packet generator L56020 may generate a packet including the encoded broadcast data.

The RoHC compressor L56030 may perform robust header compression (RoHC) on a header of the generated packet to generate a RoHC packet.

The first transmitter L56040 may generate fast information including configuration information of a broadcast stream and broadcast service related information and transmit the fast information through a first channel, which has been described with reference to FIGS. 34, 37, 38, 39, and 40.

The second transmitter L56050 may transmit a broadcast stream including the generated RoHC packet through a second channel, which has been described with reference to FIGS. 31 to 33.

Figure 57:
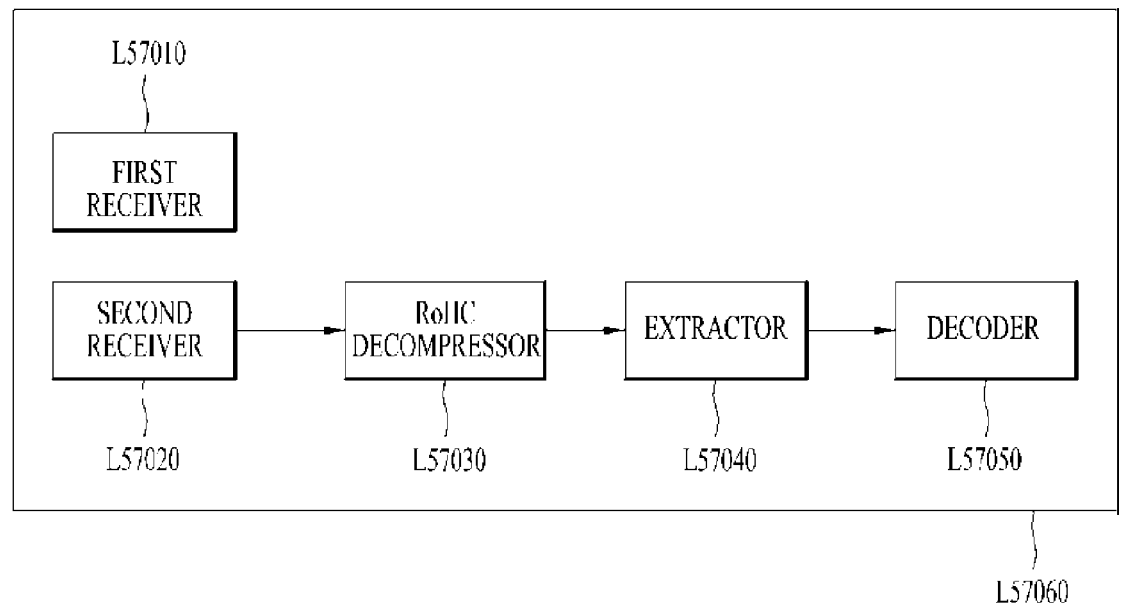
FIG. 57 is a diagram illustrating configuration of a broadcast signal receiving apparatus L57060 according to an embodiment of the present invention.

FIG. 57 is a diagram illustrating configuration of a broadcast signal receiving apparatus L57060 according to an embodiment of the present invention.

The receiving apparatus L57060 according to an embodiment of the present invention may include a first receiver L57010, a second receiver L57020, a RoHC decompressor L57030, an extractor L57040, and/or a decoder L57050.

Components included in the receiving apparatus according to an embodiment of the present invention may perform the respective corresponding procedures of the aforementioned method for receiving a broadcast signal according to an embodiment of the present invention.

The first receiver L57010 may receive fast information including configuration information of a broadcast stream and broadcast service related information through a first channel, which has been described with reference to FIGS. 34, 37, 38, 39, and 40. The first receiver L57010 according to an embodiment of the present invention may be included in the aforementioned broadcast receiver 110.

The second receiver L57020 may receive a broadcast stream including a RoHC packet on which robust header compression (RoHC) is performed, through a second channel, which has been described with reference to FIGS. 31 to 33. The second receiver L57020 according to an embodiment of the present invention may be included in the aforementioned broadcast receiver 110.

The RoHC decompressor L57030 may extract a RoHC packet from the received broadcast stream using fast information and decompress the extracted RoHC packet to generate an IP packet.

The extractor L57040 may extract broadcast data from the generated IP packet.

The decoder L57050 may decode the extracted broadcast data.

The above-described steps can be omitted or replaced by steps executing similar or identical functions according to design.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The present invention is available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a broadcast signal, the method comprising:
  generating a packet carrying a broadcast service and service signaling information, and a packet carrying fast information for supporting rapid service scans and service acquisition,
  the fast information including identification information for identifying the broadcast service, service category information representing a category of the broadcast service and hidden information representing whether or not the broadcast service is related to a test service;

generating a robust header compression (RoHC) packet by compressing a header of each packet, and signaling information including context information generated from the compressing the header of each packet; and transmitting a signal frame including the RoHC packet and the signaling information, the signaling information is transmitted separately from the RoHC packet, the signaling information including:

context identification information for representing a context identification (ID) for the RoHC packet, context profile information for a range which is used for compressing a packet stream including the packets, maximum context identification information indicating a maximum value of the context ID, and configuration information for a configuration for the context information.

2. The method of claim 1, wherein the signaling information includes large context identification information indicating a representation format of the context identification information.

3. The method of claim 2, wherein the signaling information includes at least one of feedback channel information indicating whether a backward channel for transmission of feedback information is present in a channel for transmission of the RoHC packet and maximum segment size information indicating a maximum size of one segment when the RoHC packet is segmented to one or more segments.

4. The method of claim 1, wherein the signaling information includes type information indicating a type of signaling carried in the signaling information.

5. The method of claim 1, wherein the fast information further includes information indicating whether one or more components of the broadcast service are protected, and information identifying a broadcast stream including the broadcast service.

6. A method for receiving a broadcast signal, the method comprising:

receiving a signal frame including a robust header compression (RoHC) packet and signaling information including context information generated by compressing a header of each packet, the signaling information is carried separately from the RoHC packet, wherein the RoHC packet is generated by compressing the header of each packet, a packet carrying a broadcast service and service signaling information for the broadcast service, and a packet carrying fast information for supporting rapid service scans and service acquisition, the fast information including identification information for identifying the broadcast service, service category information representing a category of the broadcast service and hidden information representing whether or not the broadcast service is related to a test service, and the signaling information including context identification information for representing a context identification (ID) for the RoHC packet, context profile information for a range which is used for compressing a packet stream including the packets, maximum context identification information indicating a maximum value of the context ID, and configuration information for a configuration for the context information;

decompressing the RoHC packet to restore the IP packet stream based on the signaling information;

parsing the fast information in the packet;

parsing the service signaling information in the packet; and decoding the broadcast service in the packet.

7. The method of claim 6, wherein the signaling information includes large context identification information indicating a representation format of the context identification information.

8. The method of claim 7, wherein the signaling information includes at least one of feedback channel information indicating whether a backward channel for transmission of feedback information is present in a channel for transmission of the RoHC packet and maximum segment size information indicating a maximum size of one segment when the RoHC packet is segmented to one or more segments.

9. The method of claim 6, wherein the signaling information includes type information indicating a type of signaling carried in the signaling information.

10. The method of claim 6, wherein the fast information further includes information indicating whether one or more components of the broadcast service are protected, and information identifying a broadcast stream including the broadcast service.

11. An apparatus for transmitting a broadcast signal, the apparatus comprising:

a packet generator configured to generate a packet carrying a broadcast service and service signaling information, and a packet carrying fast information for supporting rapid service scans and service acquisition, the fast information including identification information for identifying the broadcast service, service category information representing a category of the broadcast service and hidden information representing whether or not the broadcast service is related to a test service;

a robust header compression (RoHC) compressor configured to generate a RoHC packet by compressing a header of each packet, and signaling information including context information generated from the compressing the header of each packet;

a transmitter configured to transmit a signal frame including the RoHC packet and the signaling information, the signaling information is transmitted separately from the RoHC packet, the signaling information including context identification information for representing a context identification (ID) for the RoHC packet, context profile information for a range which is used for compressing a packet stream including the packets, and maximum context identification information indicating a maximum value of the context ID, and configuration information for a configuration for the context information.

12. An apparatus for receiving a broadcast signal, the apparatus comprising:

a receiver configured to receive a signal frame including a robust header compression (RoHC) packet and signaling information including context information generated by compressing a header of each packet the signaling information is carried separately from the RoHC packet, wherein the RoHC packet is generated by compressing the header of each packet, a packet carrying a broadcast service and service signaling information for the broadcast service, and a packet carrying fast information for supporting rapid service scans and service acquisition, the fast information including identification information for identifying the broadcast service, service category information representing a category of the broadcast service and hidden information representing whether or not the broadcast service is related to a test service, and the signaling information including context identification information for indicating a context identification (ID) for the RoHC packet, context profile information for a range which is used for compressing a packet stream including the packets, maximum context identification information indicating a maximum value of the context ID, and configuration information for a configuration for the context information;

a RoHC decompressor configured to decompress the RoHC packet stream to restore the IP packet stream based on the signaling information;

a signaling parser configured to parse the fast information in the packet, wherein the signaling parser further parses the service signaling information in the packet; and a decoder configured to decode the broadcast service in the packet.

\* \* \* \* \*